(12) United States Patent
Kinoshita et al.

(10) Patent No.: US 12,315,492 B2
(45) Date of Patent: May 27, 2025

(54) INFORMATION PROCESSING SYSTEM FOR PRESENTING CONTENT BASED ON CONTENT INFORMATION AND ACTIVITATION CONDITIONS

(71) Applicant: Sony Group Corporation, Tokyo (JP)

(72) Inventors: Takashi Kinoshita, Tokyo (JP); Ryu Aoyama, Shinagawa-ku (JP); Izumi Yagi, Shinagawa-ku (JP); Yoji Hirose, Shinagawa-ku (JP); Fumiaki Tokuhisa, Shinagawa-ku (JP); Hideo Nagasaka, Shinagawa-ku (JP); Shouichi Doi, Shinagawa-ku (JP); Makoto Yamada, Tokyo (JP); Kaoru Koike, Tokyo (JP)

(73) Assignee: Sony Group Corporation, Tokyo (JP)

( * ) Notice: Subject to any disclaimer, the term of this patent is extended or adjusted under 35 U.S.C. 154(b) by 641 days.

(21) Appl. No.: 17/618,682

(22) PCT Filed: Jun. 8, 2020

(86) PCT No.: PCT/JP2020/022483
§ 371 (c)(1),
(2) Date: Dec. 13, 2021

(87) PCT Pub. No.: WO2020/255767
PCT Pub. Date: Dec. 24, 2020

(65) Prior Publication Data
US 2022/0246135 A1 Aug. 4, 2022

(30) Foreign Application Priority Data
Jun. 20, 2019 (JP) ................. 2019-114626

(51) Int. Cl.
*G10L 13/08* (2013.01)
*G06F 16/635* (2019.01)
*G06F 16/687* (2019.01)

(52) U.S. Cl.
CPC ............ *G10L 13/08* (2013.01); *G06F 16/635* (2019.01); *G06F 16/687* (2019.01)

(58) Field of Classification Search
CPC ....... G10L 13/08; G06F 16/635; G06F 16/687
See application file for complete search history.

(56) References Cited

U.S. PATENT DOCUMENTS

2010/0138416 A1* 6/2010 Bellotti ............... G06F 16/4393
707/E17.014
2014/0201675 A1* 7/2014 Joo .................... H04M 1/72454
715/781

(Continued)

FOREIGN PATENT DOCUMENTS

JP  2007-172524 A  7/2007
JP  2010-136370 A  6/2010

(Continued)

OTHER PUBLICATIONS

International Search Report issued on Jul. 21, 2020 in PCT/JP2020/022483 filed Jun. 8, 2020, 2 pages.

*Primary Examiner* — Asher D Kells
(74) *Attorney, Agent, or Firm* — Oblon, McClelland, Maier & Neustadt, L.L.P.

(57) ABSTRACT

The present technology relates to an information processing system, an information processing method, and a recording medium that make it possible to provide better user experience. An information processing system includes a control unit that performs control such that: context information is associated with a content element in advance; for each of users, an activation condition is settable for at least the context information, and a user scenario including a data set of the context information and the activation condition is generatable; and when sensor data obtained by sensing a user in real time satisfies the activation condition set in the user scenario, the content element associated with the con- (Continued)

text information depending on the activation condition is presented to the user. The present technology can be applied to, for example, a system that provides a voice service.

31 Claims, 48 Drawing Sheets

(56) References Cited

U.S. PATENT DOCUMENTS

| | | | |
|---|---|---|---|
| 2018/0027090 A1* | 1/2018 | Nakanishi | G06F 16/9535 |
| | | | 709/206 |
| 2018/0081523 A1 | 3/2018 | Beaumont et al. | |
| 2021/0064664 A1* | 3/2021 | Aruga | G06F 16/9038 |

FOREIGN PATENT DOCUMENTS

| | | |
|---|---|---|
| JP | WO 2013/136792 A1 | 9/2013 |
| JP | 2014-34374 A | 2/2014 |
| JP | 2015-210818 A | 11/2015 |
| JP | WO 2016/136104 A1 | 9/2016 |
| JP | 2017501461 A | 1/2017 |
| JP | 2018106444 A | 7/2018 |
| JP | 6463529 B1 | 2/2019 |
| WO | WO-2017149704 A1 | 9/2017 |

* cited by examiner

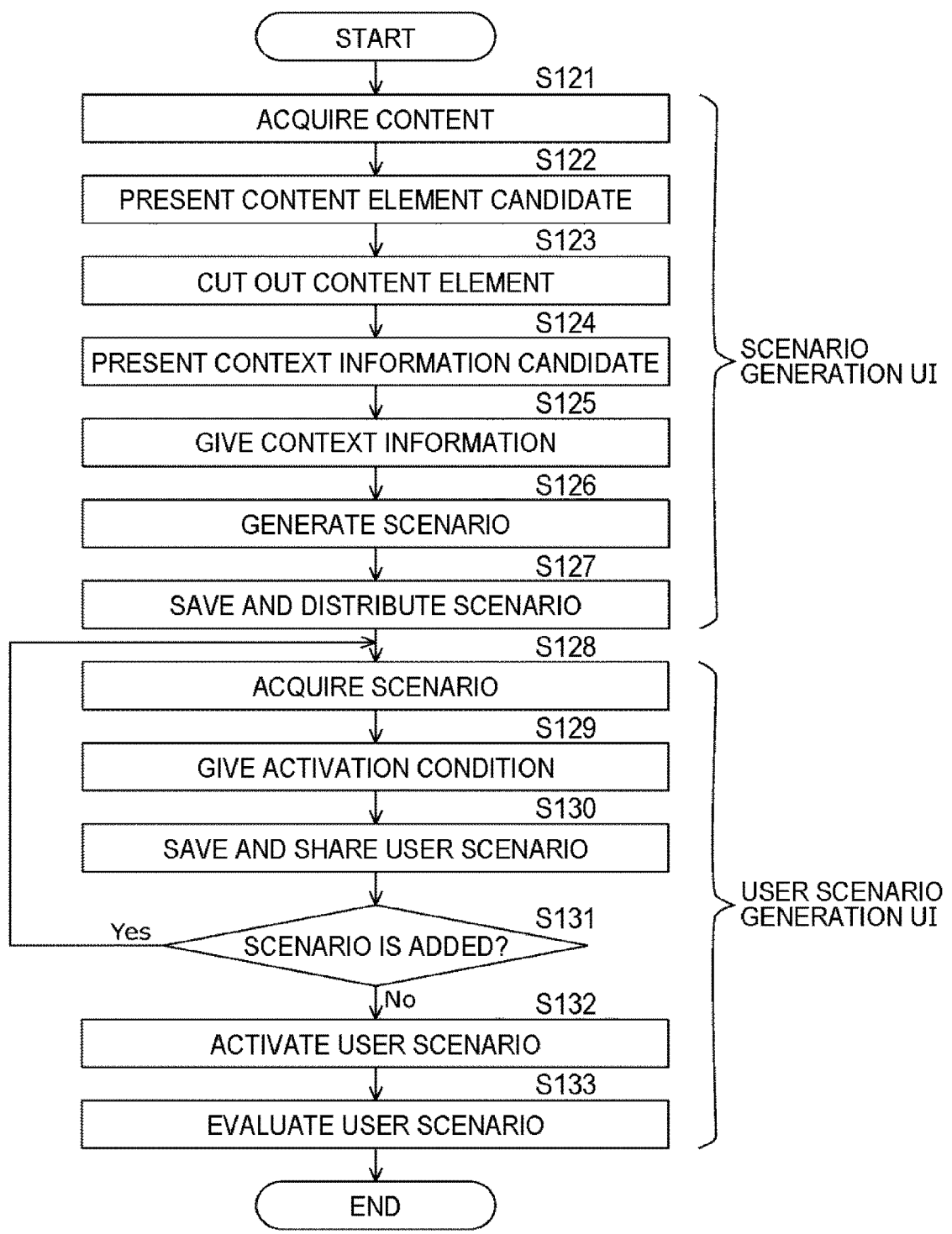

FIG. 8

| CONTENT ELEMENT | CONTEXT INFORMATION |
|---|---|
| CHARACTER UTTERANCE #1 : BGM#1 | HOME |
| BGM#5 | STATION I ALWAYS USE |
| BGM#9 : CHARACTER UTTERANCE #3 | PART-TIME JOB PLACE |
| CHARACTER UTTERANCE #8 : SOUND EFFECT #2 | CONVENIENCE STORE IN MORNING |
| BGM#10 | CITY WHERE THAT PERSON LIVES |
| BGM#4 | BENCH OF MEMORIES |
| BGM#14 : ENVIRONMENTAL SOUND #21 | CAFE ON RAINY DAY |
| BGM#2 : CHARACTER UTTERANCE #5 | SIDEWALK WHERE I MOTIVATE MYSELF |
| SCENE AUDIO #8 | PATH WHERE I'M HEALED BY STARS |
| ⋮ | ⋮ |

| CONTENT ELEMENT | CONTEXT INFORMATION | ACTIVATION CONDITION |
|---|---|---|
| CHARACTER UTTERANCE #1 : BGM #1 | HOME | CENTER (35.631466,139.743660) : RADIUS 10m |
| BGM #5 | STATION I ALWAYS USE | CENTER (35.628901,139.738946) : RADIUS 50m |
| BGM #9 : CHARACTER UTTERANCE #3 | PART-TIME JOB PLACE | CENTER (35.629097,139.740817) : RADIUS 20m |
| CHARACTER UTTERANCE #8 : SOUND EFFECT #2 | CONVENIENCE STORE IN MORNING | CENTER (35.629458,139.742876) : RADIUS 10m : TIME 8:00-10:00 |
| BGM #10 | CITY WHERE THAT PERSON LIVES | CENTER (35.627684,139.737106) : RADIUS 100m |
| BGM #4 | BENCH OF MEMORIES | CENTER (35.629181,139.741231) : RADIUS 1m |
| BGM #14 : ENVIRONMENTAL SOUND #21 | CAFE ON RAINY DAY | CENTER (35.628974,139.743781) : RADIUS 20m : WEATHER RAIN |
| BGM #2 : CHARACTER UTTERANCE #5 | SIDEWALK WHERE I MOTIVATE MYSELF | RECTANGLE (35.629565,139.742708) - (35.630955,139.743162) |
| SCENE AUDIO #8 | PATH WHERE I'M HEALED BY STARS | RECTANGLE (35.629673,139.741763) - (35.630065,139.742790) : TIME 19:00-21:00 : FATIGUE MEDIUM : WEATHER FINE |
| ... | ... | ... |

| WORK A (MOVIE) CONTENT ELEMENT | WORK B (ANIMATION) CONTENT ELEMENT | WORK C (LITERATURE RECITATION) CONTENT ELEMENT | CONTEXT INFORMATION |
|---|---|---|---|
| BGM #2 | CHARACTER UTTERANCE #1 : BGM #1 | RECITATION #1 | HOME |
| BGM #9 | BGM #5 | - | STATION I ALWAYS USE |
| - | BGM #9 : CHARACTER UTTERANCE #3 | RECITATION #3 | PART-TIME JOB PLACE |
| - | CHARACTER UTTERANCE #8 : SOUND EFFECT #6 | RECITATION #2 | CONVENIENCE STORE IN MORNING |
| BGM #8 | BGM #10 | - | CITY WHERE THAT PERSON LIVES |
| BGM #4 | BGM #4 | RECITATION #4 | BENCH OF MEMORIES |
| BGM #3 : ENVIRONMENTAL SOUND #2 | BGM #14 : ENVIRONMENTAL SOUND #21 | - | CAFE ON RAINY DAY |
| SCENE AUDIO #1 | BGM #2 : CHARACTER UTTERANCE #5 | RECITATION #7 | SIDEWALK WHERE I MOTIVATE MYSELF |
| SCENE AUDIO #8 | SCENE AUDIO #8 | RECITATION #5 | PATH WHERE I'M HEALED BY STARS |
| ... | ... | ... | ... |

| | EXAMPLE OF ACTIVATION CONDITION | EXAMPLE OF SENSING MEANS |
|---|---|---|
| TIME | TIME AND PERIOD OF TIME | CLOCK, TIMER |
| POSITION | LATITUDE, LONGITUDE | GPS/WiFi |
| | APPROACH TO SPECIFIC POSITION | WIRELESS BEACON |
| AUTHENTICATION INFORMATION | USER ID | PROXIMITY COMMUNICATION |
| POSTURE AND ACTION | STANDING, SITTING, LAYING | INERTIAL SENSOR, CAMERA |
| | TRAIN, BICYCLE, ESCALATOR | INERTIAL SENSOR, PROXIMITY COMMUNICATION |
| SURROUNDING ENVIRONMENT INFORMATION | CHAIR, DESK, TREE | CAMERA, RF TAG |
| | BUILDING, ROOM | CAMERA, WIRELESS BEACON, ULTRASONIC WAVE |
| | SCENERY, SCENE | CAMERA |
| STATE | BODY POSTURE AND MOTION | INERTIAL SENSOR |
| | RESPIRATORY RATE, PULSE, EMOTION | BIOLOGICAL SENSOR |

| CHARACTER | SYSTEM | ARRANGEMENT |
|---|---|---|
| A | USER | BACK |
| B | HOUSE | ENTRANCE |
| C | USER | RIGHT |
| ⋮ | ⋮ | ⋮ |

161

| INFORMATION ID | TYPE | POSITION (LATITUDE LONGITUDE) | CONTENT |
|---|---|---|---|
| 1 | Shopping | X,X (SHINAGAWA STATION) | IT LOOKS LIKE NEW STORE HAS OPENED |
| 2 | HomeIoT | Y,Y (USER HOME) | MOM CAME HOME |
| 3 | RecInfo | RECORDER #1 | NEW PROGRAM WAS RECORDED |
| ⋮ | ⋮ | ⋮ | ⋮ |

162

| SCENARIO ID | TYPE | CONTENT |
|---|---|---|
| 1 | Shopping | [CONTENT OF Shopping] |
| 2 | HomeIoT | [CONTENT OF HomeIoT] |
| 3 | RecInfo | [CONTENT OF RecInfo] |
| 4 | NewInfo | WELL, [CONTENT OF INFORMATION THAT CAN BE ACQUIRED] |
| ⋮ | ⋮ | ⋮ |

163

INFORMATION PROCESSING SYSTEM FOR PRESENTING CONTENT BASED ON CONTENT INFORMATION AND ACTIVATION CONDITIONS

TECHNICAL FIELD

The present technology relates to an information processing system, an information processing method, and a recording medium, and particularly relates to an information processing system, an information processing method, and a recording medium enabled to provide better user experience.

BACKGROUND ART

In recent years, with the spread of information devices, various services utilizing the characteristics of the devices have been provided (see, for example, Patent Document 1).

In this type of service, processing may be performed by using information on context. As a technology related to the context, technologies disclosed in Patent Documents 2 to 5 are known.

CITATION LIST

Patent Document

Patent Document 1: Japanese Patent No. 6463529
Patent Document 2: Japanese Patent Application Laid-Open No. 2015-210818
Patent Document 3: WO 2013/136792 A
Patent Document 4: Japanese Patent Application Laid-Open No. 2007-172524
Patent Document 5: WO 2016/136104 A

SUMMARY OF THE INVENTION

Problems to be Solved by the Invention

By the way, when providing a service by using information on context, it is required to provide better user experience.

The present technology has been made in view of such a situation, and makes it possible to provide better user experience.

Solutions to Problems

An information processing system of one aspect of the present technology is an information processing system including a control unit that performs control such that: context information is associated with a content element in advance; for each of users, an activation condition is settable for at least the context information, and a user scenario including a data set of the context information and the activation condition is generatable; and when sensor data obtained by sensing a user in real time satisfies the activation condition set in the user scenario, the content element associated with the context information depending on the activation condition is presented to the user.

An information processing method according to one aspect of the present technology is an information processing method in which an information processing device performs control such that: context information is associated with a content element in advance; for each of users, an activation condition is settable for at least the context information, and a user scenario including a data set of the context information and the activation condition is generatable; and when sensor data obtained by sensing a user in real time satisfies the activation condition set in the user scenario, the content element associated with the context information depending on the activation condition is presented to the user.

A recording medium according to one aspect of the present technology is a recording medium readable by a computer recording a program for causing the computer to function as a control unit that performs control such that: context information is associated with a content element in advance; for each of users, an activation condition is settable for at least the context information, and a user scenario including a data set of the context information and the activation condition is generatable; and when sensor data obtained by sensing a user in real time satisfies the activation condition set in the user scenario, the content element associated with the context information depending on the activation condition is presented to the user.

In the information processing system, the information processing method, and the recording medium according to one aspect of the present technology, context information is associated with a content element in advance; for each of users, an activation condition is set for at least the context information, and a user scenario including a data set of the context information and the activation condition is generated; and when sensor data obtained by sensing a user in real time satisfies the activation condition set in the user scenario, the content element associated with the context information depending on the activation condition is presented to the user.

BRIEF DESCRIPTION OF DRAWINGS

FIG. 7 is a flowchart illustrating a detailed flow of the information processing in the first embodiment.

FIG. 8 is a diagram illustrating an example of information stored in a scenario DB.

FIG. 9 is a diagram illustrating an example of information stored in a user scenario DB.

FIG. 10 is a diagram illustrating another example of the information stored in the scenario DB.

FIG. 33 is a diagram illustrating an example of a combination of an activation condition and a sensing means.

MODE FOR CARRYING OUT THE INVENTION

Figure 1:
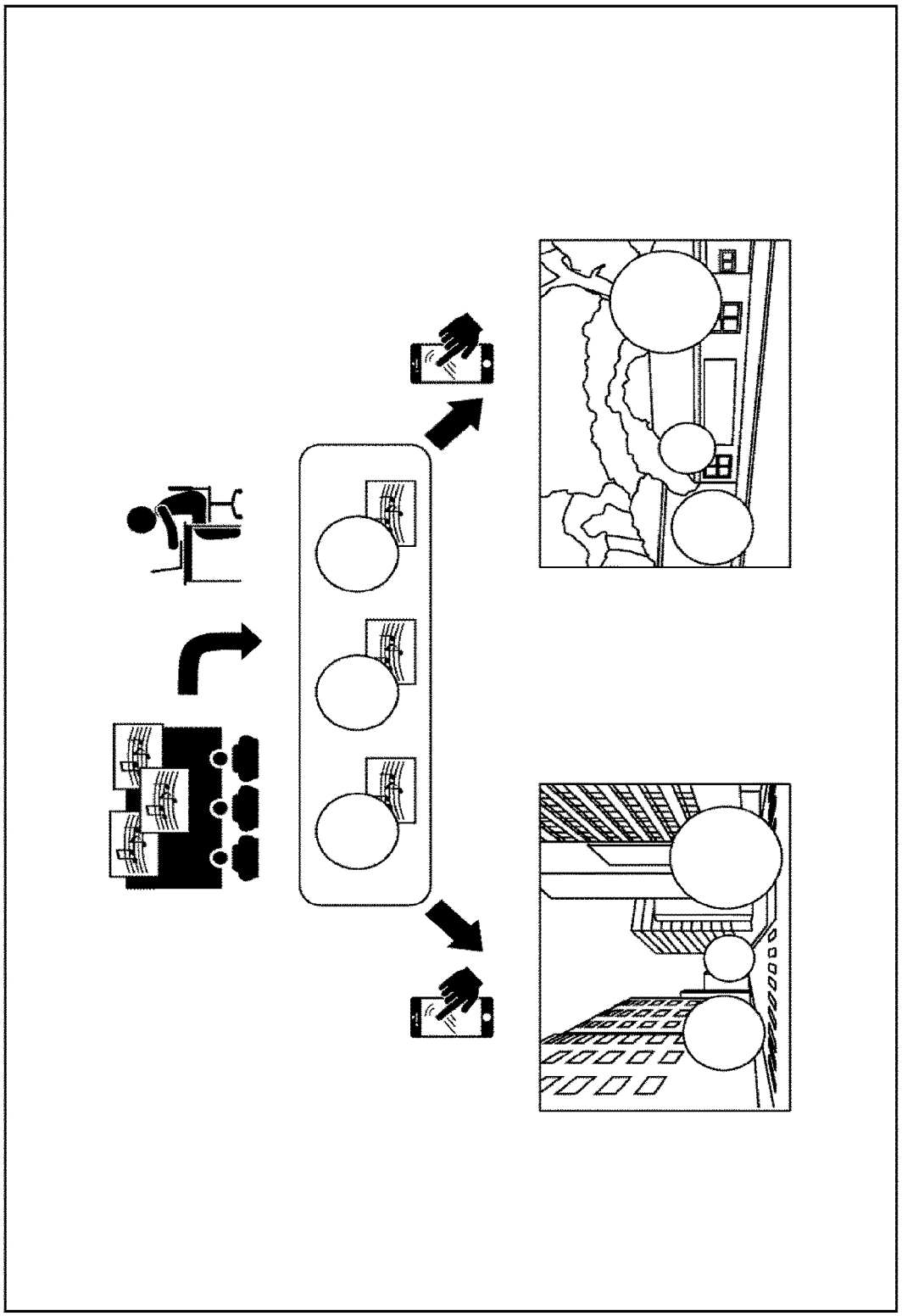
FIG. 1 is a representative diagram illustrating an outline of the present technology.

Hereinafter, embodiments of the present technology will be described with reference to the drawings. Note that, the description will be given in the following order.
1. First embodiment: basic configuration
2. Second embodiment: generation of scenario DB
3. Third embodiment: generation of different media
4. Fourth embodiment: generation of user scenario DB
5. Fifth embodiment: configuration of sensing means
6. Sixth embodiment: configuration in a case where an activation condition is set to a plurality of pieces of context information
7. Seventh embodiment: configuration in which a plurality of devices is in conjunction with each other
8. Eighth embodiment: configuration in cooperation with another service
9. Ninth embodiment: configuration in which a scenario is shared
10. Tenth embodiment: another example of data
11. Eleventh embodiment: configuration using user feedback
12. Modifications
13. Configuration of computer Representative Diagram FIG. 1 is a representative diagram illustrating an outline of the present technology.

The present technology provides better user experience by enabling users who live in different places to use one scenario.

In FIG. 1, a creator creates a scenario by giving context information that is information on context to a content element that is an element constituting content, by using an editing device such as a personal computer. The scenario created in this way is distributed via a server on the Internet.

The users each operate a reproduction device such as a smartphone to select a desired scenario from among distributed scenarios and set an activation condition that is a condition when a content element is presented, thereby creating user scenarios, respectively. That is, in FIG. 1, since two users of a user A and a user B set their own activation conditions for the same scenario, the activation conditions of user scenarios are different for respective users.

The same scenario is therefore implemented in different places for respective users, and the users who live in different places can use one scenario.

1. First Embodiment

Configuration Example of System

Figure 2:
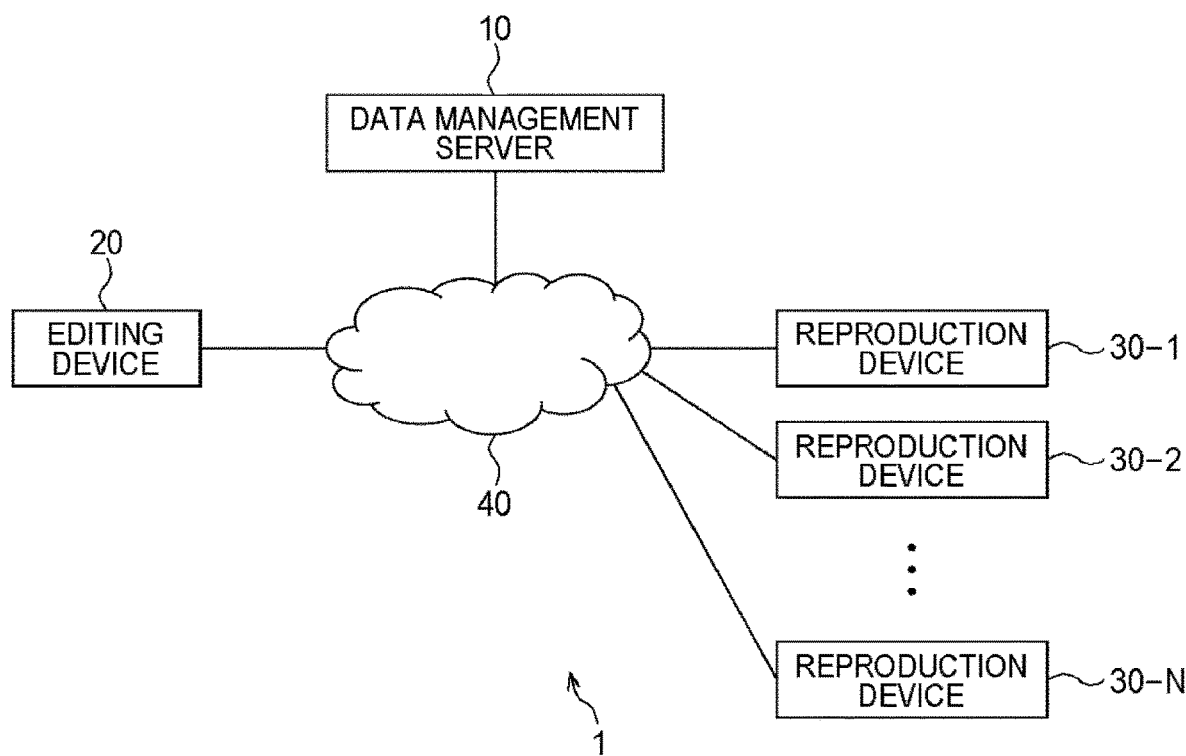
FIG. 2 is a diagram illustrating an example of a configuration of an information processing system to which the present technology is applied.

FIG. 2 illustrates an example of a configuration of an information processing system to which the present technology is applied.

An information processing system 1 includes a data management server 10, an editing device 20, and reproduction devices 30-1 to 30-N(N: an integer of greater than or equal to 1). Furthermore, in the information processing system 1, the data management server 10, the editing device 20, and the reproduction devices 30-1 to 20-N are connected to each other via Internet 40.

The data management server 10 includes one or a plurality of servers for managing data such as a database, and is installed in a data center or the like.

The editing device 20 includes an information device such as a personal computer, and is managed by a business operator that provides services. The editing device 20 is connected to the data management server 10 via the Internet 40, performs editing processing on the data accumulated in the database, and generates a scenario.

The reproduction device 30-1 includes information devices such as a smartphone, a mobile phone, a tablet terminal, a wearable device, a portable music player, a game machine, and a personal computer.

The reproduction device 30-1 is connected to the data management server 10 via the Internet 40, and sets an activation condition for the scenario to generate a user scenario. The reproduction device 30-1 reproduces a content element depending on the activation condition on the basis of the user scenario.

The reproduction devices 30-2 to 30-N include information devices such as smartphones similarly to the reproduction device 30-1, and reproduce a content element depending on an activation condition on the basis of a generated user scenario.

Note that, in the following description, the reproduction devices 30-1 to 20-N each will be simply referred to as a reproduction device 30 in a case where it is not particularly necessary to distinguish them.

Configuration Example of Data Management Server

Figure 3:
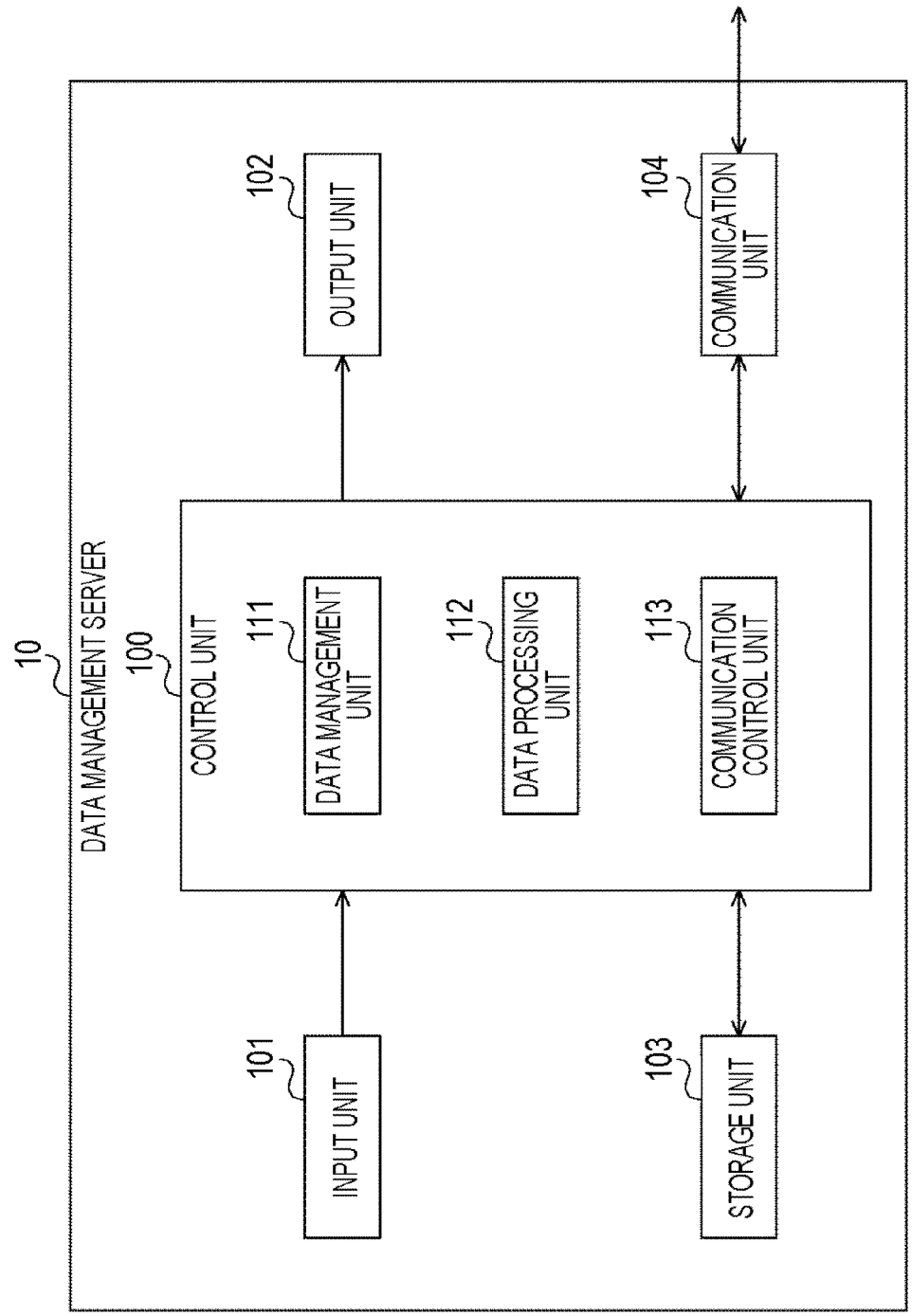
FIG. 3 is a diagram illustrating an example of a configuration of a data management server of FIG. 2.

FIG. 3 illustrates an example of a configuration of the data management server 10 of FIG. 2.

In FIG. 3, the data management server 10 includes a control unit 100, an input unit 101, an output unit 102, a storage unit 103, and a communication unit 104.

The control unit 100 includes a processor such as a central processing unit (CPU). The control unit 100 is a main processing device that controls operation of each unit and performs various types of arithmetic processing.

The input unit 101 includes a mouse, a keyboard, physical buttons, and the like. The input unit 101 supplies an operation signal depending on operation of the user to the control unit 100.

The output unit 102 includes a display, a speaker, and the like. The output unit 102 outputs video, audio, and the like in accordance with control of the control unit 100.

The storage unit 103 includes a large capacity storage device such as a semiconductor memory including a non-volatile memory or a volatile memory, or a hard disk drive (HDD). The storage unit 103 stores various data in accordance with control of the control unit 100.

The communication unit 104 includes a communication module or the like adaptable to wireless communication or wired communication conforming to a predetermined standard. The communication unit 104 communicates with other devices in accordance with control of the control unit 100.

Furthermore, the control unit 100 includes a data management unit 111, a data processing unit 112, and a communication control unit 113.

The data management unit 111 manages various databases, content data, and the like stored in the storage unit 103.

The data processing unit 112 performs data processing on various data. The data processing includes processing related to content, processing related to machine learning, and the like.

The communication control unit 113 controls the communication unit 104 to exchange various data with the editing device 20 or the reproduction device 30 via the Internet 40.

Note that, the configuration of the data management server 10 illustrated in FIG. 3 is an example, and some components may be removed or other components such as a dedicated image processing unit may be added.

(Configuration example of editing device)

Figure 4:
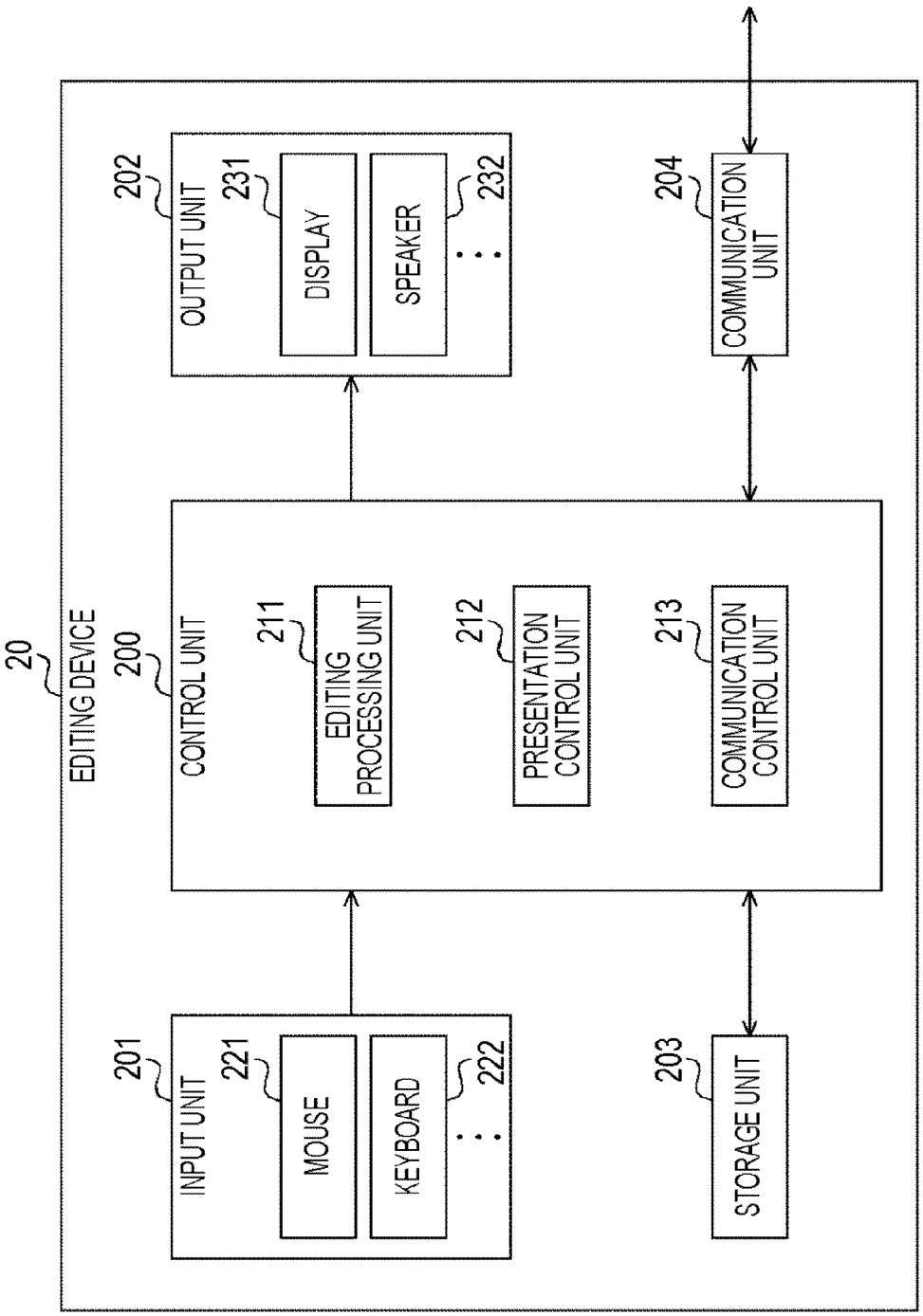
FIG. 4 is a diagram illustrating an example of a configuration of an editing device of FIG. 2.

FIG. 4 illustrates an example of a configuration of the editing device 20 of FIG. 2.

In FIG. 4, the editing device 20 includes a control unit 200, an input unit 201, an output unit 202, a storage unit 203, and a communication unit 204.

The control unit 200 includes a processor such as a CPU. The control unit 200 is a main processing device that controls operation of each unit and performs various types of arithmetic processing.

The input unit 201 includes an input device such as a mouse 221 or a keyboard 222. The input unit 201 supplies an operation signal depending on operation of the user to the control unit 200.

The output unit 202 includes an output device such as a display 231 or a speaker 232. The output unit 202 outputs information depending on various data in accordance with control of the control unit 200.

The display 231 displays a video depending on the video data from the control unit 200. The speaker 232 outputs a voice (sound) depending on the audio data from the control unit 200.

The storage unit 203 includes a semiconductor memory such as a non-volatile memory. The storage unit 203 stores various data in accordance with control of the control unit 200.

The communication unit 204 includes a communication module or the like adaptable to wireless communication or wired communication conforming to a predetermined standard. The communication unit 204 communicates with other devices in accordance with control of the control unit 200.

Furthermore, the control unit 200 includes an editing processing unit 211, a presentation control unit 212, and a communication control unit 213.

The editing processing unit 211 performs editing processing on various data. The editing processing includes processing related to a scenario to be described later.

The presentation control unit 212 controls the output unit 202 to control presentation of information such as video and audio depending on data such as video data and audio data.

The communication control unit 213 controls the communication unit 204 to exchange various data with the data management server 10 via the Internet 40.

Note that, the configuration of the editing device 20 illustrated in FIG. 4 is an example, and some components may be removed or other components may be added.

(Configuration example of reproduction device)

Figure 5:
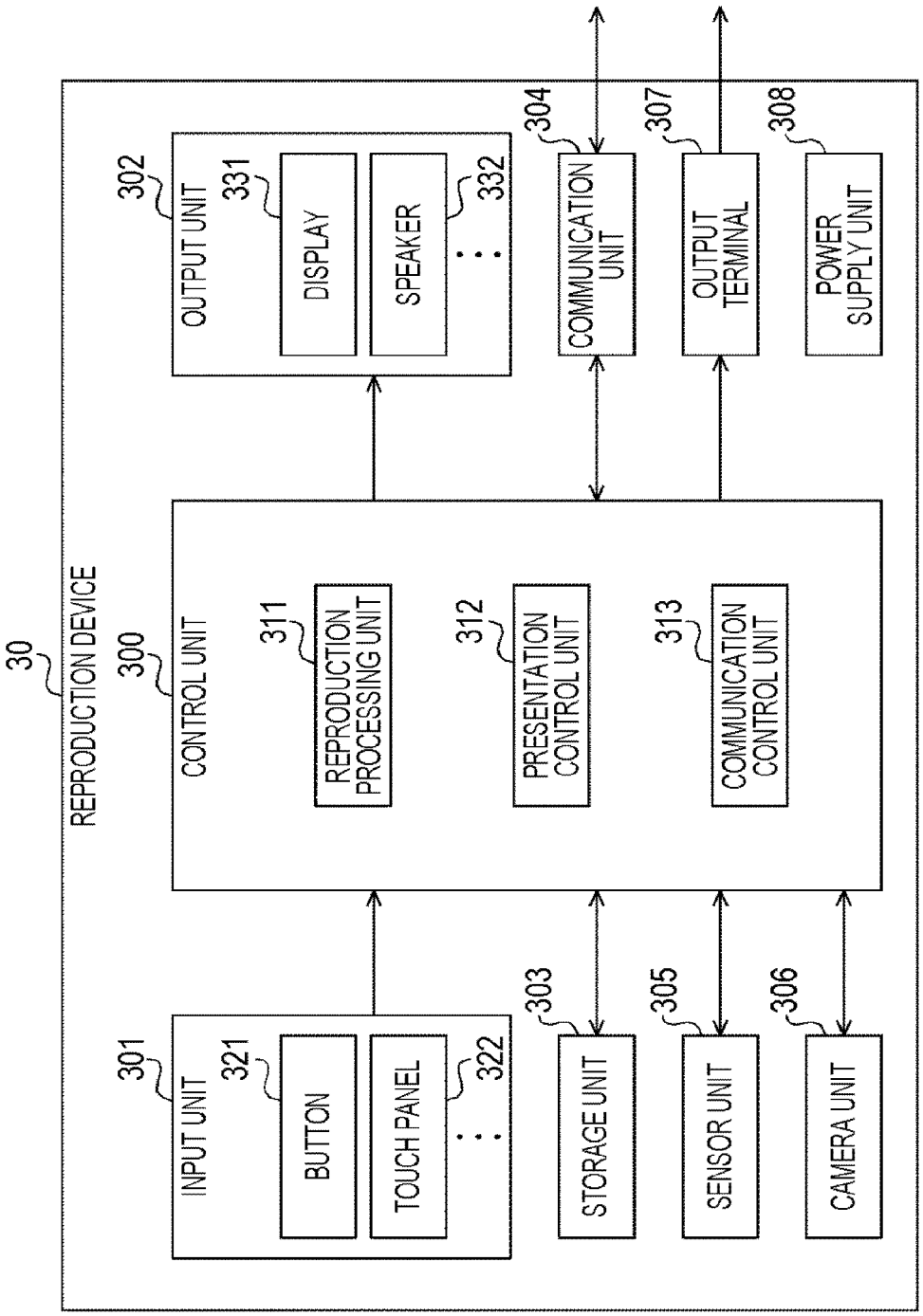
FIG. 5 is a diagram illustrating an example of a configuration of a reproduction device of FIG. 2.

FIG. 5 illustrates an example of a configuration of the reproduction device 30 of FIG. 2.

In FIG. 5, the reproduction device 30 includes a control unit 300, an input unit 301, an output unit 302, a storage unit 303, a communication unit 304, a sensor unit 305, a camera unit 306, an output terminal 307, and a power supply unit 308.

The control unit 300 includes a processor such as a CPU. The control unit 300 is a main processing device that controls operation of each unit and performs various types of arithmetic processing.

The input unit 301 includes an input device such as a physical button 321, a touch panel 322, or a microphone. The input unit 301 supplies an operation signal depending on operation of the user to the control unit 300.

The output unit 302 includes an output device such as a display 331 and a speaker 332. The output unit 302 outputs information depending on various data in accordance with control of the control unit 300.

The display 331 displays a video depending on the video data from the control unit 300. The speaker 332 outputs a voice (sound) depending on the audio data from the control unit 300.

The storage unit 303 includes a semiconductor memory such as a non-volatile memory. The storage unit 303 stores various data in accordance with control of the control unit 300.

The communication unit 304 is configured as a communication module adaptable to wireless communication such as wireless local area network (LAN), cellular communication (for example, LTE-Advanced, 5G, or the like), or Bluetooth (registered trademark), or wired communication. The communication unit 304 communicates with other devices in accordance with control of the control unit 300.

The sensor unit 305 includes various sensor devices and the like. The sensor unit 305 performs sensing of the user, surroundings thereof, and the like, and supplies sensor data depending on sensing results to the control unit 300.

Here, the sensor unit 305 can include: an inertial sensor that measures a position, orientation, acceleration, and speed; a biometric sensor that measures information such as a heart rate, a body temperature, or a posture of a living thing; a magnetic sensor that measures a magnitude and a direction of a magnetic field (magnetic field); a proximity sensor that measures a nearby object; and the like. Note that, instead of the inertial sensor, an acceleration sensor that measures acceleration, or a gyro sensor that measures an angle (posture), an angular velocity, or an angular acceleration may be used.

The camera unit 306 includes an optical system, an image sensor, a signal processing circuit, and the like. The camera unit 306 supplies imaging data obtained by imaging a subject to the control unit 300.

The output terminal 307 is connected to a device including an electroacoustic transducer such as an earphone or headphones via a cable. The output terminal 307 outputs data such as audio data from the control unit 300. Note that, connection with the device such as the earphone may be made not only by wire but also by wireless communication such as Bluetooth (registered trademark).

The power supply unit 308 includes a battery such as a secondary battery and a power supply management circuit, and supplies power to each unit including the control unit 300.

Furthermore, the control unit 300 includes a reproduction processing unit 311, a presentation control unit 312, and a communication control unit 313.

The reproduction processing unit 311 performs reproduction processing related to various content data. The reproduction processing includes processing of reproducing data such as (a part of) music and an utterance of a character.

The presentation control unit 312 controls the output unit 302 to control presentation of information such as video and audio depending on data such as video data and audio data. Furthermore, the presentation control unit 312 controls presentation of the data reproduced by the reproduction processing unit 311.

The communication control unit 313 controls the communication unit 304 to exchange various data with the data management server 10 via the Internet 40.

Note that, the configuration of the reproduction device 30 illustrated in FIG. 5 is an example, and some components such as the camera unit 306 and the output terminal 307 may be removed, or other components such as an input terminal may be added.

The information processing system 1 is configured as described above. Hereinafter, a description will be given of specific details of information processing executed by the information processing system 1.

Overall Image of Processing

First, an overall image of information processing in a first embodiment will be described with reference to FIG. 6.

In the data management server 10, the storage unit 103 stores databases of a content element-context information DB 151, a scenario DB 152, and a user scenario DB 153. Furthermore, the storage unit 103 also stores data of content elements.

The content element-context information DB 151 is a database that stores a table in which a content element and context information are associated with each other.

Here, the content element is an element (element) constituting content. For example, the content element includes a speech, a BGM, a sound effect, an environmental sound, music, an image, and the like generated from content such as video or music.

Furthermore, the context information is information on context given to the content element. For example, context information given in accordance with a situation in which use of a content element is assumed is associated with the content element, and accumulated in the content element-context information DB 151. Note that, here, context information may be automatically given to a content element using a machine learning technology.

The scenario DB 152 is a database that stores scenarios.

Here, the scenario is obtained by packaging a data set (hereinafter, also referred to as "content element-context information") including a combination of a content element and context information on the basis of a certain theme.

Note that, the scenario DB 152 may store device function information regarding a function of the reproduction device 30. By using the device function information, processing can be executed depending on the function of one or a plurality of reproduction devices 30.

The user scenario DB 153 is a database that stores user scenarios.

Here, the user scenario is a scenario obtained by setting an activation condition to a scenario obtained by packaging a data set including a content element and context information.

That is, for each user, the activation condition is made settable for at least the context information, and the user scenario including the data set of the context information and the activation condition is made generatable. In other words, it can be said that the user scenario is a user-defined scenario.

The activation condition is a condition when a content element associated with context information to be a data set is presented to the user. As the activation condition, for example, spatial conditions such as a position and a place, temporal conditions, actions of the user, and the like can be set.

Figure 6:
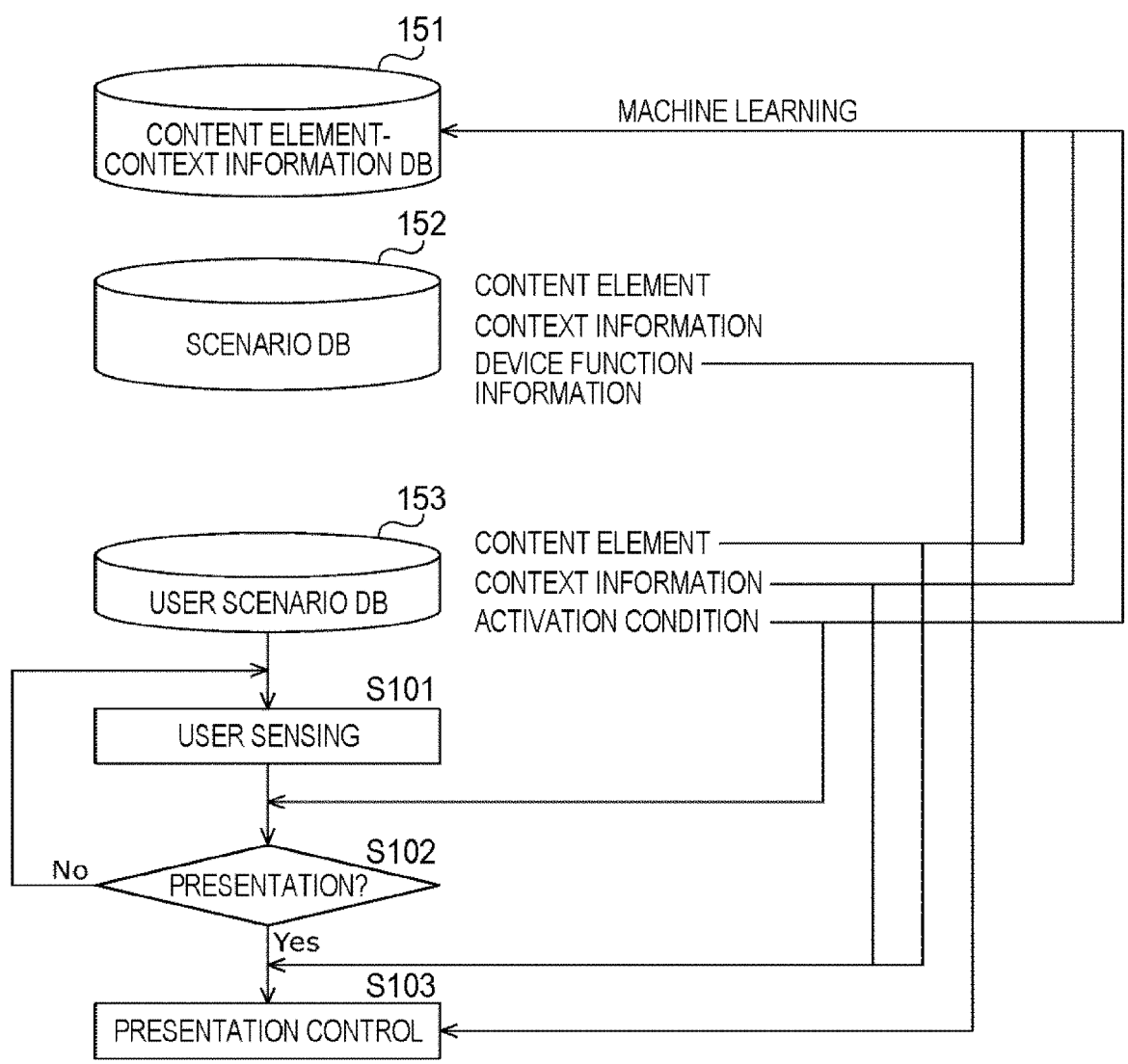
FIG. 6 is a diagram illustrating an overall image of information processing in a first embodiment.

In the information processing system 1, the data management server 10 manages the databases described above, and the editing device 20 and the reproduction device 30 access the information stored in the databases, whereby the processing as illustrated in FIG. 6 is performed.

That is, the reproduction device 30 performs sensing on the user in real time (S101), and it is determined whether or not sensor data obtained by the sensing satisfies the activation condition set in the user scenario (S102).

Then, when the sensor data satisfies the activation condition ("Yes" in S102), the content element associated with the context information depending on the activation condition is presented to the user (S103).

For example, as a scenario, in a case where context information that is "home" is associated with a content element that is "character utterance", a case is assumed where an activation condition that is "a radius of 10 m from the center of the home" is set for the context information. In this case, on the basis of the sensor data (position information), when the user comes to a position of 10 m from the home, an utterance of a desired character is output from the reproduction device 30 possessed by the user.

(Flow of processing)

Next, a detailed flow of the information processing in the first embodiment will be described with reference to a flowchart of FIG. 7.

Note that, in the processing illustrated in FIG. 7, the processing in steps S121 to S127 is mainly processing when a scenario generation tool is executed by (the control unit 200 of) the editing device 20, and the processing in steps S128 to S133 is mainly processing when a user scenario generation tool is executed by (the control unit 300 of) the reproduction device 30.

That is, a person who operates the scenario generation tool is the creator or the like who creates a scenario with the editing device 20, and, on the other hand, a person who operates the user scenario generation tool is the user or the like who possesses the reproduction device 30, and operators of the respective tools are different from each other, or operation timings are different from each other even for the same operator.

In the editing device 20, content is acquired by the scenario generation tool (S121), and a candidate for the content element is presented (S122). Then, the content element is cut out from the content in accordance with operation of the creator (S123).

Furthermore, in the editing device 20, a candidate for the context information is presented by the scenario generation tool (S124). Then, context information is given to the content element in accordance with operation of the creator (S125). However, here, the context information may be automatically provided using a machine learning technology, not limited to the operation of the creator.

Note that, the content element and the context information associated with each other in this way are transmitted to the data management server 10 and accumulated in the content element-context information DB 151.

In the editing device 20, a scenario depending on the operation of the creator is generated by the scenario generation tool (S126), and the scenario is saved (S127).

That is, the scenario generated by the scenario generation tool is transmitted to the data management server 10 and accumulated in the scenario DB 152. The scenario accumulated in the scenario DB 152 can be distributed via the Internet 40.

On the other hand, in the reproduction device 30, the scenario distributed from the data management server 10 is acquired by the user scenario generation tool (S128).

Then, in the reproduction device 30, an activation condition is given in accordance with operation of the user (S129). As a result, a user scenario depending on operation of the user is generated from the scenario, and the user scenario is saved (S130).

The user scenario generated by the user scenario generation tool is transmitted to the data management server 10 and accumulated in the user scenario DB 153. As a result, the user scenario can be shared with other users and the like.

Here, in a case where a scenario is further added ("Yes" in S131), the processing in steps S128 to S130 described above is repeated.

Furthermore, in the reproduction device 30, the created user scenario can be activated (S132) and evaluated (S133) by the user scenario generation tool.

Note that, details of the scenario generation tool will be described later with reference to FIGS. 14 to 17. Furthermore, details of the user scenario generation tool will be described later with reference to FIGS. 21 to 25 and FIGS. 26 to 29.

The detailed flow of the information processing has been described above.

Example of Database

Next, examples of the database managed by the data management server 10 will be described with reference to FIGS. 8 to 10.

As illustrated in FIG. 8, a data set including a combination of a content element and context information is accumulated in the scenario DB 152 in accordance with operation on the user scenario generation tool. For example, in FIG. 8, context information that is "home" is associated with content elements that are "character utterance #1" and "BGM #1".

Furthermore, as illustrated in FIG. 9, in the user scenario DB 153, together with a data set including a combination of a content element and context information, an activation condition given to the data set is accumulated in accordance with operation on the user scenario generation tool.

For example, in FIG. 9, activation conditions that are "center (35.631466, 139.743660)" and "radius 10 m" are given to the content elements that are "character utterance #1" and "BGM #1" and the context information that is "home". However, a and b at the center (a, b) mean latitude (north latitude) and longitude (east longitude), and represent an activation range of a content element.

Note that, the configuration of the database illustrated in FIGS. 8 and 9 is an example, and other configurations may be used. For example, as illustrated in FIG. 10, common context information can be given to different works (For example, a work A which is "movie", a work B which is "animation", and a work C which is "literature recitation").

For example, in FIG. 10, context information that is "home" is associated with each of content elements that are "BGM #2" of the work A, "character utterance #1" and "BGM #1" of the work B, and "recitation #1" of the work C.

The first embodiment has been described above. In the first embodiment, the context information is associated with the content element in advance, the activation condition can be set for at least the context information for each user, and the user scenario including the data set of the context information and the activation condition can be generated. Then, when the sensor data obtained by sensing the user at real timing satisfies the activation condition set in the user scenario, the content element associated with the context information depending on the activation condition is presented to the user.

As a result, a view of the world of the scenario can be enjoyed by each user in accordance with the activation condition in the user scenario, and a better user experience can be provided.

2. Second Embodiment

By the way, currently distributed and delivered content includes, for example, formats such as: moving images such as movies, animations, and games; still images such as photographs, paintings, and comics; audio such as music or audio books; and text such as books, and in particular, content having a sense of story (theatrical characteristics) often includes elements such as speeches, effects, and backgrounds.

In a case of considering superimposition on a space of daily life of the user, in addition to presenting the content described above as it is in a format distributed and delivered, re-editing of the content may be performed. As the re-editing of the content, for example, a part of the content is temporally cut out so that the content matches spatial and temporal size of a context in which the user is currently placed, or the elements described above are extracted and presented to match the context.

Figure 11:
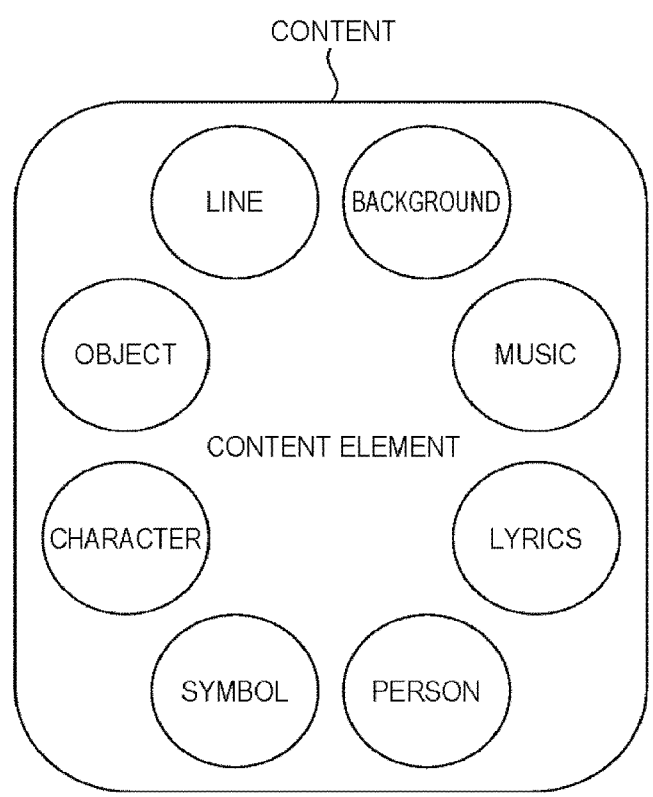
FIG. 11 is a diagram illustrating an example of a content element.

Hereinafter, a part of the re-edited content corresponds to the above-described content element. For example, as illustrated in FIG. 11, content elements of certain content include a speech, a background, music, lyrics, a person, a symbol, a character, an object, and the like.

Information on an assumed context is given to the content element as the above-described context information in a form of expressing the information in a format of text, image, audio, or the like. Furthermore, the relevance information itself of the content element and the context information, or a combination of a plurality of pieces of relevance information is accumulated in the scenario DB 152 as a scenario.

Note that, here, one or more context tags may be given to one content element, or the same context tag may be given to a plurality of content elements.

Figure 12:
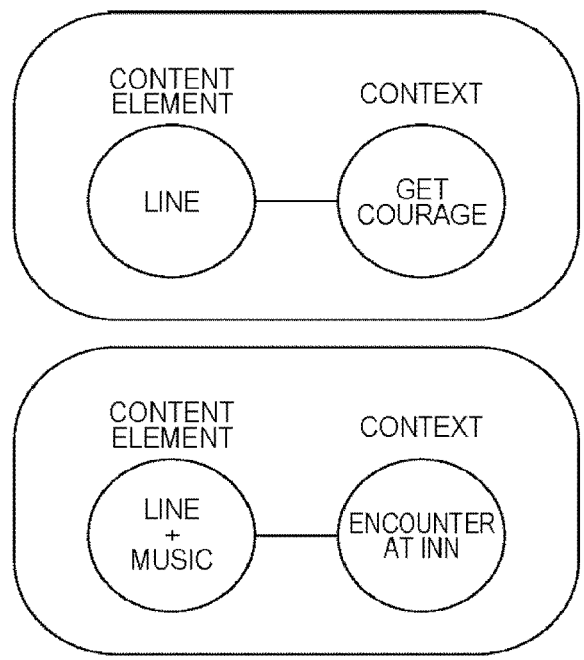
FIG. 12 is a diagram illustrating an example of a combination of a content element and a context.

For example, as illustrated in FIG. 12, only a speech of a certain character is extracted from content including video and audio such as a distributed movie, animation, or game and set as audio content, and as a context in which the speech is assumed to be heard, a text that is "get courage" is given as context information.

Furthermore, for example, as illustrated in FIG. 12, a combination of a speech and background music used in a certain scene is set as one audio content, and a text that is "encounter at an inn" is given as context information.

Then, two data sets of "content element-context information" illustrated in FIG. 12 are accumulated in the content element-context information DB 151.

For example, in audio data, a speech, a sound effect, a background sound, background music, and the like are produced as multi-tracks by different sound sources in the middle of production, and then mixed down to make a form of content to be distributed and delivered. The content element can therefore be extracted from each of these multi-tracks before being mixed down.

Furthermore, for example, also in the image, there is also a method in which a person, a background, an object, and the like are separately imaged and then synthesized, and it is also possible to extract a content element from data before being synthesized.

Generation of the content element and giving of the context information are assumed to be performed in three ways, which are manually, automatically without manual intervention, or a combination thereof. Next, in particular, a case will be described where an automatic process is involved.

There are technologies of identifying an element such as a person, a living thing, an object, a building, or scenery included in a certain scene from image information or audio information included in a moving image or a still image by a machine learning technology, and it is possible to determine a range of the content element by using these technologies and (automatically) generate one or more pieces of context information assumed from identification results or a combination thereof.

A data set of "content element-context information" may be automatically generated from these pieces of information, or setting of "content element-context information" may be manually performed with these pieces of information as reference information.

A scenario is configured by putting together one or more data sets of "content element-context information" according to a certain theme such as a work name that is a source of re-editing, a character appearing, a set stage, and a feeling to be aroused, and is accumulated in the scenario DB 152.

Figure 13:
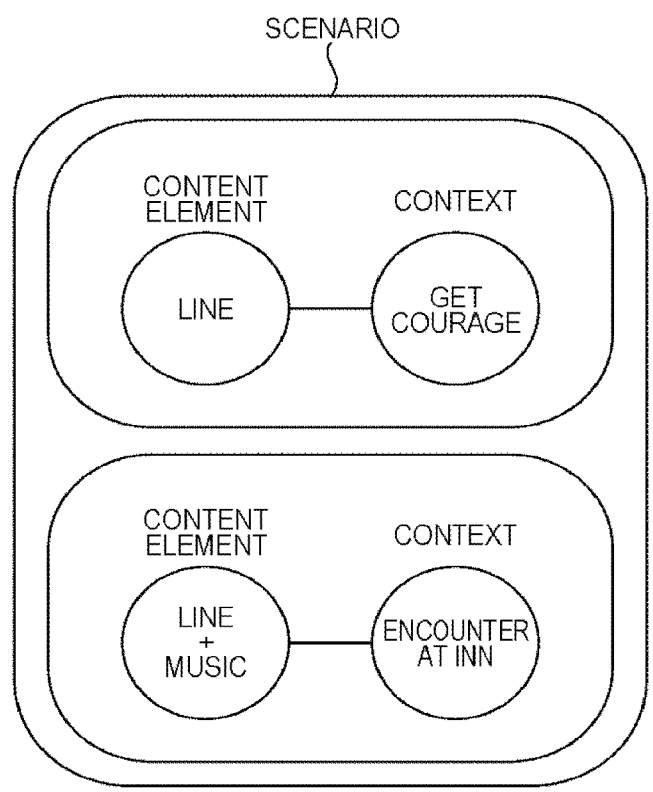
FIG. 13 is a diagram illustrating an example of a scenario.

For example, as illustrated in FIG. 13, the two data sets of "content element-context information" illustrated in FIG. 12 can be accumulated in the scenario DB 152 as a scenario that is "city of departure".

As a result, the user can search for and acquire not only a data set of "content element-context information" desired to be used but also a plurality of data sets of "content element-context information" packaged on the basis of the scenario.

Here, a method has been described of generating a content element from content based on a conventional format already distributed and delivered and giving context information; however, a work corresponding to the content element can be directly created on the premise of a mechanism devised in the present technology.

Example of UI of Scenario Generation Tool

Here, a user interface of the scenario generation tool for generating a scenario will be described with reference to FIGS. 14 to 17. This scenario generation tool is executed by the control unit 200 of the editing device 20 operated by the creator or the like, and various screens are displayed on the display 231.

Figure 14:
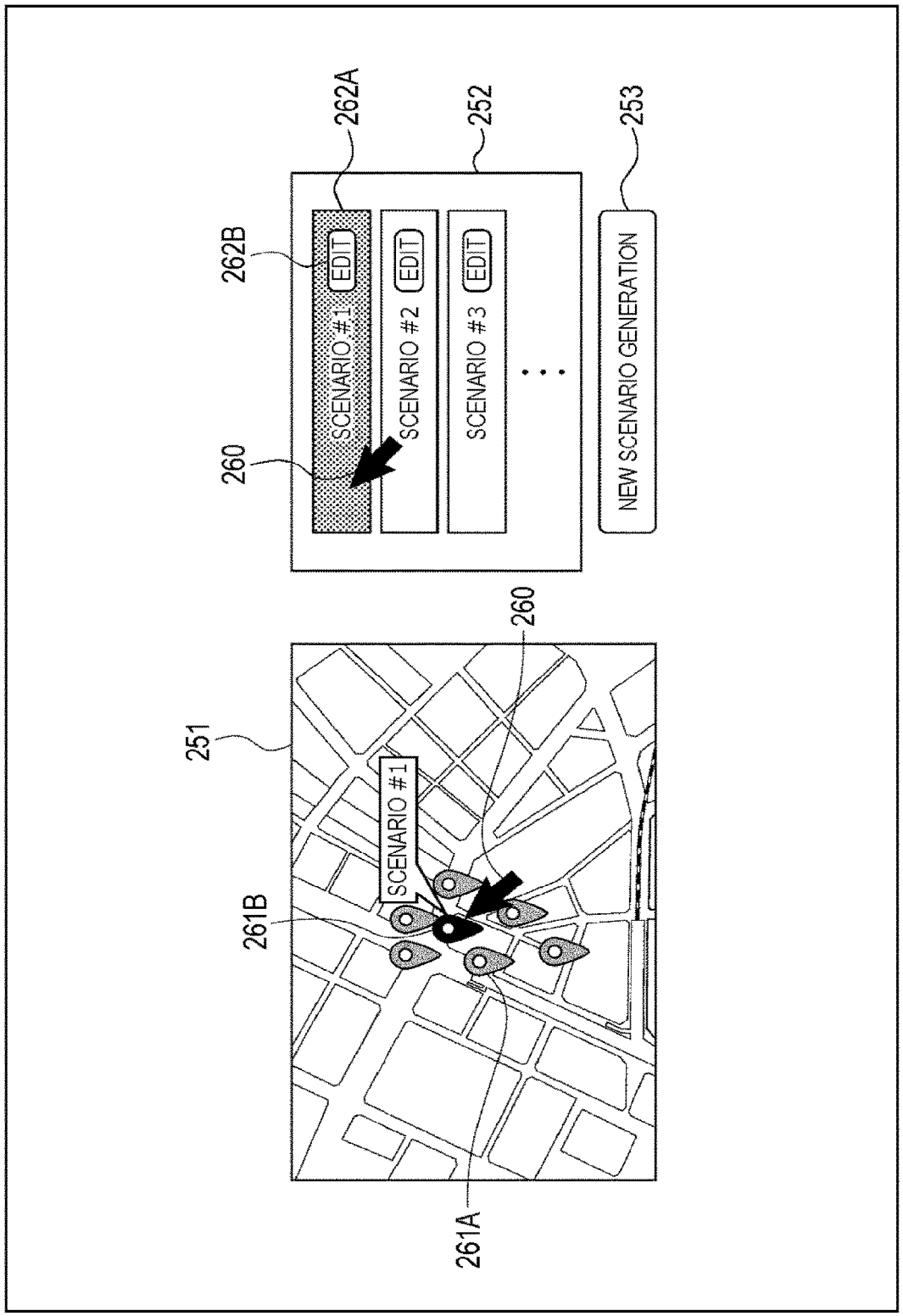
FIG. 14 is a diagram illustrating an example of a scenario selection and new creation screen.

When the scenario generation tool is activated, a scenario selection and new creation screen of FIG. 14 is displayed. The scenario selection and new creation screen includes a map/scenario display area 251, a scenario list 252, and a new scenario creation button 253.

Regarding the scenario, a name is written on a pin 261A representing a position on a map in the map/scenario display area 251, or a scenario display banner 262A is displayed as a list in a predetermined order such as name order in the scenario list 252. Furthermore, the new scenario creation button 253 is operated in a case where a new scenario is created.

The creator can select a desired scenario by performing a click operation on the pin 261A on the map corresponding to a desired area or the scenario display banner 262A of the scenario list 252.

At this time, if attention is paid to a pin 261B among a plurality of the pins 261A, the pin 261B is in a selected state by a cursor 260, and thus a scenario name corresponding to the pin 261B that is "scenario #1" is displayed in a balloon shape. Then, in a case where a click operation is performed on an edit button 262B in a state where the scenario #1 corresponding to the pin 261B is selected, a scenario editing screen of FIG. 15 is displayed.

Figure 15:
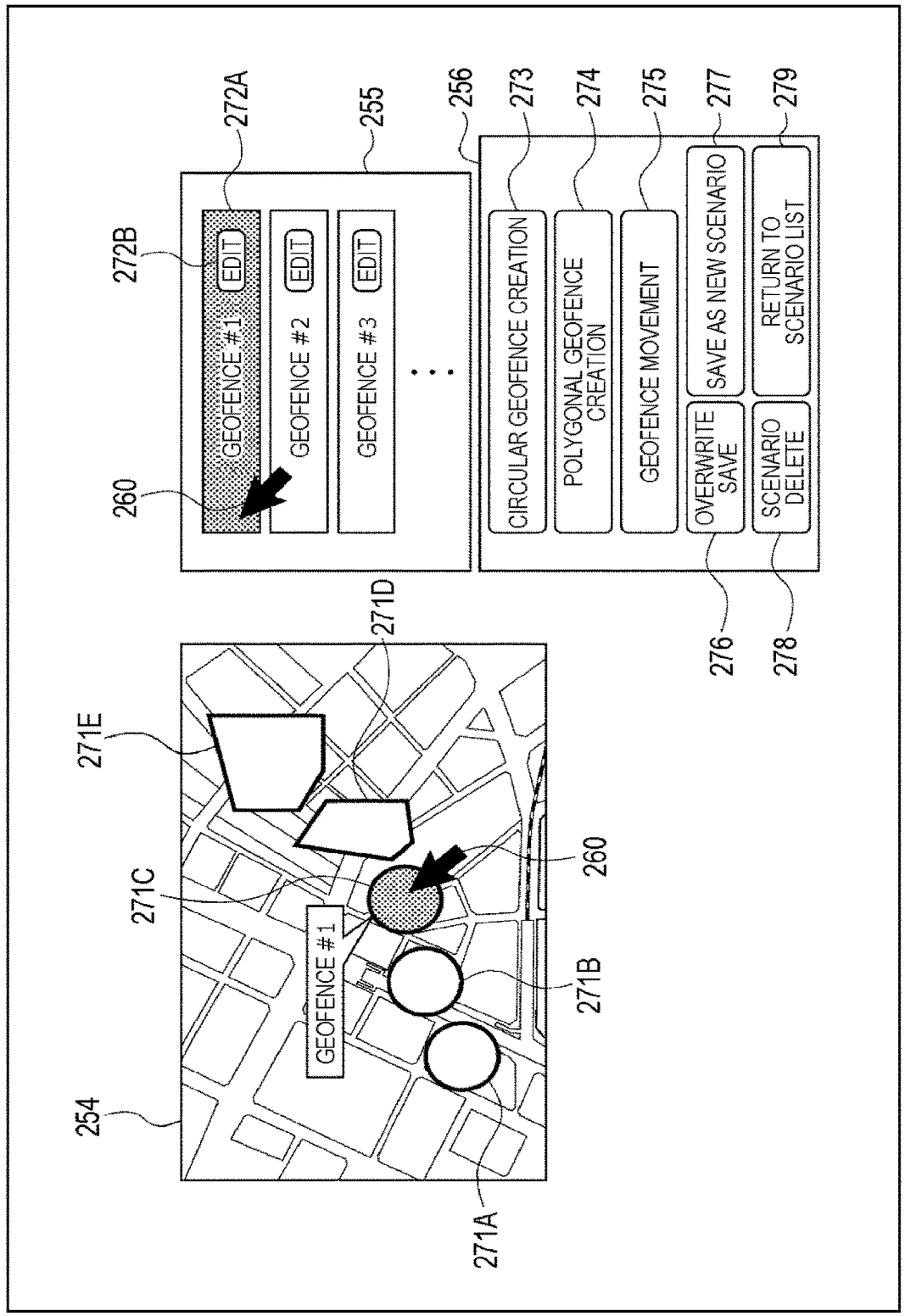
FIG. 15 is a diagram illustrating an example of a scenario editing screen.

The scenario editing screen of FIG. 15 includes a map/geofence display area 254, a geofence list 255, and an editing tool display area 256.

Regarding geofences, names are written on geofence areas 271A to 271E representing areas of the geofences on a map in the map/geofence display area 254, or a geofence display banner 272A is displayed as a list in a predetermined order such as name order in the geofence list 255.

Note that, as shapes of the geofence areas 271A to 271E, various shapes such as a circle and a polygon can be set.

In the map/geofence display area 254, context information given to an activation condition (activation range) for which a default value is set is displayed as text or the like in each geofence, or displayed in a balloon shape when a desired geofence is selected. On the basis of this display, the creator can confirm the context information associated with the activation range of each content element.

As a result, the creator can select a desired geofence by performing a click operation on the geofence areas 271A to 271E on the map corresponding to a desired area or the geofence display banner 272A of the geofence list 255.

The editing tool display area 256 includes a circular geofence creation button 273, a polygonal geofence creation button 274, a geofence movement button 275, an overwrite save button 276, a new save button 277, a delete button 278, and a return button 279.

The circular geofence creation button 273 is operated in a case of creating a geofence having a circular shape. The polygonal geofence creation button 274 is operated in a case of creating a geofence having a polygonal shape. The geofence movement button 275 is operated in a case of moving a desired geofence.

The overwrite save button 276 is operated in a case of overwriting and saving a scenario to be edited onto an existing scenario. The new save button 277 is operated in a case of saving the scenario to be edited as a new scenario. The delete button 278 is operated in a case of deleting the scenario to be edited. The return button 279 is operated in a case of returning to the scenario selection and new creation screen.

Here, if attention is paid to the geofence area 271C with a pattern among the geofence areas 271A to 271E, the geofence area 271C is in the selected state by the cursor 260, so that a geofence name depending on the geofence area 271C that is "geofence #1" may be displayed in a balloon shape, and a content element set for the geofence may be reproduced.

Figure 16:
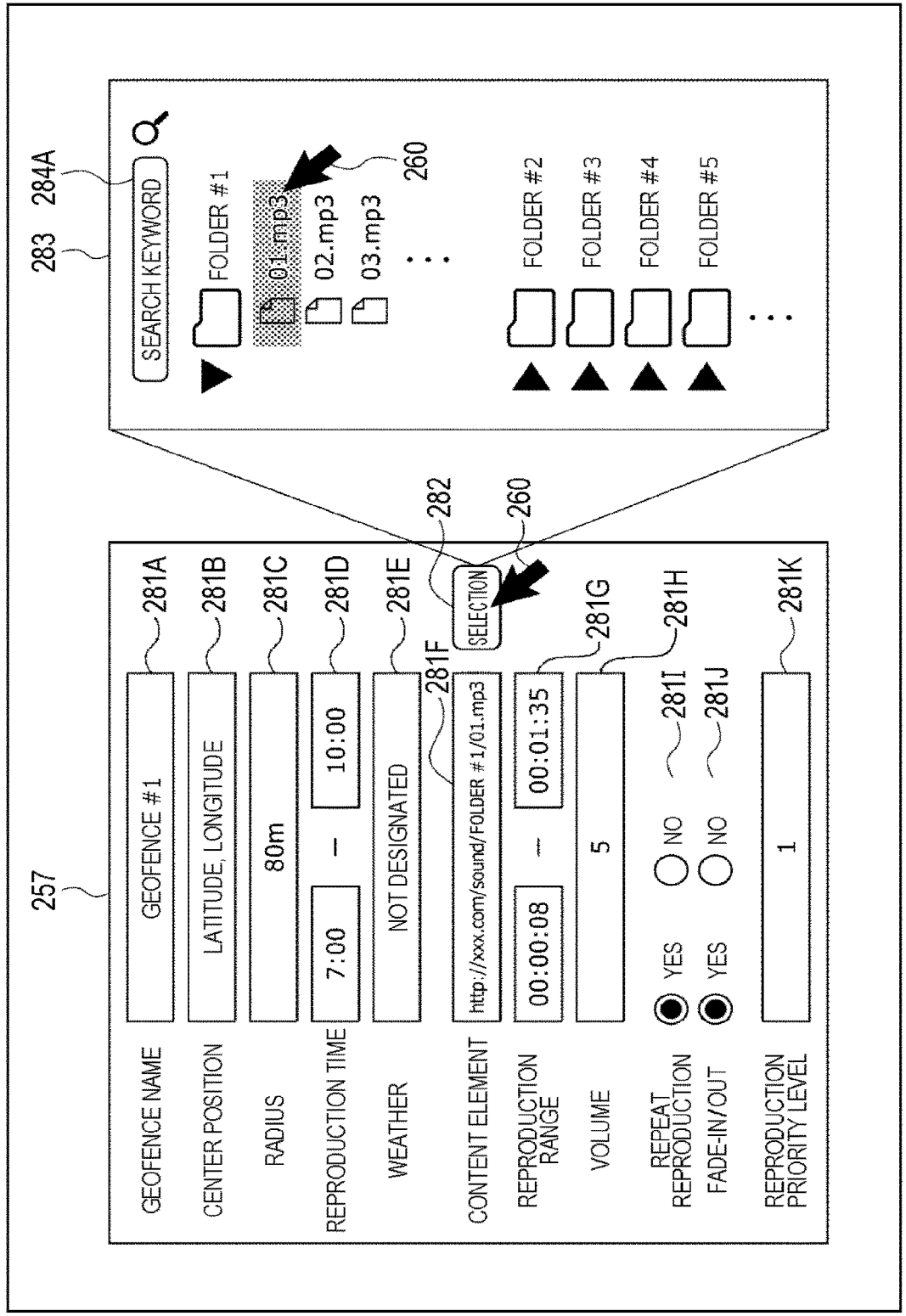
FIG. 16 is a diagram illustrating a first example of a geofence editing screen.

Then, in a case where a click operation is performed on an edit button 272B in a state where the geofence #1 depending on the geofence area 271C is selected, a geofence editing screen of FIG. 16 is displayed.

The geofence editing screen of FIG. 16 includes a geofence detailed setting area 257. The geofence detailed setting area 257 includes, as detailed setting items of the geofence, a geofence name, a center position, a radius, a reproduction time, weather, a content element, a reproduction range, a volume, repeat reproduction, fade-in/out, and a reproduction priority level.

However, the geofence name corresponds to a setting item of the context. Furthermore, the center position, the radius, the reproduction time, and the weather correspond to setting items of the activation condition, and here, default values thereof are set. Moreover, the content element, the reproduction range, the volume, the repeat reproduction, the fade-in/out mode, and the reproduction priority level correspond to setting items of the content element and the reproduction condition, and here, default values thereof are set.

In a geofence name input field 281A, "geofence #1" is input as the geofence name.

In a center position input field 281B and a radius input field 281C, "latitude, longitude" and "80 m" are input as default values of the center position and the radius of a circular geofence.

In a reproduction time input field 281D, "7:00-10:00" is input as a default value of the reproduction time. Note that, since a weather input field 281E is "not designated", a default value of the weather is not set.

In a content element input field 281F, "http:xxx.com/sound/folder#1/01.mp3" is input as a default value of the content element. As an input method for this, a content element selection screen 283 can be used displayed by performing a click operation on a selection button 282.

On the content element selection screen 283, data is displayed of an audio file of the content element stored in the storage unit 103 of the data management server 10. In this example, on the content element selection screen 283, by selecting a desired folder from among folders displayed in a hierarchical structure, a desired audio file in the folder can be selected.

Note that, here, search processing may be performed using a desired keyword input in a search keyword input field 284A as a search condition, and a list may be presented of desired audio files depending on a search result thereof.

In a reproduction range input field 281G and a volume input field 281H, "00:00:08-00:01:35" and "5" are input as default values of the reproduction range and the volume. Note that, the reproduction time and the volume may be automatically input in accordance with the content element.

In a repeat reproduction input field 281I and a fade-in/out input field 281J, "repeat reproduction: yes" and "fade-in/out: yes" are input as default values of the repeat reproduction, fade-in, and fade-out of the audio file.

In a reproduction priority level input field 281K, "1" is input as a default value of the reproduction priority level. As the reproduction priority level, levels can be used such that, in predetermined stages such as three stages of "1" to "3" and five stages of "1" to "5", the lower the numerical value, the higher the priority, and the higher the numerical value, the lower the priority.

Figure 17:
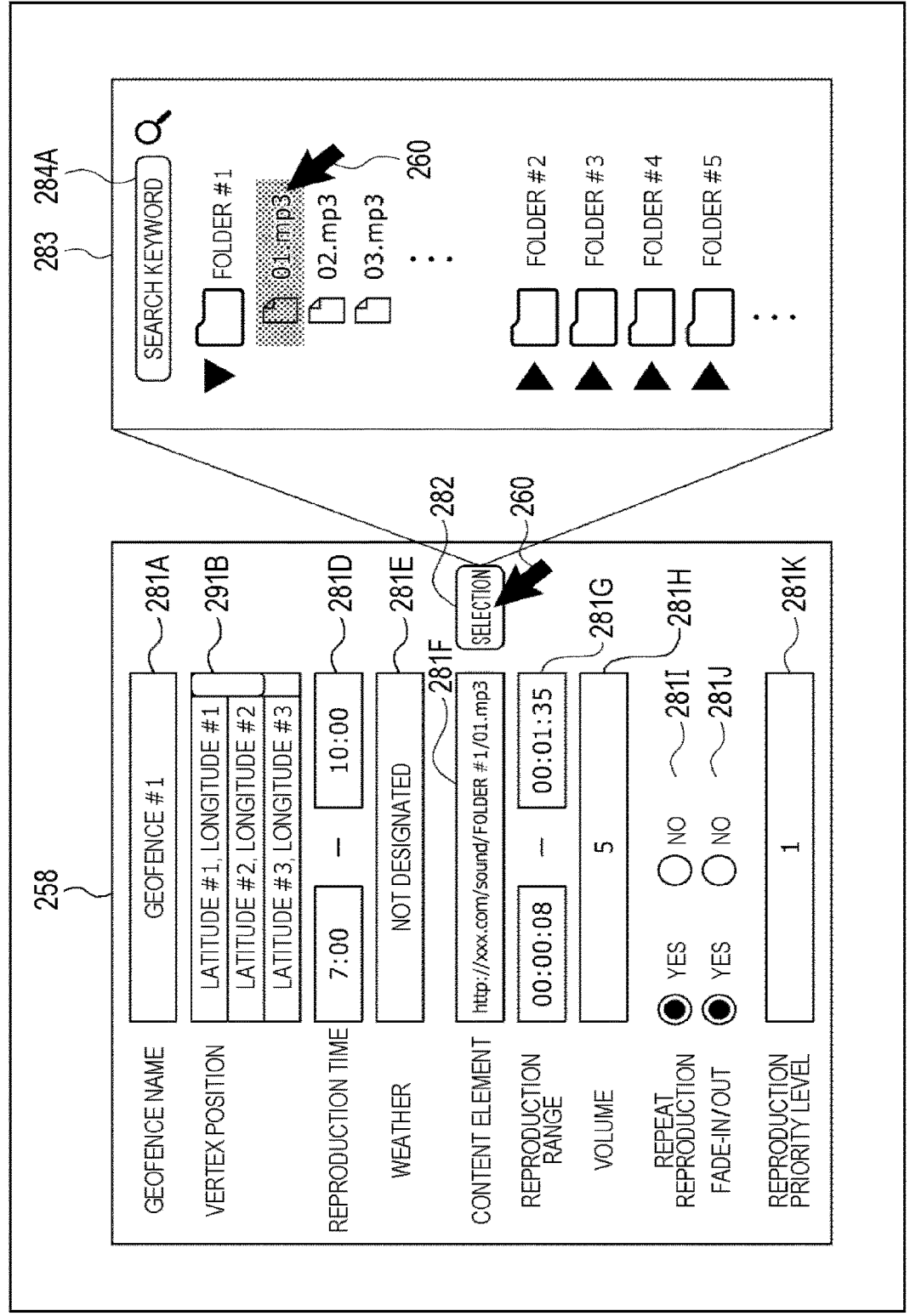
FIG. 17 is a diagram illustrating a second example of the geofence editing screen.

Note that, in the geofence editing screen of FIG. 16, a case is illustrated where the shape of the geofence #1 is circular, but in a case where the shape is a polygon (rectangle), a geofence editing screen of FIG. 17 is displayed.

The geofence editing screen of FIG. 17 is different from the geofence editing screen illustrated in FIG. 16 in that a vertex position of a rectangular geofence is provided as the setting item of the activation condition instead of the center position and the radius of the circular geofence.

Furthermore, in the geofence editing screen of FIG. 17, a vertex position input field 291B including a list box is provided instead of text boxes of the center position input field 281B and the radius input field 281C of FIG. 16.

In this example, in the vertex position input field 291B, a plurality of combinations of latitude and longitude is displayed as a list, such as latitude #1 and longitude #1, latitude #2 and longitude #2, and latitude #3 and longitude #3, so that a combination of desired latitude and longitude selected from the list is set as a default value of the vertex position of the rectangular geofence.

Note that, the user interface of the scenario generation tool described above is an example, and another user interface may be used, such as using another widget instead of the text box or the radio button.

For example, in the geofence editing screen, a drop-down list, a combo box, or the like can be used instead of the text box constituting the reproduction time input field 281D, the weather input field 281E, the volume input field 281H, or the reproduction priority level input field 281K, or the list box constituting the vertex position input field 291B.

(Overall image of processing)

Next, an overall image of information processing in a second embodiment will be described with reference to FIG. 18.

Figure 18:
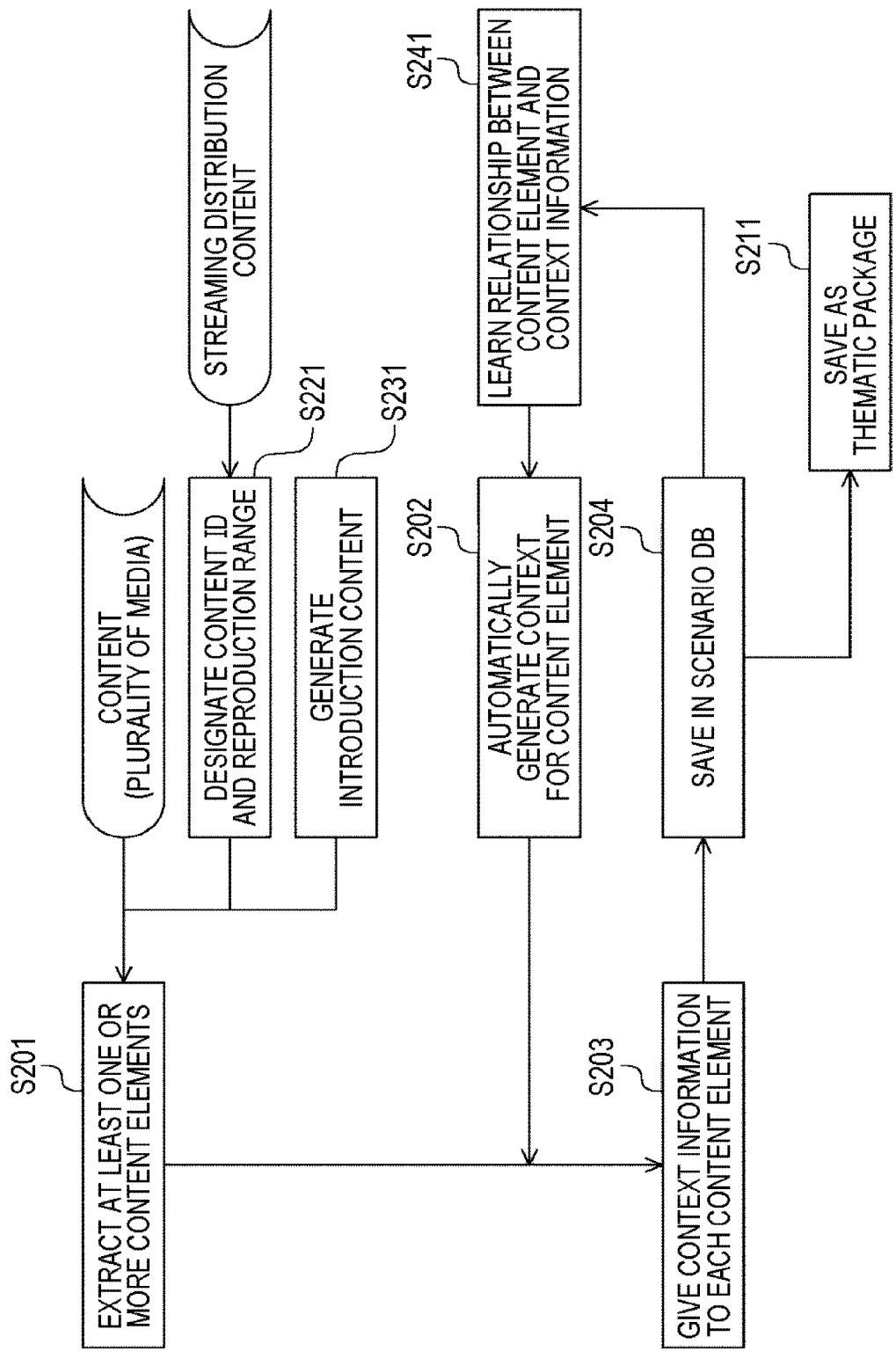
FIG. 18 is a diagram illustrating an overall image of information processing in a second embodiment.

The information processing illustrated in FIG. 18 is implemented by at least cooperation between (the control unit 100 of) the data management server 10 and (the control unit 200 of) the editing device 20 in the information processing system 1. That is, this information processing is executed by at least one of the control unit 100 or the control unit 200.

As illustrated in FIG. 18, in the information processing system 1, one or more content elements (for example, "speech of a character") including at least some of media are extracted from content (a movie, an animation, a game, or the like) including a plurality of media (video, audio, and the like) (S201), and a context (for example, a context in which the speech is assumed to be heard) is generated for the content elements (S202).

Then, in the information processing system 1, context information (for example, "get courage") is given to each content element (for example, "speech of a character") (S203). As a result, the content element and the context information are accumulated in association with each other in the content element-context information DB 151.

Furthermore, one or more data sets of "content element-context information" is accumulated in the scenario DB 152 as a scenario (for example, "city of departure") (S204). Here, the data set can be packaged on the basis of a certain theme (work name that is a source of re-editing, a set stage, a feeling to be aroused, or the like) and accumulated in the scenario DB 152 (S211).

Here, as the content element, for example, a part (a part of music or the like) of streaming distribution content (music or the like distributed by a music streaming distribution service) can be included. At this time, to identify the part of the streaming distribution content, a content ID and a reproduction range of the content may be designated (S221), and information indicating the content ID and the reproduction range may be accumulated in the content element-context information DB 151 in association with target context information.

Furthermore, for the content element, introduction content (another content element) of a character or the like may be generated (S231), and the introduction content may be presented before the content element is reproduced. For example, before music (content element) distributed from a music streaming distribution service is reproduced, an introductory sentence can be presented by a specific voice character (for example, a character of a disc jockey (DJ)) corresponding to the context information.

Moreover, by performing machine learning on a relationship between the content element and the context information accumulated in the content element-context information DB 151 (S241), context information can be automatically given to a new content element.

Here, as a machine learning technology, various methods such as a neural network (NN) can be used, and it is possible to determine a range of a content element by using, for example, a technology of identifying an element such as a person, a living thing, an object, a building, or scenery included in a certain scene from image information or audio information included in a moving image or a still image, and automatically generate one or more pieces of context information assumed from identification results or a combination thereof.

The second embodiment has been described above.

3. Third Embodiment

By the way, in a case where a combination of a content element and context information is generated from content including only text such as a novel of an electronic book, it is possible to use extracted text itself as the content element, and, for example, display the text as a character image on a display device such as a public display or AR glasses as a character image, but voice (sound) may be used. Note that, the AR glasses are glasses-type devices (devices) adaptable to augmented reality (AR).

That is, audio data can be generated from text data used as a content element by using a Text To Speech (TTS) technology, and the audio data can be a content element.

Furthermore, search for or synthesis of data such as audio data or image data accompanied by a related impression (image) may be performed, for example, from text constituting a word or a sentence using a machine learning technology, and the data may be used as a content element.

On the other hand, for content including only audio data and image data, search for or synthesis of text constituting a related word or sentence may be performed by using a machine learning technology, and the text may be used as a content element. That is, here, it is possible to add a detail that is not included in the existing content or add an expression in another modal that is not included in the original content, such as tactile sense.

Note that, the TTS technology is an example of a speech synthesis technology for artificially creating human speech, and speech may be generated using other technologies. Alternatively, a recording of recitation by a person may be used. Furthermore, in the above description, the case of using the machine learning technology has been described, but data as a content element may be generated by separately analyzing acquired data.

Overall Image of Processing

Next, an overall image of information processing in a third embodiment will be described with reference to FIG. 19.

Figure 19:
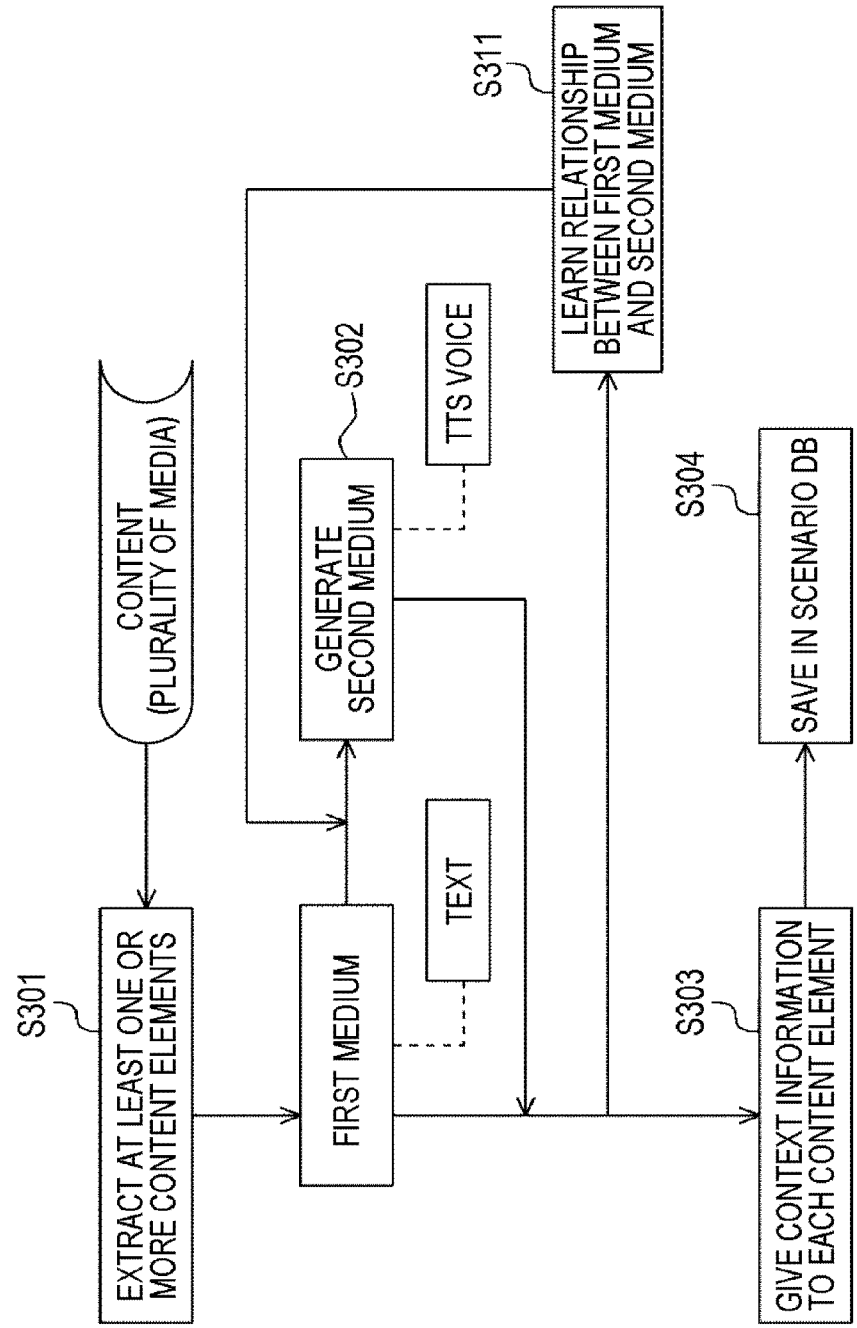
FIG. 19 is a diagram illustrating an overall image of information processing in a third embodiment.

The information processing illustrated in FIG. 19 is implemented by at least cooperation between (the control unit 100 of) the data management server 10 and (the control unit 200 of) the editing device 20 in the information processing system 1.

As illustrated in FIG. 19, in the information processing system 1, from content (a novel of an electronic book or the like) including a plurality of media (text or the like), one or more content elements (for example, a sentence of the novel) including a first medium (text or the like) are extracted (S301), and a content element (for example, a voice depending on the sentence of the novel) including a second medium (TTS voice or the like) is generated (S302).

Then, in the information processing system 1, context information (for example, information on context in which a voice of a sentence of a novel is assumed to be heard) is given to each content element (for example, a voice corresponding to the sentence of the novel) (S303), and the content element and the context information are associated with each other and accumulated in the content element-context information DB 151.

Furthermore, one or more data sets of "content element-context information" are saved (accumulated) as a scenario in the scenario DB 152 (S304).

Here, machine learning of a relationship between the first medium (text or the like) and the second medium (TTS voice or the like) is performed in advance (S311), whereby the content element of the second medium can be generated from the content element of the first medium on the basis of a result of the machine learning.

The third embodiment has been described above.

4. Fourth Embodiment

By using the user scenario generation tool, the user can acquire a desired scenario and a desired data set of "content element-context information" by the reproduction device 30 possessed by the user.

That is, in the reproduction device 30, by execution of the user scenario generation tool, a plurality of data sets of "content element-context information" included in the acquired scenario can be displayed, and by use of a user interface for arrangement in an actual space around the user, an activation condition including a combination of conditions that can be sensed can be set for each of the data sets of "content element-context information".

The activation condition can include, for example, information regarding a global positioning system (GPS), position information such as latitude and longitude estimated from information from an access point of a wireless local area network (LAN), and a usage status and authentication information obtained from a history of a wireless beacon or short-range wireless communication.

Moreover, the activation condition includes, for example, information regarding a user position, posture, action, and surrounding environment estimated from a captured image imaged by a camera, information regarding a time and a period of time measured by an environmental information clock, environmental information and authentication information based on audio information obtained from the microphone, information regarding the body posture, motion, riding state, and the like obtained from the inertial sensor, and information regarding a respiratory rate, pulse, emotion, and the like estimated from biometric signal information.

Figure 20:
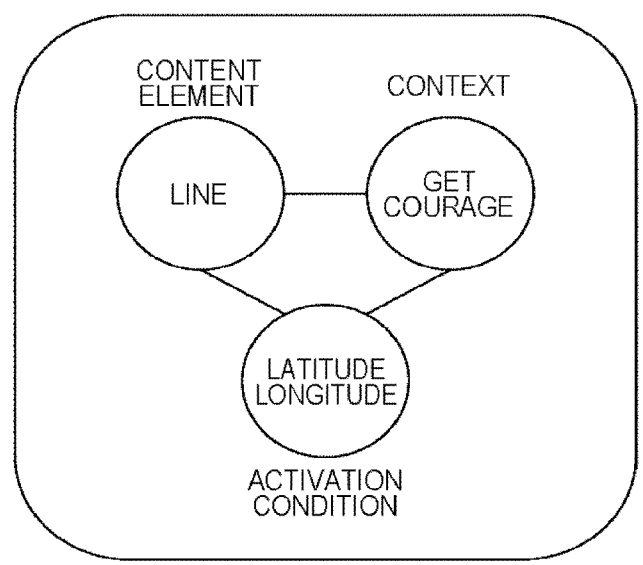
FIG. 20 is a diagram illustrating an example of setting of an activation condition for content element-context information.

For example, as illustrated in FIG. 20, in a case where a text that is "get courage" is given to audio content obtained by extracting a speech of a certain character as a data set of "content element-context information", "latitude and longitude" estimated from information regarding the GPS and the like can be set as the activation condition.

Setting of the activation condition can be set by using the user scenario generation tool, but can be completed before using the service, or the setting may be performed by activating the tool during use of the service.

Here, as an example of the user scenario generation tool, a case will be described where a data set of "content element-context information" is displayed on a map, and a range and a time zone on the map are set as activation conditions that can be sensed, with use of an interface arranged on the map by the user.

The user can create a desired user scenario by operating the user scenario generation tool executed by, for example, the reproduction device 30 such as a smartphone or an information device such as a personal computer. Note that, the user scenario generation tool may be provided as a native application, or may be provided as a web application using a browser.

Example of UI of User Scenario Generation Tool

Here, a user interface of the user scenario generation tool executed by the reproduction device 30 such as a smartphone will be described with reference to FIGS. 21 to 25. This user scenario generation tool is executed by, for example, the control unit 300 of the reproduction device 30 operated by the user, and various screens are displayed on the display 331.

Figure 21:
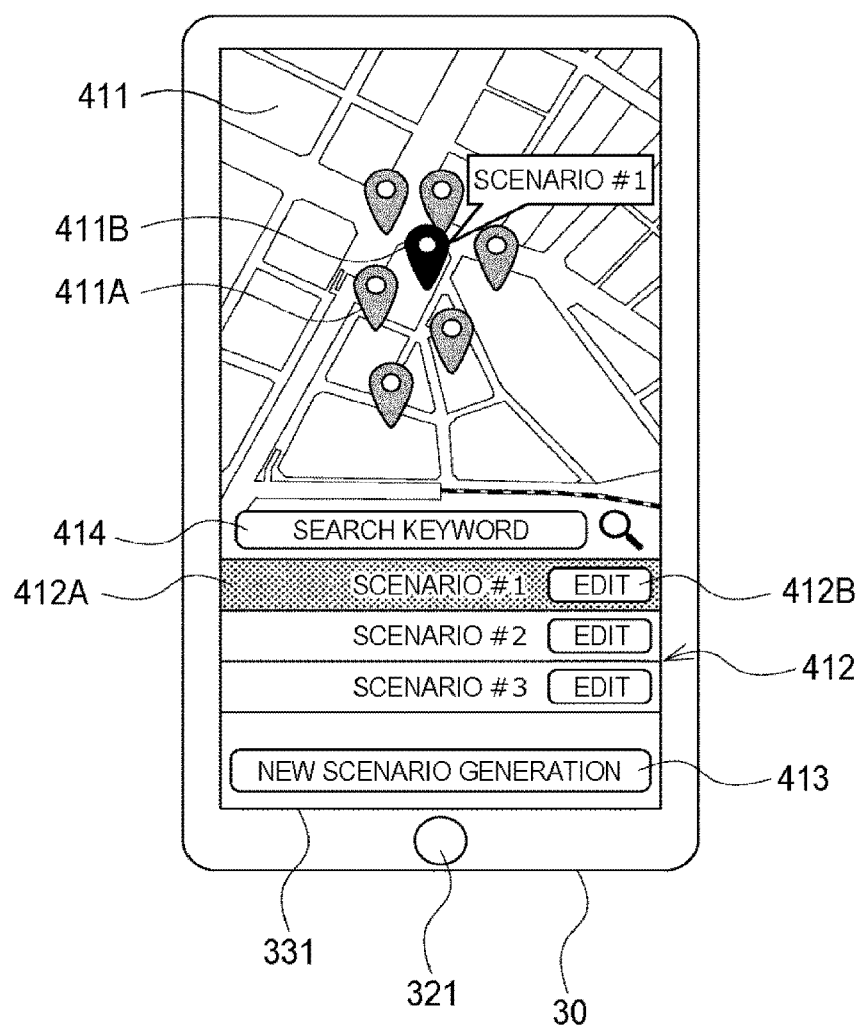
FIG. 21 is a diagram illustrating an example of a scenario selection/reproduction screen.

When the user scenario generation tool is activated, a scenario selection/reproduction screen of FIG. 21 is displayed. The scenario selection/reproduction screen includes a map/scenario display area 411, a scenario list 412, and a new scenario creation button 413.

Regarding the scenario, a name is written on a pin 411A representing a position on a map in the map/scenario display area 411, or displayed as a list in a predetermined order such as name order, or ascending order of distance from a present location in the scenario list 412.

Furthermore, in a case where a new user scenario is created, it is sufficient if a tap operation is performed on the new scenario creation button 413. Furthermore, on the scenario selection/reproduction screen, search processing may be performed using a desired keyword input in a search keyword input field 414 as a search condition, and a scenario may be presented depending on a search result the search processing.

The user can select a desired scenario by performing a tap operation on the pin 411A on the map corresponding to a desired area or a scenario display banner 412A of the scenario list 412.

In this example, among a plurality of the scenario display banners 412A displayed in the scenario list 412, a scenario #1 is being reproduced, and a scenario #2 and a scenario #3 are under suspension. Note that, in this example, only three scenario display banners 412A are displayed, but there may be a case where another scenario is displayed by a flick operation on the screen for scrolling.

At this time, in the map/scenario display area 411, if attention is paid to a pin 411B among a plurality of the pins 411A, the pin 411B is in the selected state, and thus a scenario name corresponding to the pin 411B that is "scenario #1" is displayed in a balloon shape. Then, in a case where a tap operation is performed on the edit button 412B in a state where the scenario #1 corresponding to the pin 411B is selected, an activation condition setting screen of FIG. 22 is displayed as a scenario editing screen.

Figure 22:
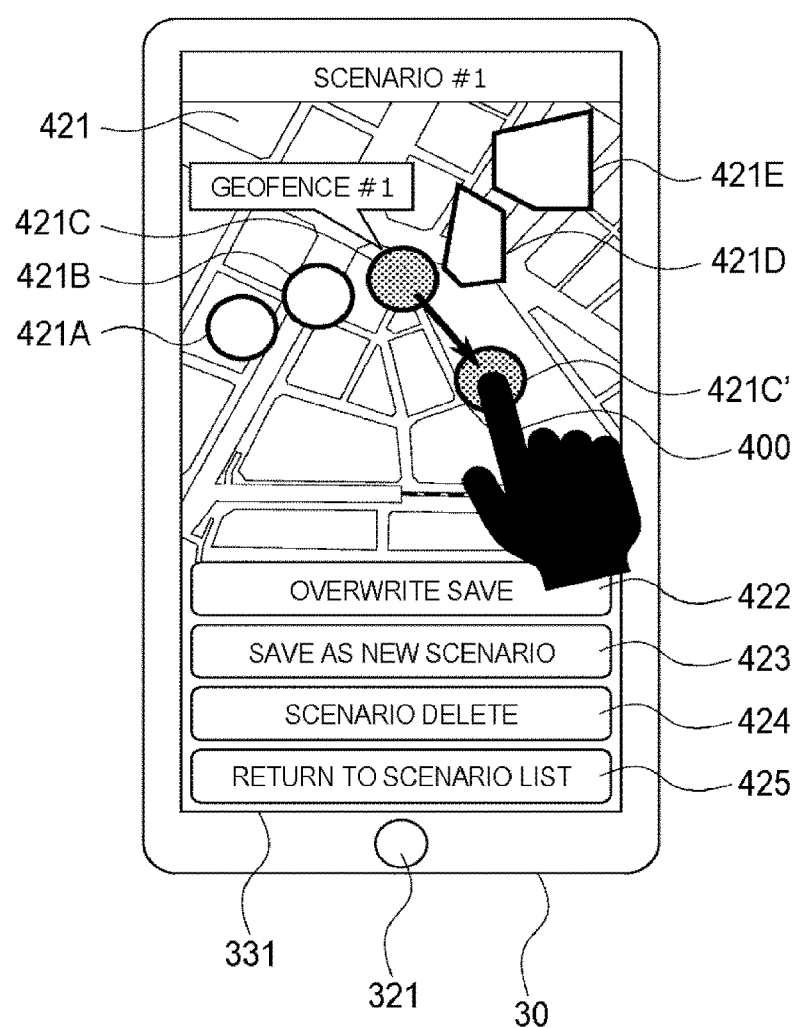
FIG. 22 is a diagram illustrating an example of an activation condition setting screen.

The activation condition setting screen of FIG. 22 includes a map/geofence display area 421, an overwrite save button 422, a new save button 423, a delete button 424, and a return button 425.

In the map/geofence display area 421, geofence areas 421A to 421E are displayed on a map of a desired area. As shapes of the geofence areas 421A to 421E, various shapes such as a circle and a polygon can be set.

In the map/geofence display area 421, context information given to an activation condition (activation range) is displayed as text or the like in each geofence, or displayed in a balloon shape when a tap operation is performed on a desired geofence. On the basis of this display, the user can confirm the context information associated with the activation range of each content element.

The geofence can be moved on the screen. Here, if attention is paid to the geofence area 421C with a pattern among the geofence areas 421A to 421E, the geofence area 421C is in the selected state, so that a geofence name depending on the geofence area 421C that is "geofence #1" is displayed in a balloon shape.

Here, in a state where the user uses a finger 400 to select the geofence area 421C, the user moves the geofence area 421C in a diagonally lower right direction (a direction of an arrow in the figure) to move a position of the geofence area 421C.

Furthermore, although not illustrated, an area of the geofence area 421C may be enlarged or reduced by performing a pinch-out operation, a pinch-in operation, or the like in a state where the geofence area 421C is selected, or a shape of the geofence area 421C may be modified in accordance with a predetermined operation.

Note that, in a case where setting details of the activation condition are saved as a scenario #1, a tap operation is performed on the overwrite save button 422, and in a case where the setting details are saved as a new scenario, it is sufficient if a tap operation is performed on the new save button 423. Furthermore, the delete button 424 is operated in a case of deleting the scenario #1. The return button 425 is operated in a case of returning to the scenario selection/reproduction screen.

Figure 23:
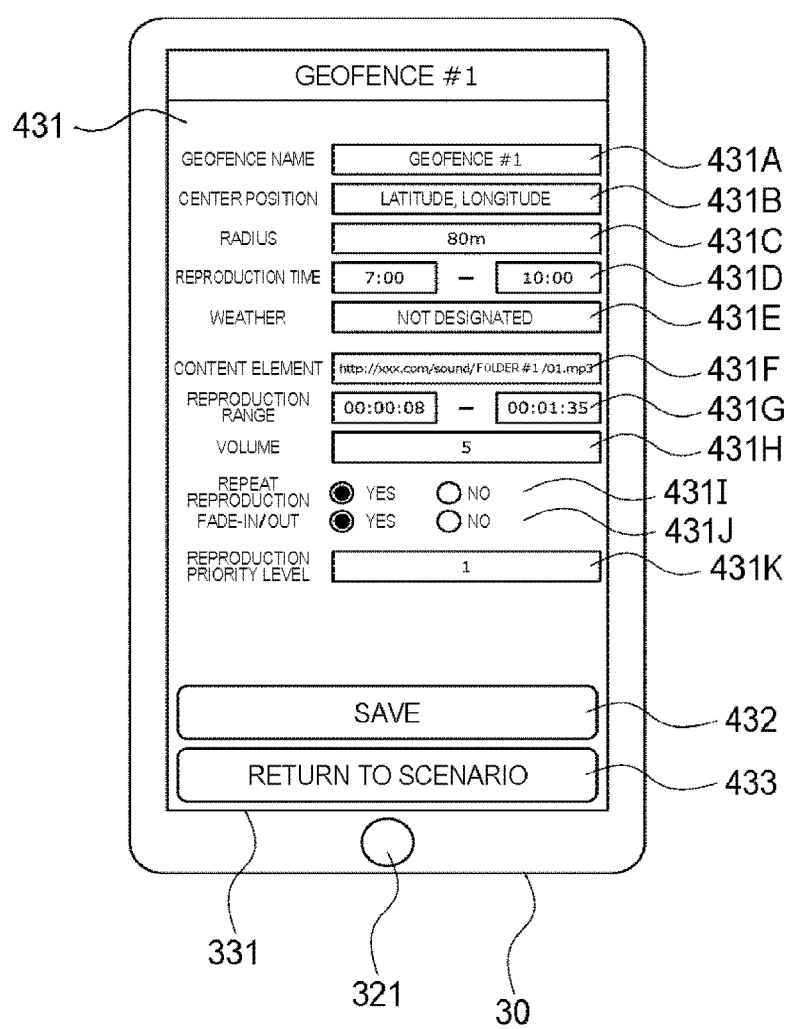
FIG. 23 is a diagram illustrating an example of an activation condition detailed setting screen.

Furthermore, in a case where the user performs long press operation on the geofence area 421C by using the finger 400, an activation condition detailed setting screen of FIG. 23 is displayed.

The activation condition detailed setting screen of FIG. 23 includes a geofence detailed setting area 431, a save button 432, and a return button 433.

The geofence detailed setting area 431 includes a geofence name input field 431A, a center position input field 431B, a radius input field 431C, a reproduction time input field 431D, a weather input field 431E, a content element input field 431F, a reproduction range input field 431G, a volume input field 431H, a repeat reproduction input field 431I, a fade-in/out input field 431J, and a reproduction priority level input field 431K.

The geofence name input field 431A to the reproduction priority level input field 431K correspond to the geofence name input field 281A to the reproduction priority level input field 281K of FIG. 16, and values set as default values therein are displayed as they are.

Note that, the save button 432 is operated in a case of saving setting details of the geofence #1. Furthermore, the return button 433 is operated in a case of returning to the activation condition setting screen.

The user may use the setting details of the default values of the geofence #1 as they are or may change the setting details to desired setting details. For example, in a case where a tap operation is performed on the content element input field 431F, a content element selection screen of FIG. 24 is displayed.

Figure 24:
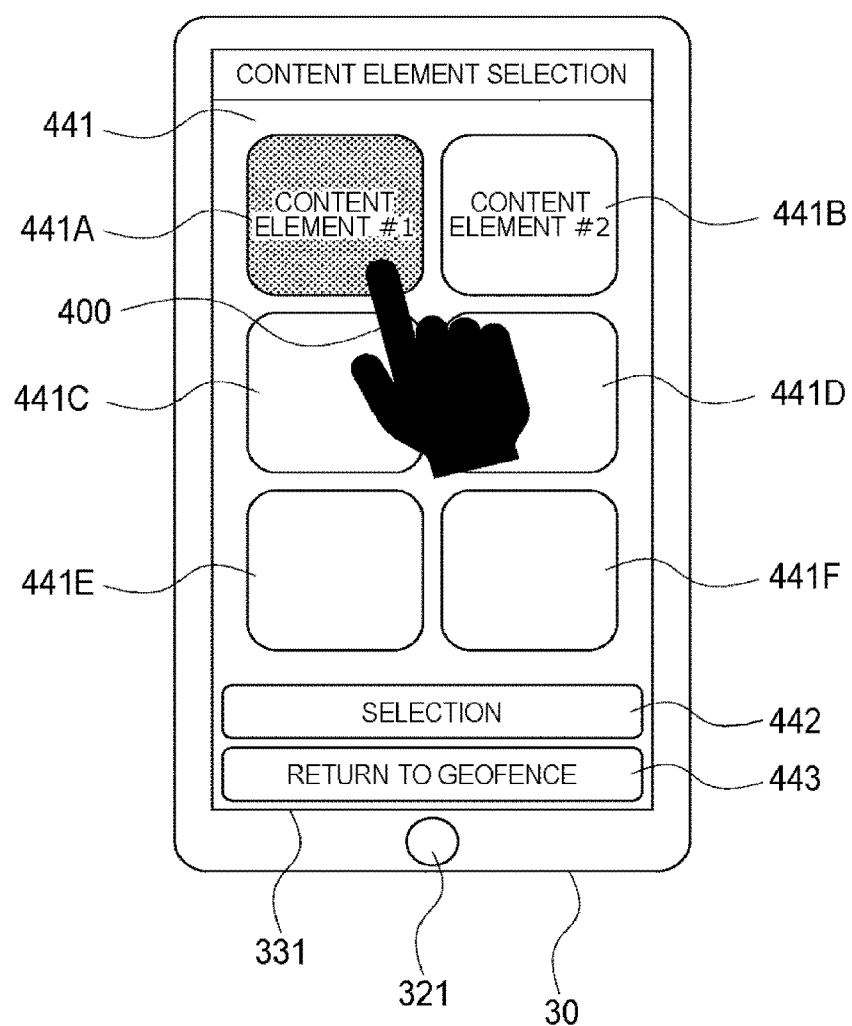
FIG. 24 is a diagram illustrating an example of a content element selection screen.

The content element selection screen of FIG. 24 includes a content element display area 441, a selection button 442, and a return button 443.

In the content element display area 441, icons 441A to 441F depending on respective content elements are arranged in a tile shape in three rows and two columns.

Note that, the selection button 442 is operated in a case of selecting a desired icon among the icons 441A to 441F. Furthermore, the return button 443 is operated in a case of returning to the activation condition detailed setting screen.

Here, in a case where the user performs a tap operation on the icon 441A among the icons 441A to 441F by using the finger 400, a content element #1 is reproduced.

Figure 25:
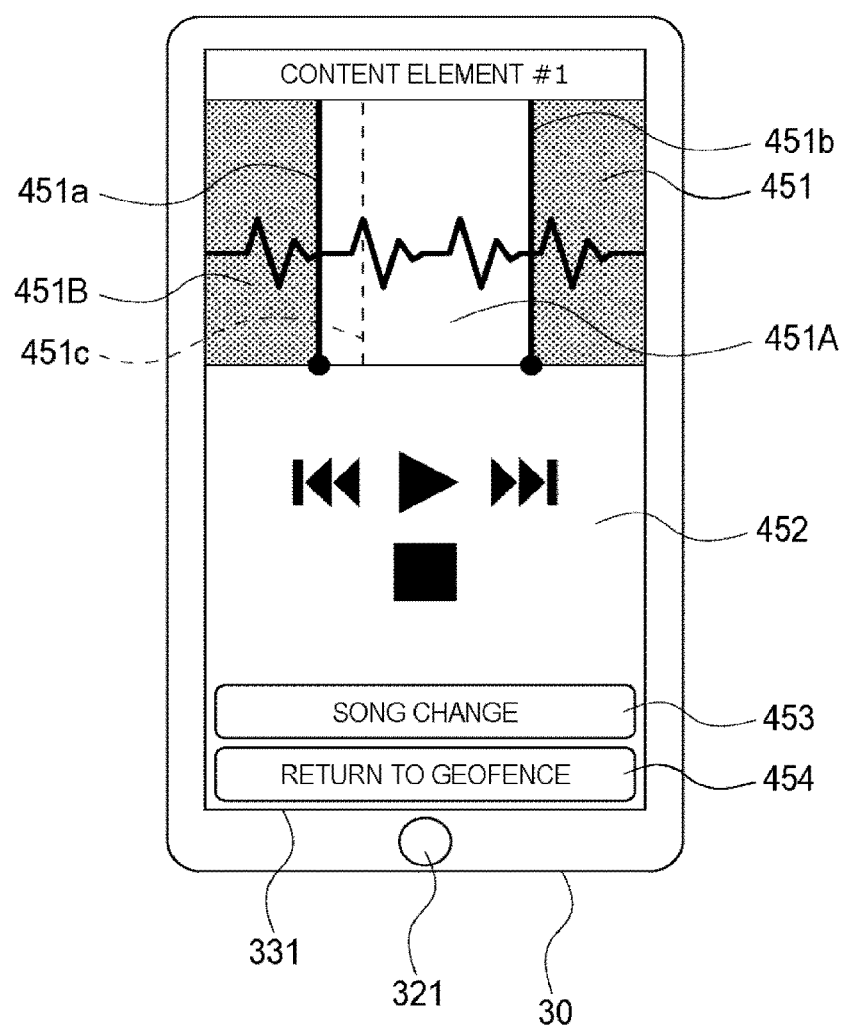
FIG. 25 is a diagram illustrating an example of a content element editing screen.

Furthermore, in a case where the user performs long press operation on the icon 441A in the selected state by using the finger 400, a content element editing screen of FIG. 25 is displayed.

The content element editing screen of FIG. 25 includes a content reproduction portion display area 451, a content reproduction operation area 452, a song change button 453, and a return button 454.

In the content reproduction portion display area 451, to edit the content element #1 as music, a waveform of the music of the content element #1 is displayed, and it is possible to designate a portion to be reproduced by sliding sliders 451a and 451b left and right.

In this example, in the waveform of the music of the content element #1, a waveform of the music in a cut selection area 451B corresponding to an area outside the sliders 451a and 451b is set as a waveform of a non-reproduction target, and a waveform of the music in a reproduction selection area 451A corresponding to an area inside the sliders 451a and 451b is set as a waveform of a reproduction target. Note that, a seek bar 451c indicates a reproduction position of the music of the content element #1 being reproduced.

In the content reproduction operation area 452, a reproduction button, a stop button, a skip button, and the like are displayed as buttons for operating the music of the content element #1.

The user operates the buttons, the sliders 451a and 451b, and the like in the content reproduction operation area 452 while confirming the waveform of the music in the content reproduction portion display area 451, thereby being able to cut out only the portion to be reproduced in the music of the content element #1.

Note that, the song change button 453 is operated in a case of changing the music to be edited. Furthermore, the return button 454 is operated in a case of returning to the activation condition detailed setting screen.

As described above, the user can create a desired user scenario by operating the user scenario generation tool executed by the reproduction device 30 such as a smartphone.

Next, a user interface of the user scenario generation tool executed by the information device such as a personal computer will be described with reference to FIGS. 26 to 29.

Figure 26:
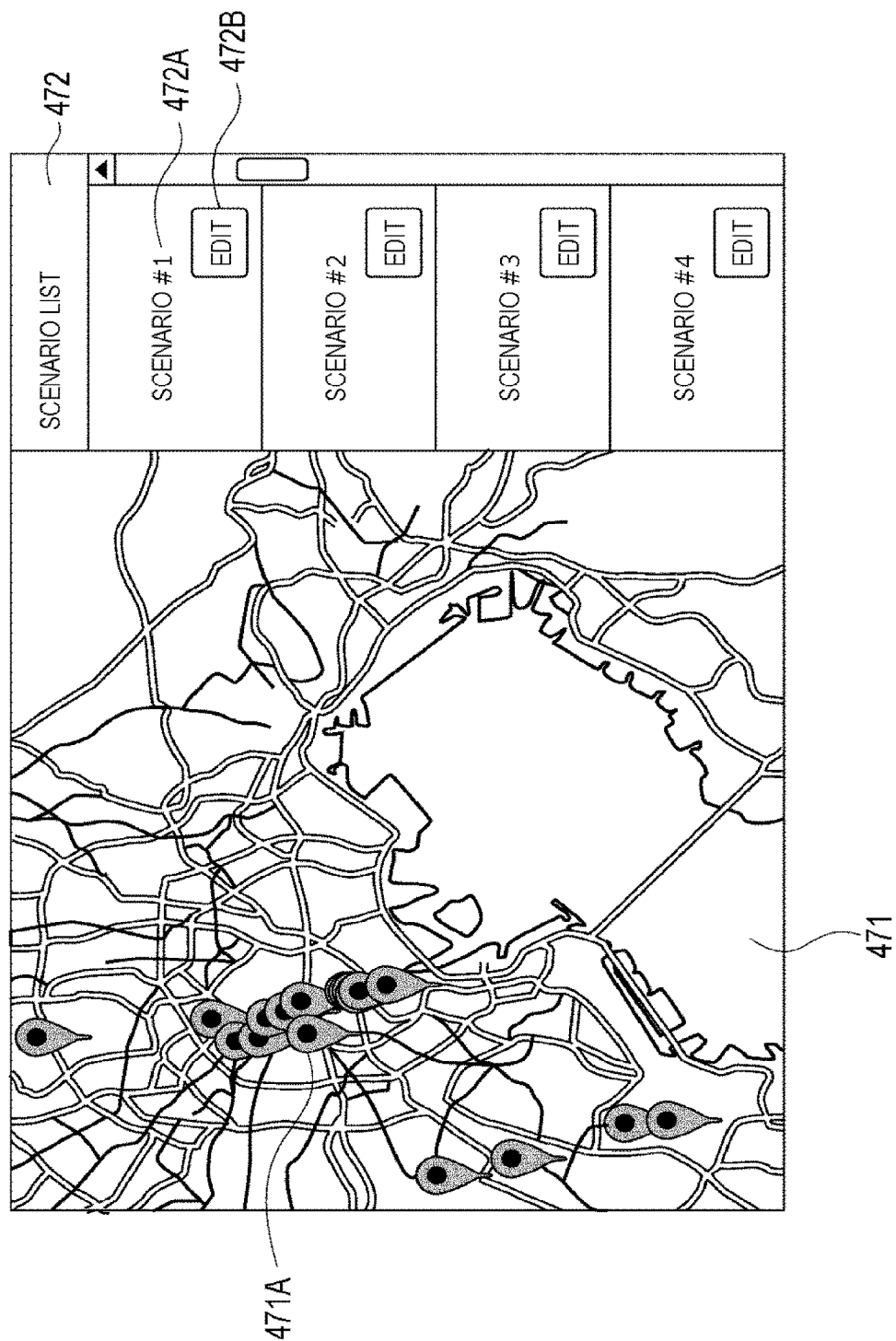
FIG. 26 is a diagram illustrating an example of a scenario selection screen.

When the user scenario generation tool is activated, a scenario selection screen of FIG. 26 is displayed. The scenario selection screen includes a map/scenario display area 471 and a scenario list 472.

Regarding the scenario, a name is written on a pin 471A representing a position on a map in the map/scenario display area 471, or a scenario display banner 472A is displayed as a list in a predetermined order in the scenario list 472.

The user can select a desired scenario by performing a click operation on the pin 471A on a desired map or the scenario display banner 472A of the scenario list 472.

Note that, in a case where a click operation is performed on an edit button 472B, a scenario editing screen for editing the scenario is displayed. Furthermore, in a case of creating a new scenario, a new scenario creation button (not illustrated) is operated.

Figure 27:
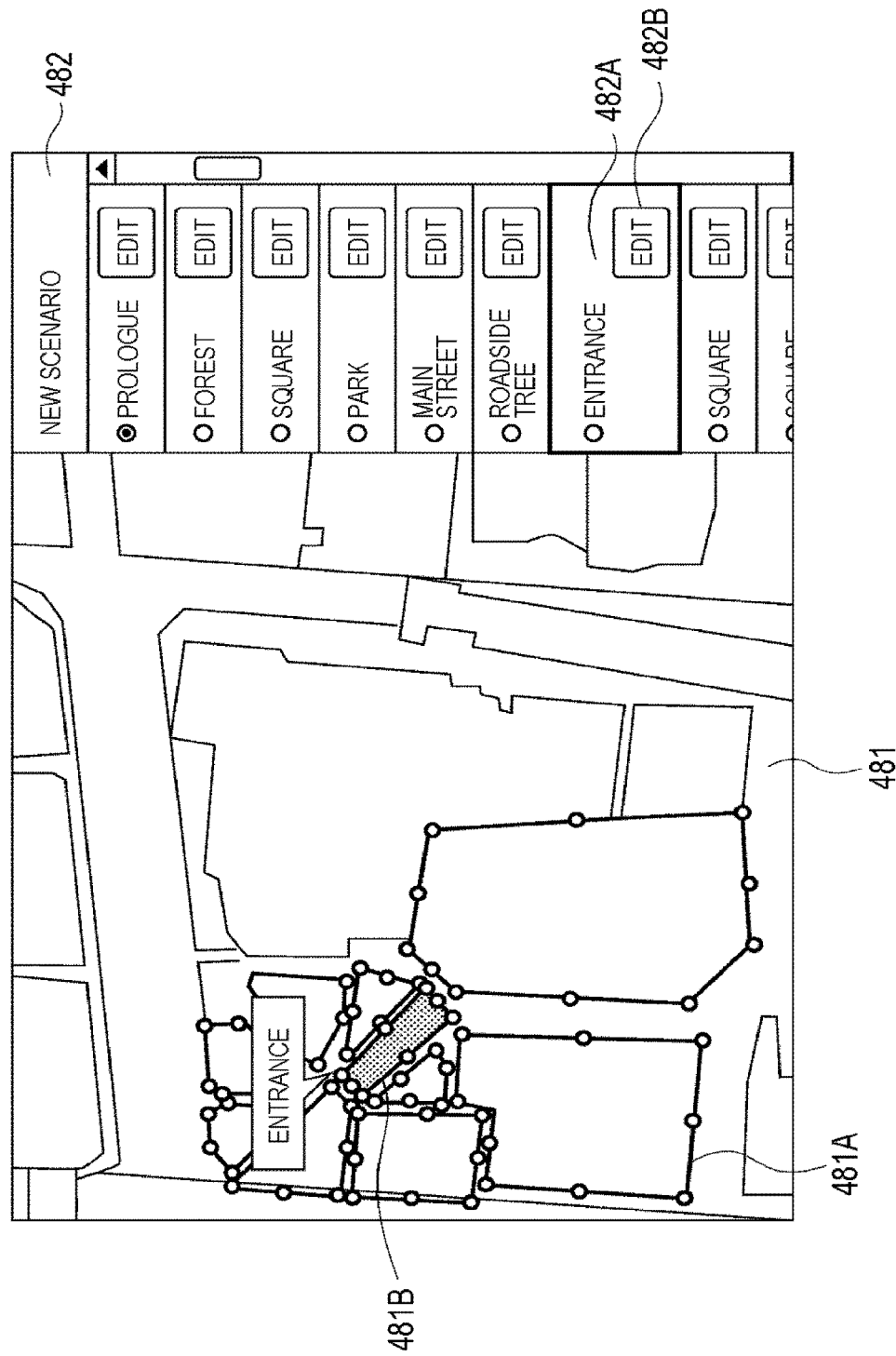
FIG. 27 is a diagram illustrating a first example of the activation condition setting screen.
Figure 28:
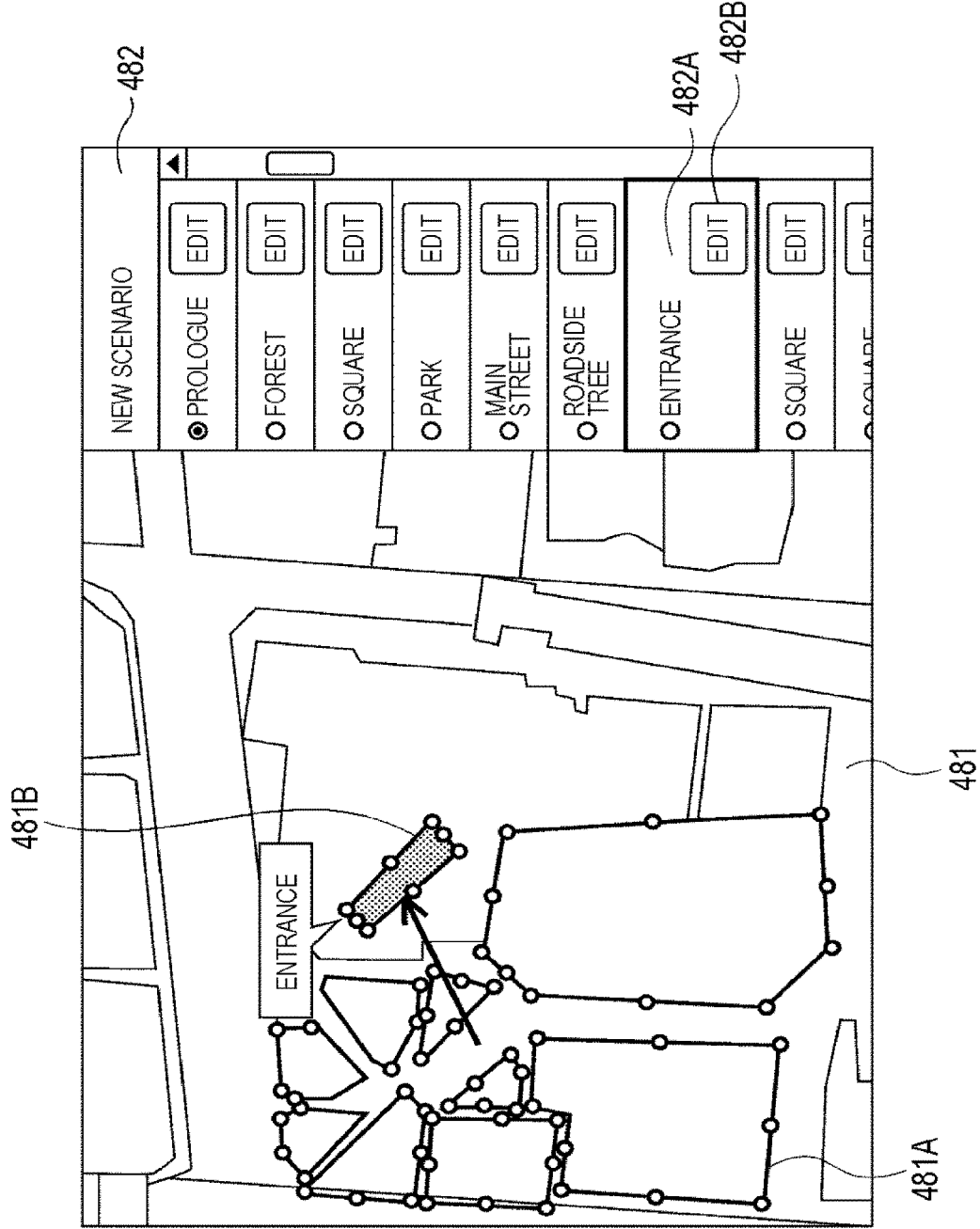
FIG. 28 is a diagram illustrating a second example of the activation condition setting screen.

When the desired scenario is selected by the user, an activation condition setting screen of FIG. 27 is displayed. The activation condition setting screen includes a map/geofence display area 481 and a context list 482.

In the map/geofence display area 481, a geofence area 481A indicating an activation range of a content element is displayed. The geofence area 481A is represented by a plurality of circles, polygons, or the like set in advance.

In the map/geofence display area 481, context information given to an activation condition (activation range) is displayed as text or the like in the geofence area 481A, or displayed in a balloon shape when a click operation is performed on a desired geofence area 481A.

The geofence area 481A can be moved on the screen in accordance with a drag operation. Here, if attention is paid to a geofence area 481B with a pattern among a plurality of the geofence areas 481A, the geofence area 481B can be moved in a diagonally upper right direction (a direction of an arrow of FIG. 28) by a drag operation, and moved from a position illustrated in FIG. 27 to a position illustrated in FIG. 28.

Furthermore, by placing a cursor on a white circle (○) on a thick line indicating a shape of the geofence area 481B and performing a drag operation in a desired direction, the shape of the geofence area 481B can be modified into a desired shape.

As described above, the user moves or modifies the shape of the geofence area 481B on the basis of the context information displayed in the geofence area 481B, thereby being able to set by oneself which position in a real life space the context corresponds to.

Note that, the content element may be separately presented in a format of a list. Moreover, a content element not to be used may be deleted, or a separately obtained content element may be added to the scenario currently being edited.

Figure 29:
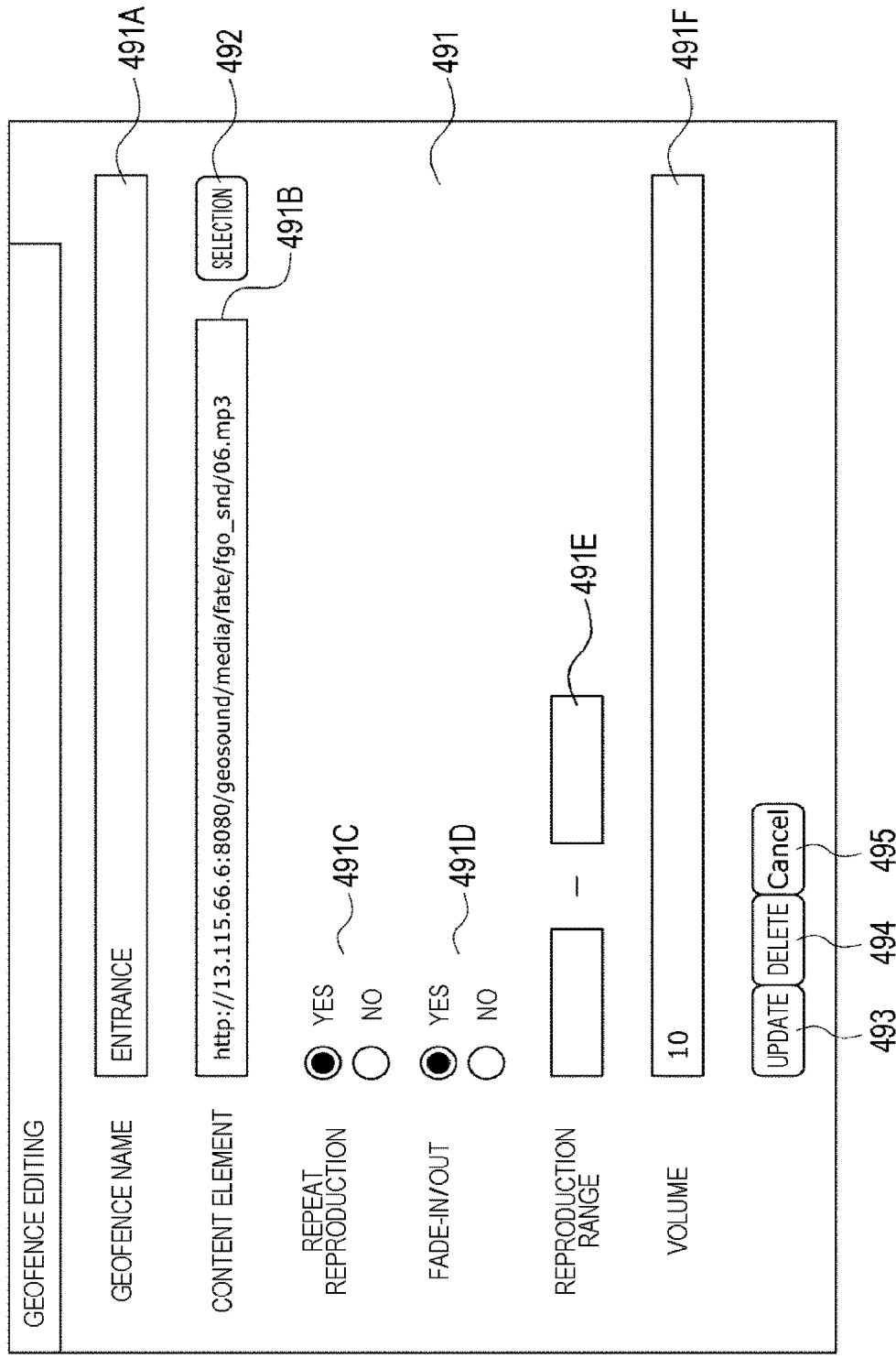
FIG. 29 is a diagram illustrating an example of the geofence editing screen.

Here, in the context list 482, when a click operation is performed on an edit button 482B of a context display banner 482A corresponding to the geofence area 481B, or a predetermined operation is performed on the geofence area 481B, a geofence editing screen of FIG. 29 is displayed.

The geofence editing screen includes a geofence detailed setting area 491, a selection button 492, an update button 493, a delete button 494, and a cancel button 495.

The geofence detailed setting area 491 includes a geofence name input field 491A, a content element input field 491B, a repeat reproduction input field 491C, a fade-in/out input field 491D, a reproduction range input field 491E, and a volume input field 491F. These setting items correspond to the setting items in the geofence detailed setting area 431 of FIG. 23.

Furthermore, in a case where a click operation is performed on the selection button 492, a desired content element can be selected by using the content element selection screen, similarly to the selection button 282 of FIG. 16. The update button 493 is operated in a case of updating the setting items of the geofence area 481B. The delete button 494 is operated in a case of deleting the geofence area 481B. The cancel button 495 is operated in a case of canceling editing.

As described above, the user can create a desired user scenario by operating the user scenario generation tool executed by the information device such as a personal computer.

Note that, in the above description, the user interface using a map has been exemplified as the user scenario generation tool, but another user interface not using a map may be used. Hereinafter, a method will be described for setting an activation condition without using a map will be described.

For example, in a case where activation is to be set around an object that is not indicated on a map, such as "a bench in a square in front of a station", setting can be performed by imaging a target bench with the camera unit 306 of the reproduction device 30 such as a smartphone.

Furthermore, the setting can also be made by imaging the target bench, uttering a voice command, for example, "image here", "set on this bench", or the like while performing imaging with a camera of a wearable device worn by the user. Moreover, in a case where an image including the user's own hand can be captured by using a camera of eyewear or the like, the user can perform setting by performing a hand gesture in a form of enclosing the bench, and recording an object or scenery in the enclosure when the gesture is recognized.

Furthermore, even at the time of setting an activation condition that cannot be set with a map expression, for example, a biological state or emotion of the user, and the like, for example, a "feeling now" button is displayed on the reproduction device 30 such as a smartphone, and data or a recognition result is recorded at a time point when a tap operation or a click operation is performed on the button or in a certain period of time before and after the tap operation or the click operation, whereby setting the activation condition can be made. Note that, similarly to the case described above, for example, it is also possible to perform input by user's voice, a gesture command, or the like.

Here, to easily set a plurality of pieces of data, for example, a "current situation" button may be displayed, or may be set in advance as a voice command or a specific gesture, and in a case where there is an input to the button, data such as a position, time, weather, a surrounding object, weather, biological data, and emotion designated in advance may be collectively acquired.

By providing these input methods, particularly input methods without a screen, the user can easily perform input in daily life while experiencing the service or while the service is stopped.

In this way, the data input by the user without using the screen is transmitted to, for example, the data management server 10 and accumulated in the user scenario DB 153. As a result, the user can display the screen of the user scenario generation tool on the reproduction device 30 possessed by the user. Then, the user can confirm association between the activation condition displayed on the screen and the data set of the "content element-context information", or performs re-editing.

The above operation is an operation in which the user sets only the activation condition for the content element in the provided scenario, but details of content such as audio data or image data constituting the content element or context information given to the content element may be permitted as an operation that can be changed by the user in accordance with a use condition.

A scenario for which editing is ended is accumulated in the user scenario DB 153 as a user scenario. Note that, the user scenario accumulated in the user scenario DB 153 can also be disclosed to another user by using a sharing means such as a social networking service (SNS).

Furthermore, a plurality of data sets of "content element-context information" included in the scenario is displayed on an editing means such as the user scenario generation tool, and the user performs association with an actual position, time zone, and environment of the user's life space, the user's own motion and emotion, whereby application is possible to, for example, the following services.

That is, as one example of the service, a case is assumed where a scenario is acquired that includes a plurality of data sets of "content element-context information" including speeches uttered by a specific character appearing in a certain animation work in various contexts.

In this case, while context information presented as, for example, "home", "station", "street", "intersection", "cafe", or "convenience store" is referred to, a position of "home", "station", "street", "intersection", "cafe", or "convenience store" where the user actually lives is input as an activation condition subjectively by the user by the editing means such as the user scenario generation tool. As a result, the user can receive reproduction of the content element depending on the context by the reproduction device 30 possessed, at a place where the user lives and a place (for example, the intersection) having a context assumed by the user.

Figure 30:
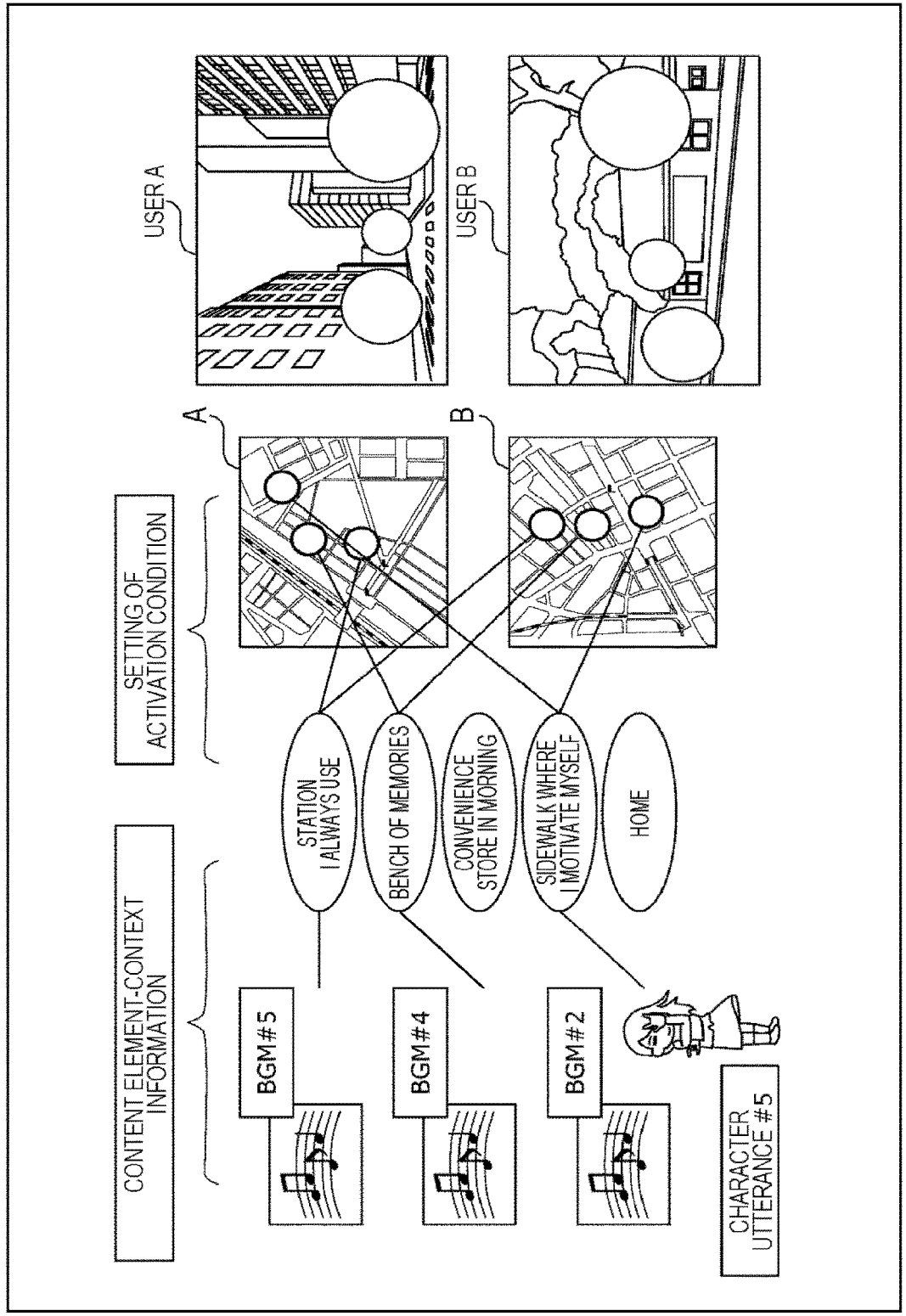
FIG. 30 is a diagram illustrating an example of setting of a user scenario.

FIG. 30 illustrates an example of setting of the user scenario.

In FIG. 30, two users, a user A and a user B, respectively set activation conditions A and B for the scenario to be distributed, and each creates one's own user scenario.

At this time, when the activation condition is set for the same scenario, since the user A sets the activation condition A and the user B sets the activation condition B, the activation condition varies for each user.

The same scenario can therefore be implemented in different places for respective users. That is, one scenario can be used by each of users who live in different places.

Another example of the service includes one according to cooperation with a streaming distribution service.

For example, in a conventional music streaming distribution service, a playlist is produced and distributed in which audio data of a plurality of works is collected in an existing music format (for example, a single song or the like) on the basis of a certain theme such as for each creator (creator) or each use scene.

On the other hand, in the present technology, a work itself or a part expressing a specific context in the work is extracted as a content element, context information representing a situation (for example, a station at dusk) or a state (for example, a tired way home) in which the music is reproduced is given to the content element, and the content element is collectively accumulated in the scenario DB 152 as a scenario and is made distributable.

The user can acquire the scenario described above by the reproduction device 30, create a user scenario by performing arrangement at specific positions and time zones in one's own living area while referring to the given context information, for a plurality of data sets of "content element-context information" included, and register the user scenario in the user scenario DB 153.

When editing the user scenario, the user can also designate a part desired to be reproduced from the work itself as the content element in a form of designating the part as the reproduction range. The scenario can include a content element (another content element) as a voice character describing a work to be reproduced at the time of reproduction of the content element or during reproduction of the content element.

Note that, this voice character can be acquired not only in the same route as the scenario but also in a route different from the scenario, and for example, a character preferred by the user from among a plurality of voice characters can be caused to perform explanation.

In the scenario DB 152, a combination of pieces of context information for various content elements is accumulated by the creator for the purpose of provision to the user.

For example, in a case where the context information is used as teacher data and a recognizer is used in which machine learning is performed on a melody structure of the content element, it is possible to estimate a context that is easily recalled from a melody structure of a certain content element in a form reflecting a subjective tendency of the creator. Then, by using this estimation result, it is possible to automate a process of giving context information to the content element or to support the giving of the context information of the creator by presenting a plurality of contexts having a certain correlation.

Furthermore, in the user scenario DB 153, a data set of "content element-context information" associated with an activation condition including a position, time, environment, physical condition, emotion, and the like of the user's own life space is sequentially accumulated by the user.

That is, since a large number of data sets of "content element-context information" for which activation conditions are set by a plurality of users are accumulated in the user scenario DB 153, an algorithm for automating a process or a recognizer can be created by performing machine learning or analysis on the accumulated information.

Furthermore, for example, a tendency of context information given to a position in the real world (real space) having a specific latitude and longitude can be analyzed from information regarding the plurality of users accumulated in the user scenario DB 153.

For example, in a case where an analysis is made that there is a tendency to "cheer up" in a park at an exit of a real station or a context similar thereto is set, data utilization for another service can be performed in a form of selling foods and books expected to cheer up in the park by using s result of the analysis.

Furthermore, for example, in a case where a specific context in which a content element of a certain work, for example, a phrase of a part of music, is associated with lyrics is set for scenery seen from a certain place in a certain time zone, this information is fed back to a composer or a lyricist of the music, so that the information can be utilized as reference data at the time of creating a subsequent work.

Overall Image of Processing

Next, an overall image of information processing in a fourth embodiment will be described with reference to FIGS. 31 and 32.

Figure 31:
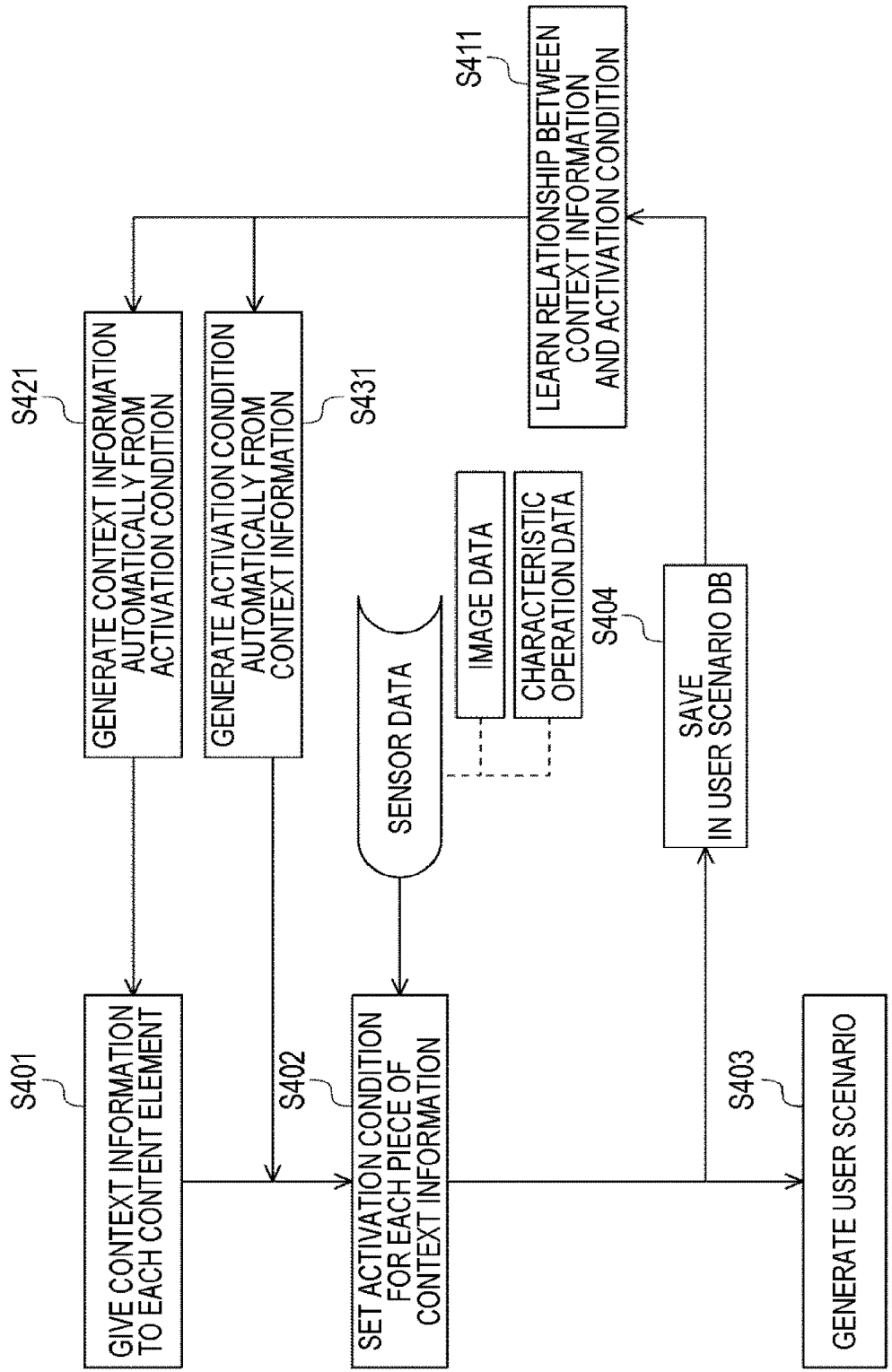
FIG. 31 is a diagram illustrating an overall image of information processing in a fourth embodiment.
Figure 32:
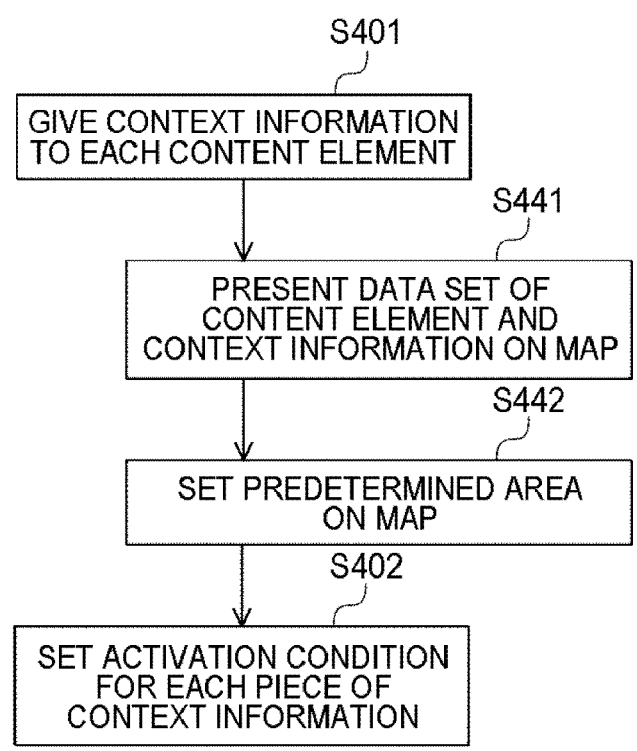
FIG. 32 is a diagram illustrating an overall image of the information processing in the fourth embodiment.

The information processing illustrated in FIGS. 31 and 32 is implemented by at least cooperation between (the control unit 100 of) the data management server 10 and (the control unit 300 of) the reproduction device 30 in the information processing system 1. That is, this information processing is executed by at least one of the control unit 100 or the control unit 300.

As illustrated in FIG. 31, in the information processing system 1, context information is given to each content element, and one or more data sets of "content element-context information" is accumulated in the scenario DB 152 as a scenario (S401).

At this time, in the information processing system 1, an activation condition depending on sensor data obtained by sensing the user is set for each piece of context information given to the content element (S402). As a result, a user scenario including a data set of the context information and the activation condition unique to the user is generated (S403) and accumulated in the user scenario DB 153 (S404).

Here, as the activation condition, an activation condition can be set depending on captured image data, characteristic operation data, or the like. Here, the image data includes data of an image assumed to be visually recognized by the user. Furthermore, the characteristic operation data includes, for example, data of an operation of a button (feeling now button) for registering information depending on the user's current feeling.

Furthermore, by performing machine learning on a relationship between the context information ("get courage" or the like) accumulated in the user scenario DB 153 and the activation condition (exit of a specific station or the like) (S411), it is possible to output a result of the machine learning.

More specifically, context information can be automatically generated for a specific activation condition in accordance with a result of the machine learning (S421). For example, in a case where it is specified by the result of the machine learning that a place depending on the sensor data is a place where the user is encouraged, "get courage" is generated as the context information and given to the target content element.

Furthermore, an activation condition corresponding to the user can be automatically generated for specific context information in accordance with the result of the machine learning (S431). For example, if the place where the user is encouraged is around the user, in a case where it is specified that the place is this place by the result of the learning, position information depending on the place is set as the activation condition for the context information that is "get courage".

Furthermore, as illustrated in FIG. 32, in the information processing system 1, the user scenario generation tool is provided as a user interface using a map for setting an activation condition unique to the user. Note that, as described above, the user scenario generation tool is provided as an application executed by the reproduction device 30 such as a smartphone or the information device such as a personal computer.

In the information processing system 1, an activation condition is set in each piece of context information given to a content element extracted from content (S401, S402).

Here, by using the user scenario generation tool, an interface is provided capable of presenting a data set of a content element and context information on a map of a desired area (S441), and setting a predetermined area on the map of the desired area as an activation condition for the context information (S442).

The fourth embodiment has been described above.

5. Fifth Embodiment

In the information processing system 1, data such as a position, a physical condition, an emotion, and a motion of the user, information on an object, a structure, a building, a product, a person, an animal, and the like in a surrounding environment, and a current time are sequentially acquired as sensor data by a sensing means mounted on the reproduction device 30 possessed or worn by the user or a device (device) arranged around the user.

Then, it is determined sequentially by a determination means whether or not these data or a combination of the data matches the activation condition set by the user.

Here, in a case where it is determined that the activation condition matches the sensor data by the sensing means, a content element included in a data set of "content element-context information" associated with the activation condition is reproduced from a device (for example, the reproduction device 30) designated in advance, or a combination of a plurality of devices (for example, the reproduction device 30 and devices arranged in the vicinity).

Note that, here, since a reproduction location and timing are determined by comparison between the sensor data by the sensing means and the activation condition, the determination process does not directly include a subjective element such as a context or a recognizer by machine learning including data including the subjective element, and thus, it is possible to perform a reproducible and stable operation as a system.

On the other hand, since the user combines the activation condition and the data set of "content element-context information" on the user's own initiative, there is also an advantage that it is easy for the user to understand that it is presentation of the content element in an appropriate situation.

FIG. 33 illustrates an example of a combination of the activation condition and the sensing means.

As a temporal activation condition, a time, a period of time, or the like can be set, and determination can be made by measurement using a clock, a timer, or the like. Furthermore, as a spatial activation condition, a position such as latitude, longitude, or approach to a specific position can be set, and determination can be made by measurement using GPS, Wi-Fi (registered trademark), a wireless beacon, or the like.

Furthermore, authentication information such as a user ID may be set as an activation condition, and determination can be made by measurement using proximity communication such as Bluetooth (registered trademark). Moreover, a posture of the user such as standing, sitting, or laying, an action of the user such as a train, a bicycle, or an escalator, or the like may be set as an activation condition, and determination can be made by measurement using an inertial sensor, a camera, proximity communication, or the like.

Furthermore, surrounding environment information such as a chair, a desk, a tree, a building, a room, scenery, a scene, or the like may be set as an activation condition, and determination can be made by measurement using a camera, an RF tag, a wireless beacon, an ultrasonic wave, or the like. Moreover, a state such as body posture, motion, respiratory rate, pulse, or emotion may be set as an activation condition, and determination can be made by measurement using an inertial sensor, a biometric sensor, or the like.

Note that, the example of the combination illustrated in a table of FIG. 33 is an example, and the activation condition and the sensing means are not limited to those illustrated in this table.

The fifth embodiment has been described above.

6. Sixth Embodiment

By the way, a case is also assumed where activation conditions set for two or more content elements included in at least one or more scenarios are the same. For example, in a plurality of data sets of content element-content information in which an activation condition is set in a certain range on a map, two or more activation ranges may be set in an overlapping manner to include the same position on the map.

Figure 34:
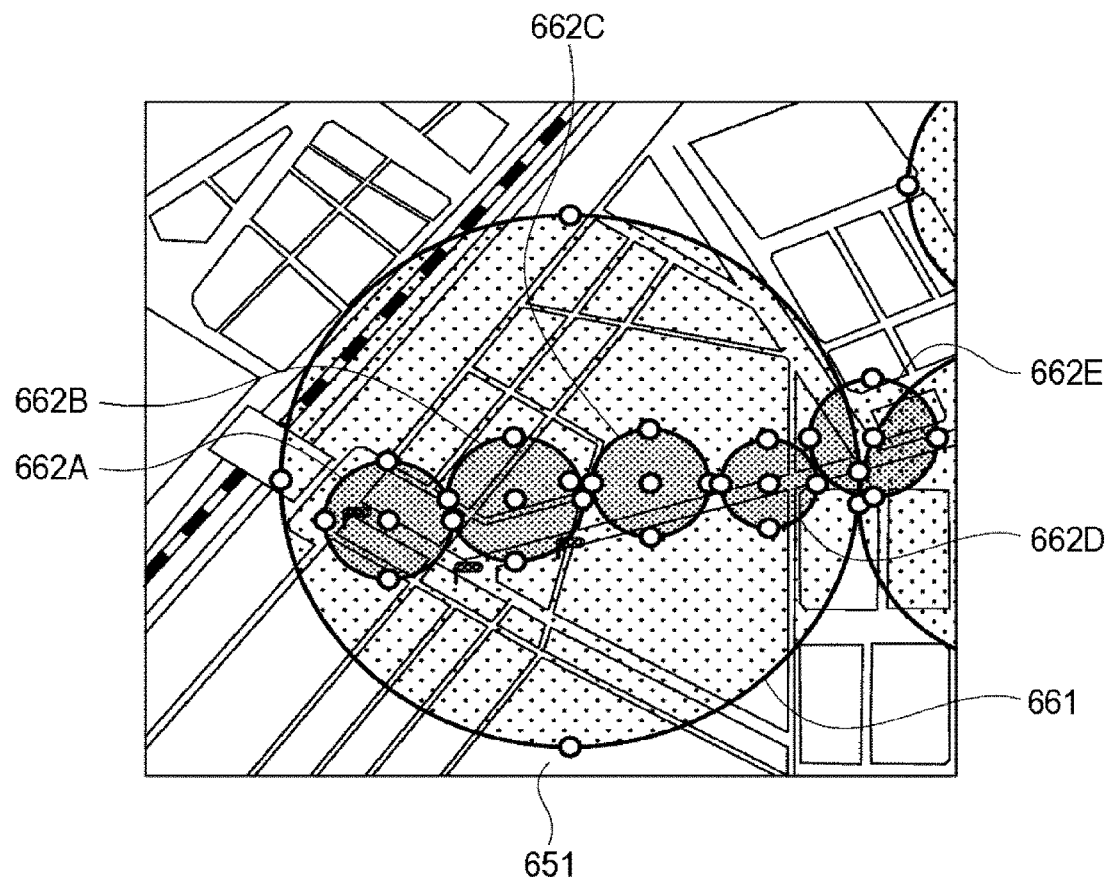
FIG. 34 is a diagram illustrating an example of a state in a case where activation conditions overlap.

Specifically, as illustrated in FIG. 34, on a map 651, a geofence 661 set as a circular activation range and geofences 662A to 662E set as circular activation ranges inside the circle are superimposed on each other.

At this time, as reproduction of the content elements in the reproduction device 30, for example, in a case where all the content elements are reproduced at the same time in accordance with a rule set in advance, it is also assumed that all the content elements are not reproduced when some content elements are reproduced on the basis of a set priority order.

Here, the content elements can be appropriately reproduced by preparing in advance a presentation range setting user scenario to be referred to in a case where the activation condition is satisfied in the user scenario.

Figure 35:
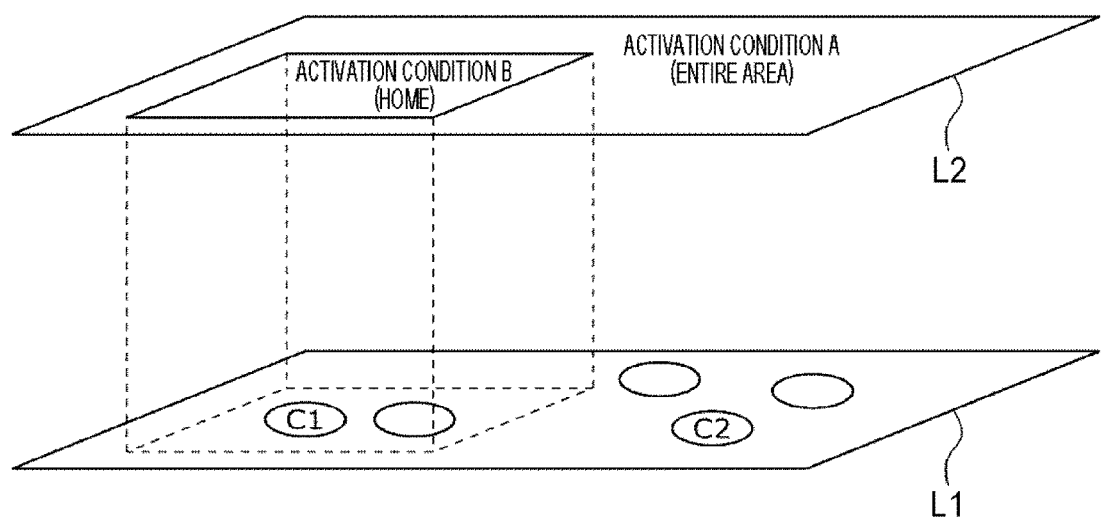
FIG. 35 is a diagram illustrating a first example of a response in a case where activation conditions overlap.

Specifically, as illustrated in FIG. 35, a case will be exemplified where reading a sentence aloud by a TTS voice is set as a content element, an utterance (speech) by a character A is designated as a presentation range setting user scenario in an activation condition A including an activation range of the entire area including home or the like, and an utterance (speech) by a character B is designated as a presentation range setting user scenario in an activation condition B including an activation range of home or the like.

However, in FIG. 35, a lower layer L1 corresponds to the user scenario, and an upper layer L2 corresponds to the presentation range setting user scenario. Furthermore, in the lower layer L1, an elliptical area corresponds to an activation range set by a geofence.

At this time, in a case where an activation condition of an activity range setting scenario of a character is exclusive, the character B makes the utterance in a case where an activation condition C1 of the user scenario is satisfied, and the character A makes the utterance in a case where an activation condition C2 is satisfied. That is, in this case, the character is always alone.

On the other hand, in a case where the activation condition of the activity range setting scenario of the character is not exclusive, the utterance when the activation condition C1 of the user scenario is satisfied is performed by the character A or B. Which of the character A or the character B speaks may be randomly determined, or a specific rule may be set. Furthermore, when the activation condition C2 is satisfied, only the character A makes an utterance. That is, in this case, when the user is at home, there are two characters.

Furthermore, the priority order to be set can be set on the basis of the sensor data. For example, in a case where a plurality of content elements is utterances (speeches) by a plurality of characters, when the position of the user is a position where activation conditions of the plurality of content elements overlap, it is assumed that all the corresponding content elements are in a reproducible state.

Figure 36:
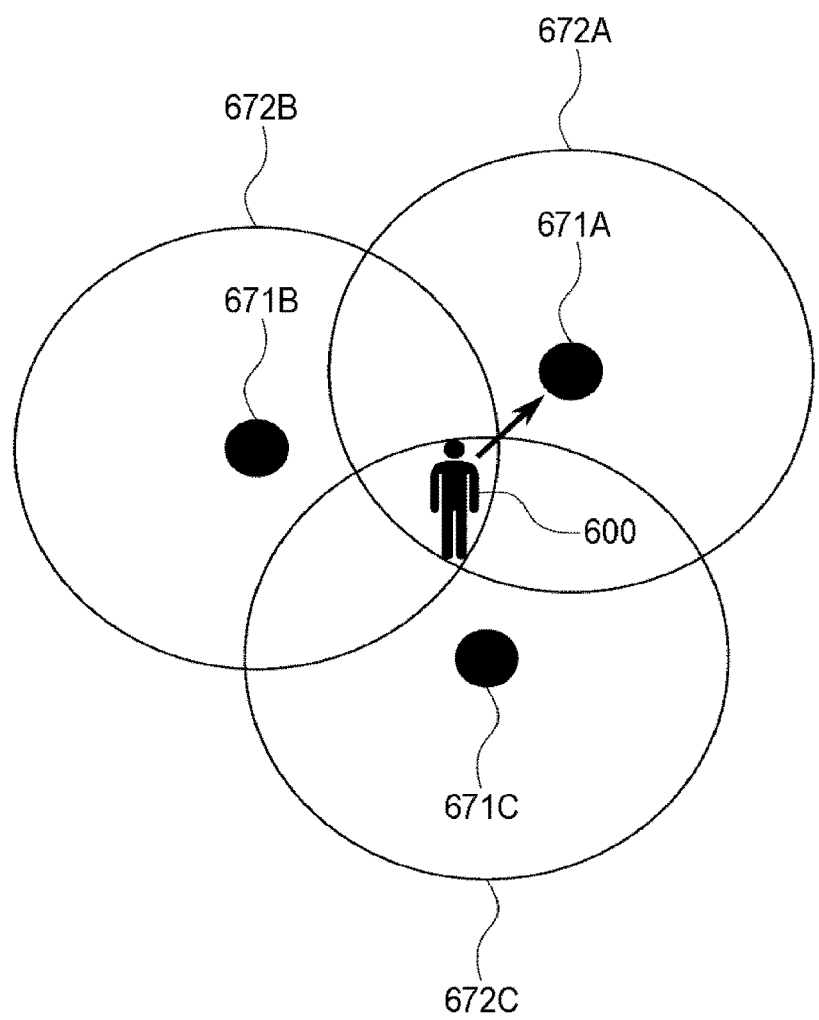
FIG. 36 is a diagram illustrating a second example of the response in the case where the activation conditions overlap.

At this time, as illustrated in FIG. 36, only a content element of a geofence 672A located in front of the body is reproduced from a relative positional relationship between a position of a user 600 and specific positions 671A to 671C (for example, the center of a circle) of an activation range of a content element depending on geofences 672A to 672C, and sensor data in a direction (for example, the upper right direction in the figure) in front of the body of the user 600.

Note that, at this time, in a case where the user 600 wears a stereo earphone connected to the reproduction device 30, it is possible to stereoscopically control (sound image localization) a fixed position of a sound source (for example, a speech) to be reproduced in accordance with a relative positional relationship between the position of the user 600 and the specific positions 671A to 671C of the activation range of the content element depending on the geofences 672A to 672C.

With the above control, it is possible to obtain reproduction of an utterance of a character in a direction in which the user 600 faces, and thus, it is possible to select presentation of a sound source (for example, a speech) by a desired character in accordance with orientation of the body, the head, and the like of the user 600.

Figure 37:
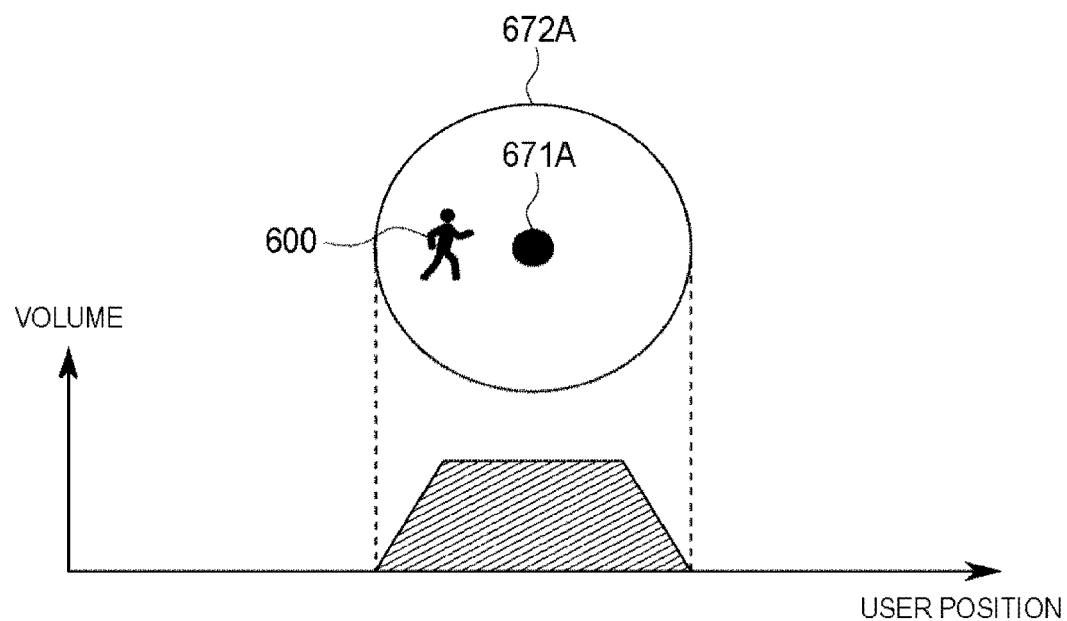
FIG. 37 is a diagram illustrating a third example of the response in the case where the activation conditions overlap.

Note that, as illustrated in FIG. 37, the volume of the sound source by the character may be changed in accordance with the position of the user 600 in the geofence 672A. For example, the volume of the sound source can be increased as the user 600 approaches the specific position 671A, and the volume of the sound source can be decreased as the user moves away from the specific position 671A.

Furthermore, by associating acceptance of an utterance command from the user 600 with the activation condition, it is possible to implement a guidance service in which, when the user 600 faces a certain direction and asks a question, a character set in the direction presents information related to its position.

Furthermore, here, the presentation range setting user scenario may be referred to.

Figure 38:
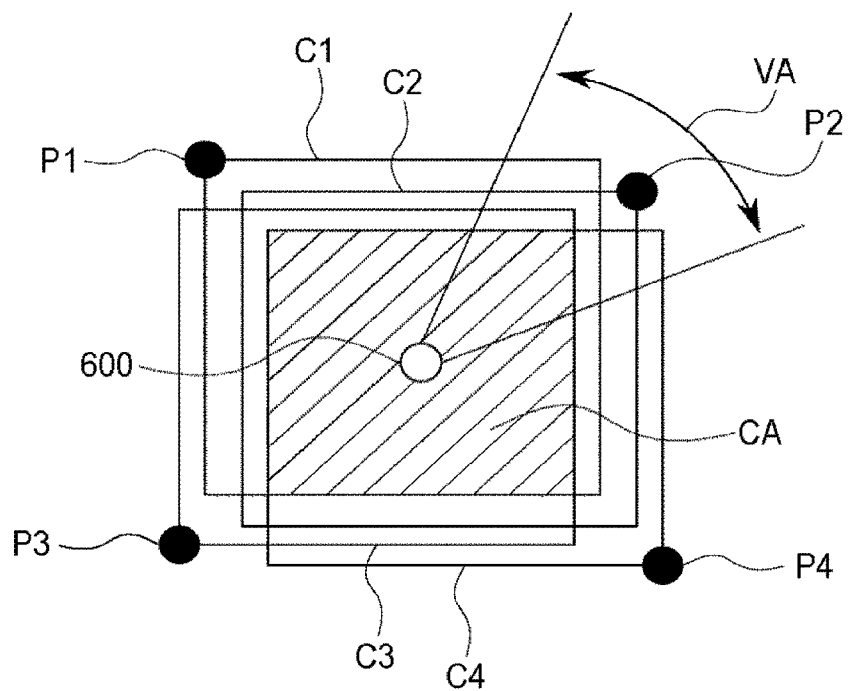
FIG. 38 is a diagram illustrating a fourth example of the response in the case where the activation conditions overlap.

Specifically, as illustrated in FIG. 38, the presentation range setting user scenario is caused to have information for designating sound source setting positions P1 to P4 together with information for setting activation ranges for respective activation conditions C1 to C4. However, the sound source setting positions P1 to P4 are not limited to positions within the activation range in which the activation conditions C1 to C4 are designated.

FIG. 38 illustrates the four activation conditions C1 to C4 having a common activation condition area CA (hatched lines in the figure), and the sound source setting positions P1 to P4 (black circles in the figure) are set in the respective activation conditions C1 to C4.

At this time, in a case where an activation condition is satisfied in the user scenario, that is, in a case where the user 600 enters the common activation condition area CA, a search for the sound source setting position is performed for all the activation conditions that are satisfied.

Here, among the sound source setting positions P1 to P4 found, the sound source setting position P2 is specified that is within a viewing angle area VA calculated from user's orientation information measured by the sensor unit 305 of the reproduction device 30 possessed by the user 600. Then, a content element is reproduced that is associated with the activation condition C2 having the specified sound source setting position P2.

Note that, the above-described control is an example of control in a case where two or more activation ranges are set in an overlapping manner to include the same position on the map, and other control may be performed. For example, in a case where all content elements are reproduced at the same time, it is possible to present an expression in which a plurality of speeches is reproduced in the same BGM as the user moves within the activation range, by performing control in which one content element is set as a background sound and the other content elements are set as a plurality of speeches.

Multiple Character Arrangement

Furthermore, the above-described control is not limited to presentation of a voice (sound), and image presentation of a character through a display device such as a glasses-type device adaptable to augmented reality (AR) can be similarly controlled. Thus, next, with reference to FIGS. 39 to 45, a case will be described where arrangement of a plurality of characters is to be made settable for a scenario.

Figure 39:
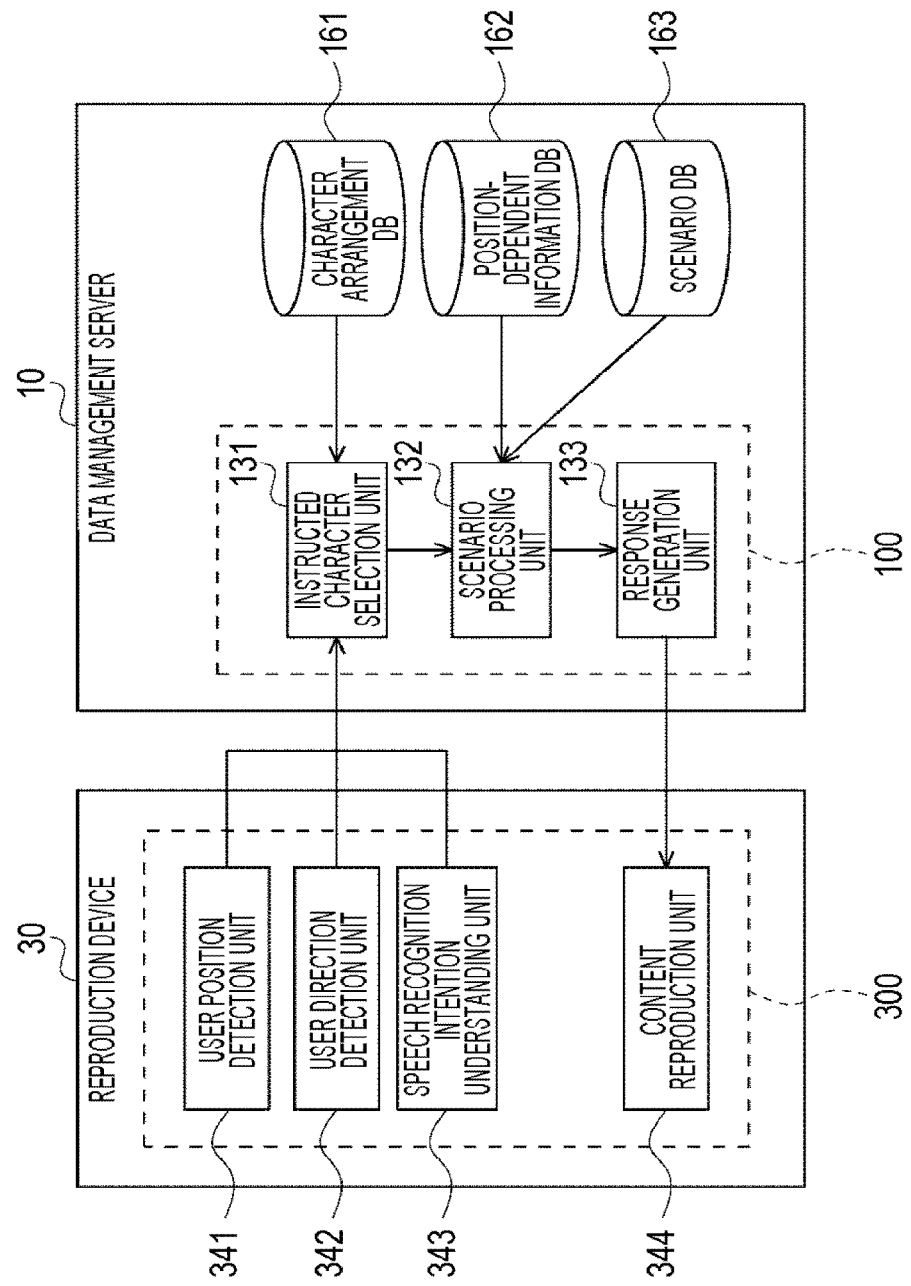
FIG. 39 is a diagram illustrating an example of a configuration of the information processing system in a case where a plurality of characters is arranged.

FIG. 39 illustrates an example of a configuration of the information processing system 1 in a case where arrangement of a plurality of characters is to be made settable.

FIG. 39 illustrates the data management server 10 and the reproduction device 30 among the devices constituting the information processing system 1 of FIG. 2. However, a part of the processing executed by the data management server 10 may be executed by another device such as the editing device 20 or the reproduction device 30.

In the reproduction device 30, the control unit 300 includes a user position detection unit 341, a user direction detection unit 342, a speech recognition intention understanding unit 343, and a content reproduction unit 344.

The user position detection unit 341 detects a position of the user on the basis of information regarding the GPS and the like.

The user direction detection unit 342 detects a direction in which the user faces, on the basis of the sensor data from the sensor unit 305 (FIG. 5).

The speech recognition intention understanding unit 343 performs speech recognition and intention understanding processing on the basis of speech data of an utterance of the user, and understands intention of the utterance of the user.

Note that, this speech recognition and intention understanding processing is performed not only by the control unit 300, and part or all of the processing may be performed by a server on the Internet 40. Furthermore, the audio data of the user's utterance is collected by the microphone.

Transmission data processed by the user position detection unit 341, the user direction detection unit 342, and the speech recognition intention understanding unit 343 is transmitted by the communication unit 304 (FIG. 5) to the data management server 10 via the Internet 40. Furthermore, the communication unit 304 receives response data transmitted from the data management server 10 via the Internet 40.

The content reproduction unit 344 reproduces the content element on the basis of the received response data. When the content element is reproduced, not only an utterance (speech) by a character can be output from the speaker 332, but also a video of the character can be displayed on the display 331.

In the data management server 10, the control unit 100 further includes an instructed character selection unit 131, a scenario processing unit 132, and a response generation unit 133. Furthermore, the storage unit 103 (FIG. 3) further stores a character arrangement DB 161, a position-dependent information DB 162, and a scenario DB 163.

The communication unit 104 (FIG. 3) receives the transmission data transmitted from the reproduction device 30. The instructed character selection unit 131 selects an instructed character by referring to the character arrangement DB 161 on the basis of the received transmission data, and supplies a result of the selection to the scenario processing unit 132.

Figure 40:
FIG. 40 is a diagram illustrating an example of information stored in a character arrangement DB.

As illustrated in FIG. 40, an arbitrary system and an arrangement place depending on the system are set for each character in the character arrangement DB 161.

The scenario processing unit 132 processes the scenario by referring to the position-dependent information DB 162 and the scenario DB 163 on the basis of the selection result from the instructed character selection unit 131, and supplies a result of the processing to the response generation unit 133.

Figure 41:
FIG. 41 is a diagram illustrating an example of information stored in a position-dependent information DB.

As illustrated in FIG. 41, type information, position information such as latitude and longitude, and information regarding details associated with the type information and the position information are set in the position-dependent information DB 162 for each information ID that is a unique value.

Figure 42:
FIG. 42 is a diagram illustrating an example of the information stored in the scenario DB.

Furthermore, as illustrated in FIG. 42, in the scenario DB 163, for each scenario ID that is a unique value, type information and information regarding details associated with the type information are set.

That is, it can be said that, among pieces of information stored in the character arrangement DB 161, the position-dependent information DB 162, and the scenario DB 163, the information regarding the character and the details corresponds to the content element, the system, the type information, and the like corresponds to the context information, and the position information corresponds to the activation condition.

The response generation unit 133 generates response data on the basis of the processing result from the scenario processing unit 132. The response data is transmitted by the communication unit 104 (FIG. 3) to the reproduction device 30 via the Internet 40.

In the information processing system 1 configured as described above, the user can set a plurality of desired voice characters in the scenario, a position of the user and a direction in which the user faces are detected with respect to an activation condition indicating a trigger of audio reproduction, and the voice character can be switched depending on a result of the detection.

Figure 43:
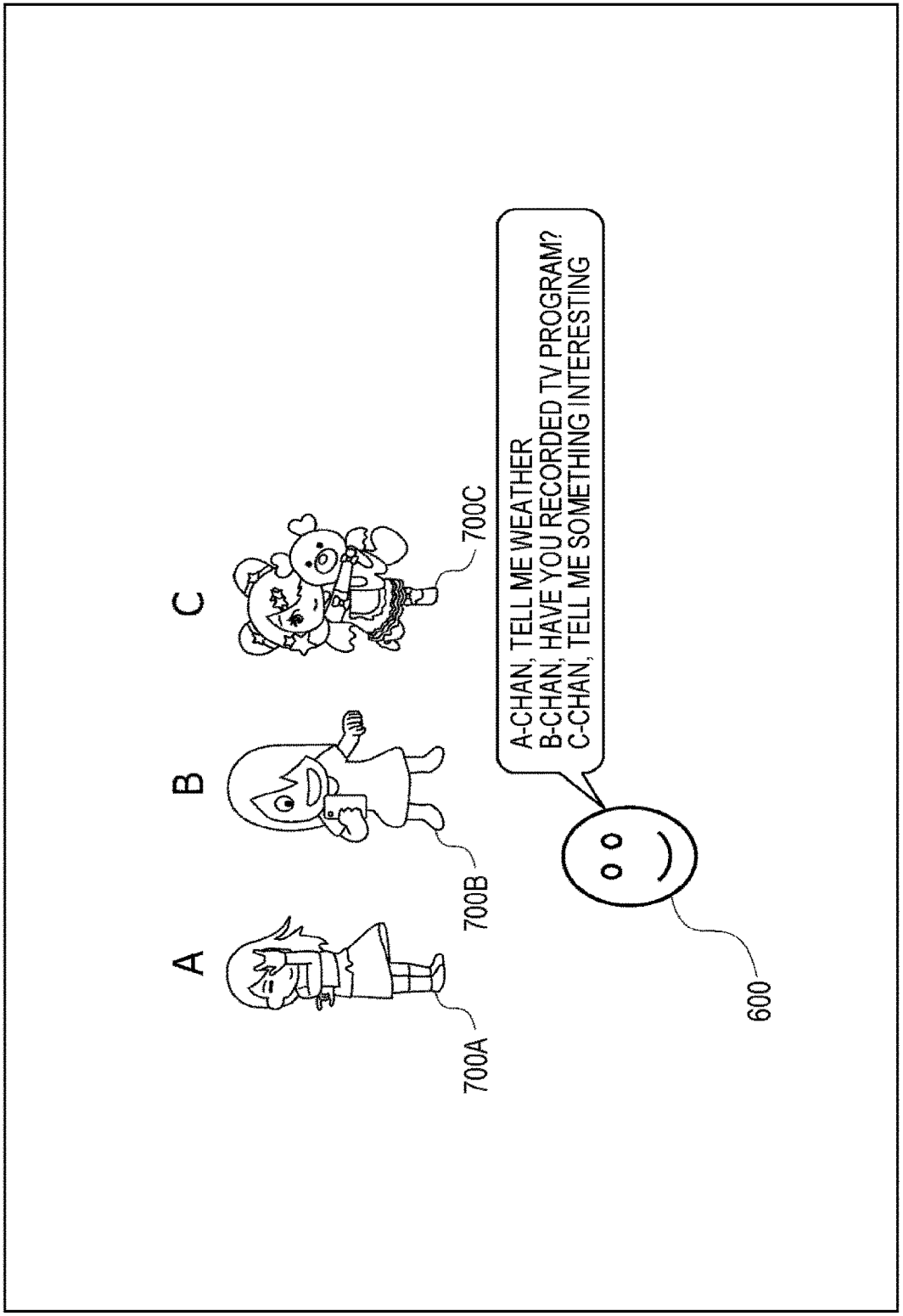
FIG. 43 is a diagram illustrating a first example of multiple character arrangement.

Here, under the present circumstances, in a case of handling a plurality of voice characters when providing a voice character service, it has been difficult to divide roles among the characters, and thus, as illustrated in FIG. 43, it has been necessary to give an instruction every time for each of voice characters 700A to 700C, which has been troublesome.

On the other hand, in the information processing system 1, when providing a voice character service, it is possible to detect the position and direction of the user and switch the voice character in accordance with the detection result, so that it is possible to instruct a voice character for which the role is divided to perform a desired action. It is therefore easy to instruct a plurality of voice characters.

Figure 44:
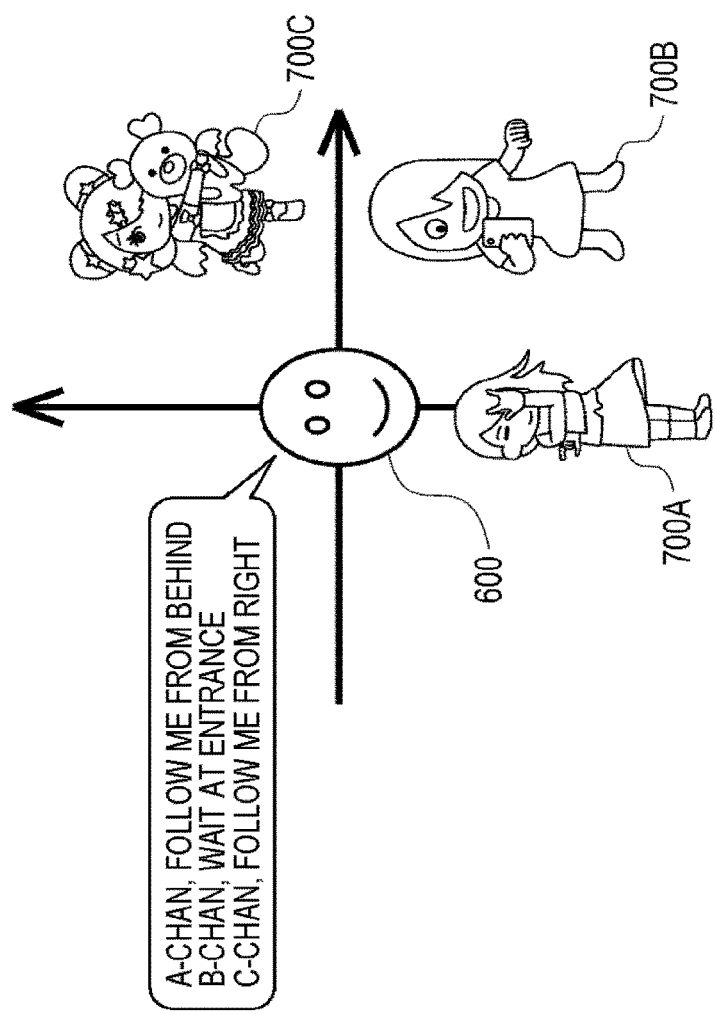
FIG. 44 is a diagram illustrating a second example of the multiple character arrangement.

Specifically, as illustrated in FIG. 44, only by collectively giving an instruction to the characters 700A to 700C in a virtual space from a user 900, each of the characters 700A to 700C performs an operation according to the instruction given to them.

Figure 45:
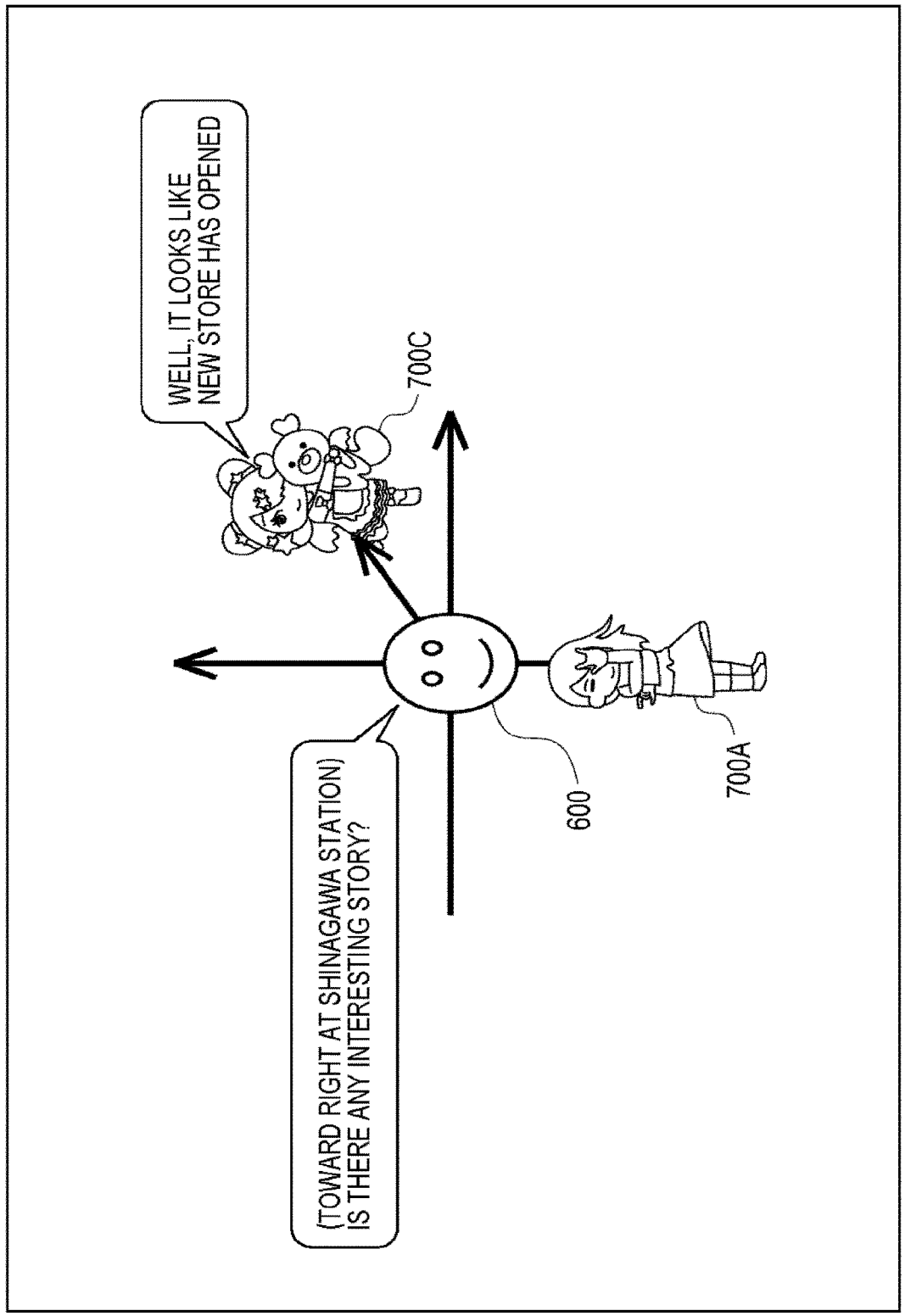
FIG. 45 is a diagram illustrating a third example of the multiple character arrangement.

Furthermore, as illustrated in FIG. 45, only by asking a question by voice in a direction in which the character 700C exists in the virtual space, the user 600 can obtain an answer to the question from the character 700C. That is, the character 700C can identify information around an arranged position, and in other words, the user can obtain an access right to surrounding information by presence of the character 700C.

Note that, for example, a user scenario in which voice characters talk with each other can also be implemented, and processing in which conversations do not overlap may be added by exclusive processing. Moreover, environmental information around the activation range indicated by the activation condition included in the user scenario may be acquired, and a voice may be provided to the user by a voice character designated in the activation range.

As described above, in the information processing system 1, in a case where the arrangement of a plurality of characters can be set, when the user explicitly designates a position of a character in a space, the position of the character in a user coordinate system can be designated, the position of the character in a world coordinate system can be designated (latitude and longitude, designation of a landmark, or the like), or the position of the character can be designated in a device such as the reproduction device 30 capable of displaying the character.

For example, by the arrangement of the character in the user coordinate system, it is possible to clarify a character as an instruction target with an instruction to the character as a direction even in a space of only sound. Furthermore, for example, by giving an instruction in the world coordinate system by the user, it is possible to easily perform division of roles of each character.

Overall Image of Processing

Next, an overall image of information processing in a sixth embodiment will be described with reference to FIG. 46.

Figure 46:
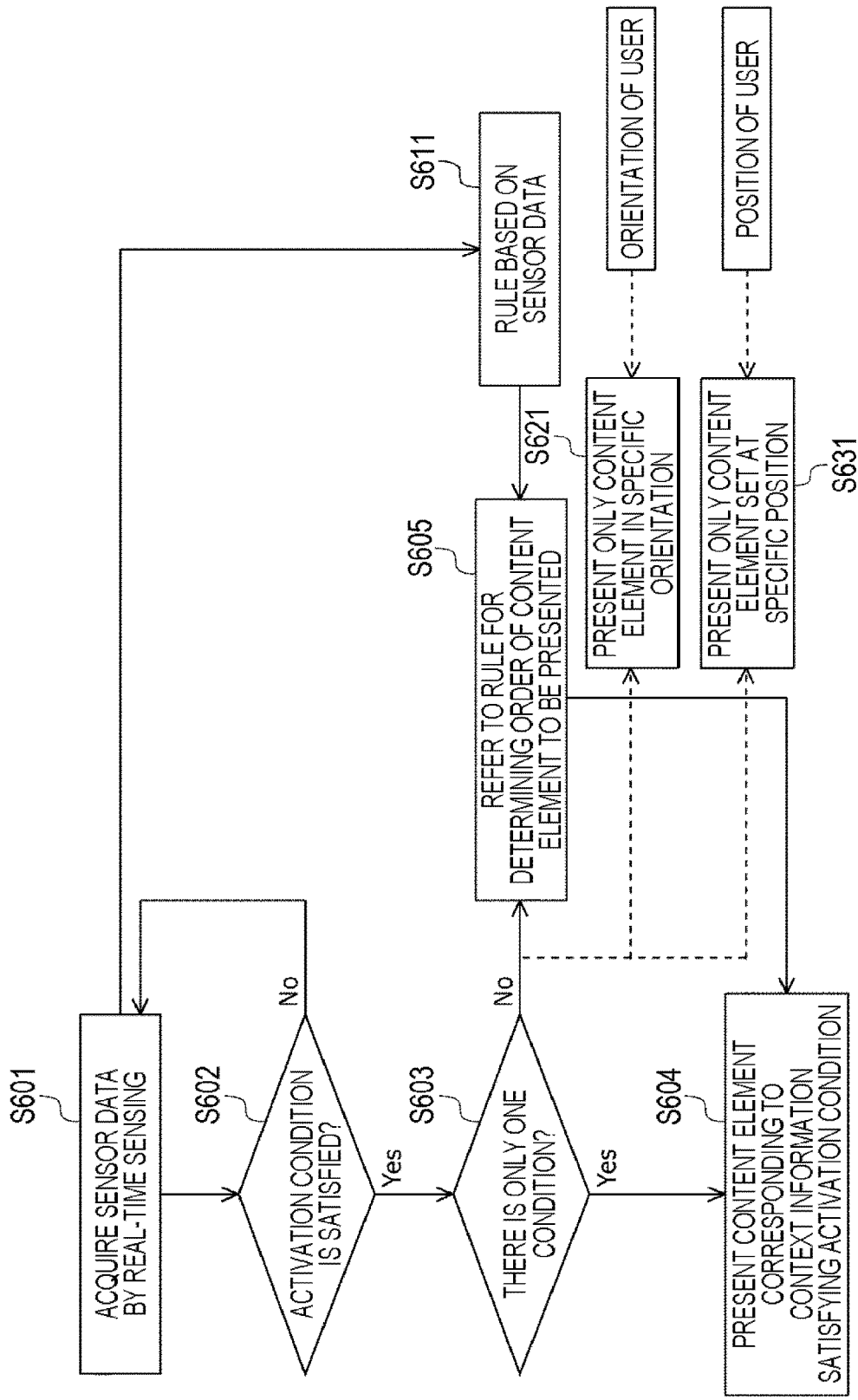
FIG. 46 is a diagram illustrating an overall image of information processing in a sixth embodiment.

The information processing illustrated in FIG. 46 is implemented by at least cooperation between (the control unit 100 of) the data management server 10 and (the control unit 300 of) the reproduction device 30 in the information processing system 1.

As illustrated in FIG. 46, in the information processing system 1, sensor data by real-time sensing is acquired (S601). It is determined whether or not information obtained from the sensor data satisfies an activation condition of a user scenario accumulated in the user scenario DB 153 (S602).

In a case where it is determined in determination processing of step S602 that the activation condition is satisfied, it is further determined whether or not there is only one condition that satisfies the activation condition (S603).

In a case where it is determined in determination processing of step S603 that there is only one condition, a content element corresponding to context information satisfying the activation condition is presented (S604).

Furthermore, in a case where it is determined in determination processing of step S603 that there is a plurality of conditions, a rule for determining order of content elements to be presented is referred to (S605), and a content element corresponding to context information satisfying a corresponding activation condition is presented in accordance with the rule (S604).

As this rule, the order of the content elements to be presented can be determined from the plurality of content elements in accordance with an orientation of the user estimated by means of the sensor data (S611, S605).

Furthermore, as illustrated in FIG. 38, only a content element in a specific orientation may be presented in accordance with the orientation of the user estimated by means of the sensor data (S621). Moreover, as illustrated in FIG. 35, only a content element set at a specific position may be presented in accordance with a position of the user estimated by means of the sensor data (S631).

For example, when the orientation of the user is a first direction, a content element corresponding to a first character can be specified and presented to the user, and when the orientation of the user is a second direction, a content element corresponding to a second character can be specified and presented to the user.

The sixth embodiment has been described above.

7. Seventh Embodiment

The reproduction device 30 of the content element may be a single device, or a plurality of devices may operate in conjunction with each other.

As a case where the reproduction device 30 is a single device, for example, a case is assumed where sound is reproduced from a stereo earphone worn by the user outdoors.

At this time, if an environmental sound around the user can be superimposed on the content element and simultaneously presented, a sense of consistency and a sense of fusion between the provided content element and a real world around the user can be further enhanced. A means for providing the environmental sound around the user includes, for example, open type earphones that can directly propagate ambient sounds to ears, a method of superimposing, as sound data, an environmental sound acquired by a sound collecting function such as a microphone although it is a closed type, and the like.

Furthermore, to provide consistency in approach/separation feeling accompanying movement of the user such as walking, it is possible to present an effect (fade in, fade out) of gradually increasing or decreasing the volume at the time of starting or stopping reproduction of the content element.

On the other hand, as a case where a plurality of devices including the reproduction device 30 cooperatively present a content element, for example, a case is assumed where at least one content element is reproduced by a plurality of devices arranged in an indoor facility.

At this time, one device may be assigned to one content element, and a plurality of devices may be assigned to one content element.

For example, three speakers are arranged around the user, one is assigned to a speech of a character, another one is assigned to noise of a cafe, and remaining one is assigned to background music and reproduced, whereby a stereoscopic sound environment can be presented.

The speech of the voice character (FIG. 45 and the like) in the above-described sixth embodiment can also be reproduced from an earphone or the like worn by the user. At this time, if the earphone is an open type, it is possible to simultaneously listen to sounds from other speakers around the user, so that it is possible to present content elements in cooperation.

Furthermore, sound image localization of the voice of the voice character may be performed at a specific position, and the appearance of the voice character may be presented on a peripheral display corresponding to the position. This appearance presentation service may be provided as a pay service.

Alternatively, the speech of the character A can be reproduced by detecting a speaker installed at the closest position among the three speakers, and the reproduction can be caused to follow one of the speakers so as to be reproduced from the closest speaker in accordance with the movement of the user.

To enable such an operation, the device includes a means for grasping a position of the device and a position of the user or a position of another device. As an example of this means, a camera is installed having a function of communicating a blinking code of a light emitting diode (LED) to each pixel installed indoors, and each reproduction device has an encoded light emission transmission function with at least one or more LEDs, so that it is possible to simultaneously acquire an ID of each device and an assumed arrangement situation.

Furthermore, a function that can be reproduced by the reproduction device 30 is registered in advance as device function information in a dedicated database such as a device function information DB, the scenario DB 152, or the like. Here, the device function describes a reproduction function that can be implemented by a device having one ID, and includes a function in which one function is assigned to one device such as "audio reproduction" of a speaker, and a function in which a plurality of functions is assigned to one device such as "image display" and "audio reproduction" of a television receiver, and "illuminance adjustment" and "audio reproduction" of a bulb-type speaker.

By using the device function information, not only a reproduction device in proximity to the user can be specified, but also the television receiver can be used as, for example, a device only for "audio reproduction". To implement this, a device having a plurality of functions in one device such as a television receiver has a mechanism in which function combination as the inside of a conventional device is canceled and each function is individually and independently performed on the basis of an external cooperation signal.

Overall Image of Processing

Next, an overall image of information processing in a seventh embodiment will be described with reference to FIG. 47.

Figure 47:
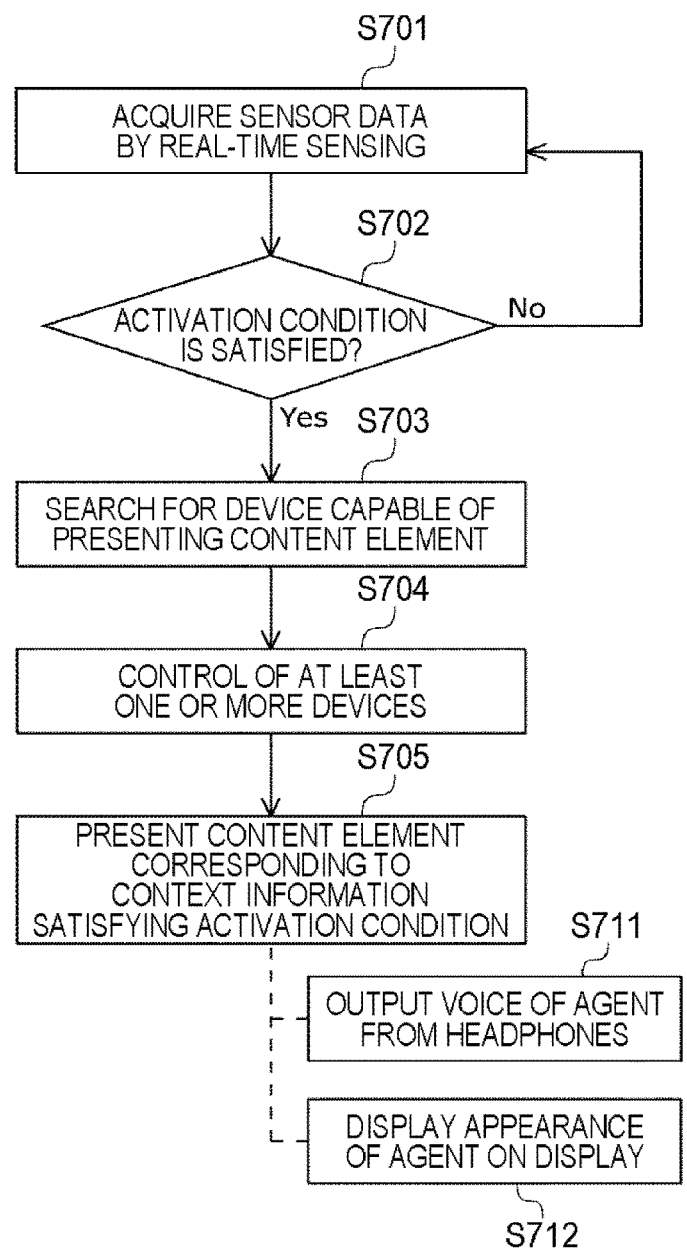
FIG. 47 is a diagram illustrating an overall image of information processing in a seventh embodiment.

The information processing illustrated in FIG. 47 is implemented by at least cooperation among (the control unit 100 of) the data management server 10 and a plurality of devices including (the control unit 300 of) the reproduction device 30 in the information processing system 1.

As illustrated in FIG. 47, in the information processing system 1, sensor data by real-time sensing is acquired (S701), and it is determined whether or not information obtained from the sensor data satisfies an activation condition of a user scenario (S702).

In a case where it is determined in determination processing of step S702 that the activation condition is satisfied, the processing proceeds to step S703. Then, in the information processing system 1, a search is performed for a device capable of presenting a content element (S703), and at least one or more devices are controlled in accordance with a result of the search (S704).

As a result, the content element corresponding to context information satisfying the activation condition is presented from one or more devices to be controlled (S705).

Furthermore, when presenting the content element, it is possible to output a voice of an agent among the content elements from the headphones worn by the user (electroacoustic transducer worn on the ear of the user) (S711), and display an appearance of the agent on a display (S712).

As described above, content elements can be presented by one or more output modals, on one or more devices.

The seventh embodiment has been described above.

8. Eighth Embodiment

By sharing details of a scenario (user scenario) currently used by the user and a data set of "content element-context information" with an external service provider, it is possible to cooperatively provide a service using content and a context constituting the scenario.

As an example, here, an example will be described of service cooperation by sharing content elements with a restaurant.

In a case where a user who uses a scenario including content elements and context information of a certain animation is currently using the scenario, details of the scenario and information indicating that the scenario is being used are provided to the restaurant.

In this restaurant, a menu such as omelet rice related to the animation is prepared in advance, and a scene is assumed in which the menu is displayed for an electronic menu to be opened in the restaurant by the user who is using the scenario.

Furthermore, as another example, an example will be described of a service by context sharing with an English conversation cram school.

As in the above example, it is also possible to create a scenario in which audio data of an English conversation skit held by the English conversation cram school is used as a content element and a situation in which the conversation is performed is set as a context, and provide the scenario to the user.

Moreover, here, by sharing only the context information set by the user when using the data set of "content element-context information" of the animation described above and providing the English conversation skit depending on the context, it is possible to provide a service at a lower cost. Moreover, it is possible to perform service design in a form of widening contact points for users mutually, such as reading the skits aloud with an animation character.

Similarly, cooperation between a music streaming distribution service and a restaurant, an English conversation cram school, or the like can also be set.

As described above, when a user who is using a scenario in which distributed music or a part thereof is used as a content element enters a restaurant, a drink is provided that matches a view of the world of the scenario. Furthermore, an English conversation skit suitable for a context of music including no lyrics is simultaneously provided. Moreover, a scenario in which music and English conversation are combined can be newly created and provided, or explanation between pieces of music, introduction of new music, and the like can be performed with an animation character used by the user.

Furthermore, a distribution status of context information in a daily life space of the user set in a scenario created by another service may be acquired, and music depending on a context may be automatically provided as a content element.

With this function, in a place having context information set by the user, the user can receive music or a part of music adapted to the context, for example, on a daily basis, so that it is possible to avoid a situation in which the user is tired of listening to the same music every day.

Moreover, by obtaining feedback such as "like" from the user, it is possible to improve accuracy by constantly acquiring information regarding a matching degree of context information and a content element, and performing machine learning.

Overall Image of Processing

Next, an overall image of information processing in an eighth embodiment will be described with reference to FIG. 48.

Figure 48:
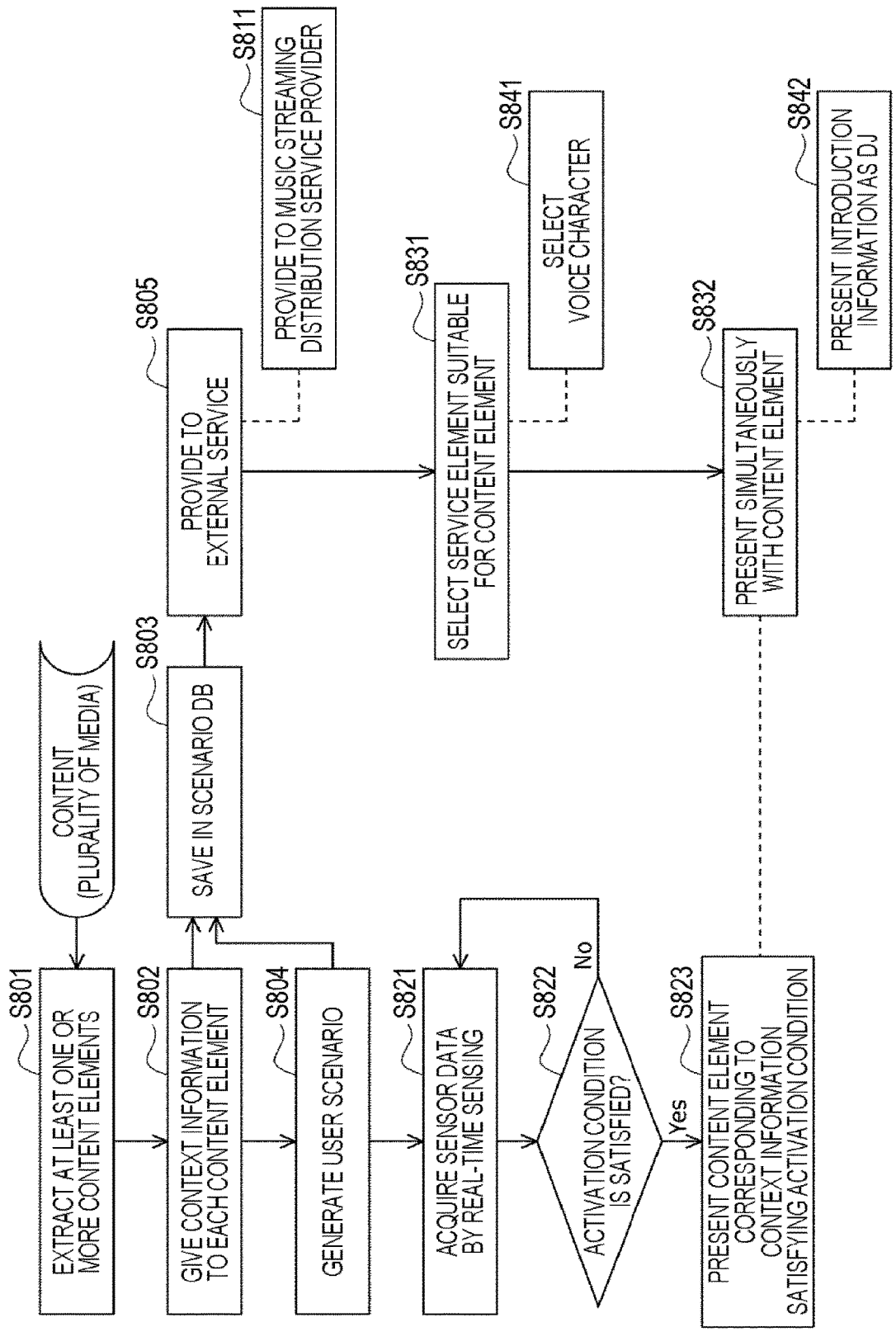
FIG. 48 is a diagram illustrating an overall image of information processing in an eighth embodiment.

The information processing illustrated in FIG. 48 is implemented by at least cooperation among a server or the like provided by an external service, and (the control unit 100 of) the data management server 10 and (the control unit 300 of) the reproduction device 30 in the information processing system 1.

As illustrated in FIG. 48, in the information processing system 1, at least one or more content elements are extracted from content including a plurality of media (S801), context information is given to each content element, and the content elements are accumulated in the content element-context information DB 151 (S802).

Then, one or more data sets of "content element-context information" are accumulated in the scenario DB 152 as a scenario (S803). Furthermore, in a case where a user scenario is generated, the user scenario is accumulated in the user scenario DB 153 (S804).

The data set of "content element-context information", scenario, or user scenario accumulated in this way can be provided to an external service (S805). As a result, a business operator of an external service such as a music streaming distribution service can control a service provided by the business operator to match the scenario, the user scenario, or the like (S811).

Furthermore, in the information processing system 1, sensor data by real-time sensing is acquired (S821), and it is determined whether or not information obtained from the sensor data satisfies an activation condition of the user scenario (S822).

In a case where it is determined in determination processing of step S822 that the activation condition is satisfied, a content element corresponding to context information satisfying the activation condition is presented (S823).

At this time, in a case where a scenario, a user scenario, or the like is provided to an external service, a service element is selected suitable for a content element associated with the scenario, the user scenario, or the like (S831), and the service element is presented simultaneously with the content element (S832).

For example, in the music streaming distribution service, a voice character can be selected corresponding to a content element (music) associated with the user scenario (S841), and the introduction information can be presented as a DJ who introduces music in the service (S842).

The eighth embodiment has been described above.

9. Ninth Embodiment

A scenario (user scenario) created by the user can be shared among the users by using a sharing means.

Here, social media such as a social networking service (SNS) is used as the sharing means, the scenario (user scenario) created by the user is disclosed for each SNS account, for example, and search and classification can be performed in accordance with a similarity of content element, a similarity of context, a similarity of activation condition setting, and the like.

Here, regarding the similarity of the setting of the activation condition, a map application may be used as the sharing means, and a scenario including a current position of the user as an activation condition may be specified and presented, whereby the user may be allowed to discover a new scenario.

It is possible to obtain information on a work or an author on which a content element of a scenario is based, information on an author who has extracted the content element and given a context, and information on a user who has set an activation condition in association with the scenario, and the user who has obtained the scenario can follow a favorite author or user.

Overall Image of Processing

Next, an overall image of information processing in a ninth embodiment will be described with reference to FIG. 49.

Figure 49:
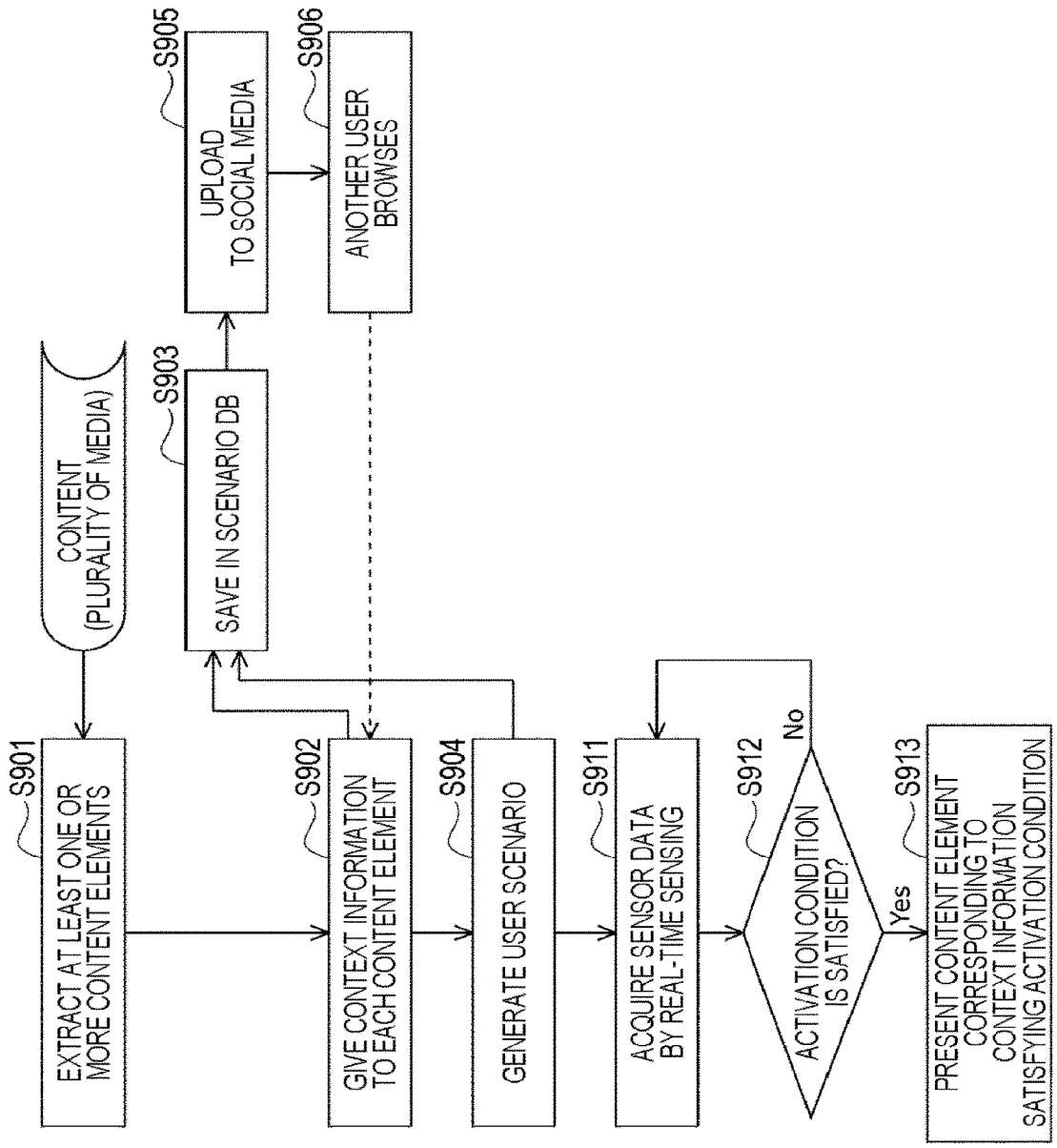
FIG. 49 is a diagram illustrating an overall image of information processing in a ninth embodiment.

The information processing illustrated in FIG. 49 is implemented by at least cooperation among a server or the like provided by social media, and (the control unit 100 of) the data management server 10 and (the control unit 300 of) the reproduction device 30 in the information processing system 1.

As illustrated in FIG. 49, in the information processing system 1, at least one or more content elements are extracted from content including a plurality of media (S901), and context information is given to each content element (S902).

Then, one or more data sets of "content element-context information" are accumulated in the scenario DB 152 as a scenario (S903). Furthermore, in a case where a user scenario is generated, the user scenario is accumulated in the user scenario DB 153 (S904).

The scenario and the user scenario accumulated in this way can be uploaded to a social media server on the Internet 40 (S905). As a result, another user can browse the scenario or the user scenario disclosed on the social media (S906). Note that, the user can follow a favorite author, user, or the like regarding the acquired scenario.

In steps S911 to S913, in a case where sensor data by real-time sensing satisfies an activation condition of the user scenario, a content element corresponding to context information satisfying the activation condition is presented.

The ninth embodiment has been described above.

10. Tenth Embodiment

In the above-described embodiment, mainly the audio data and the video data have been described, but the data constituting the content element is not limited to the audio and the video, and includes, for example, a format and data having a device capable of presentation, such as an image, a tactile sense, a smell, and the like, in which a moving image is reproduced by using AR glasses or the like, or a tactile sense of the ground is presented by using shoes having a vibrating device.

Overall Image of Processing

Next, an overall image of information processing in a tenth embodiment will be described with reference to FIG. 50.

Figure 50:
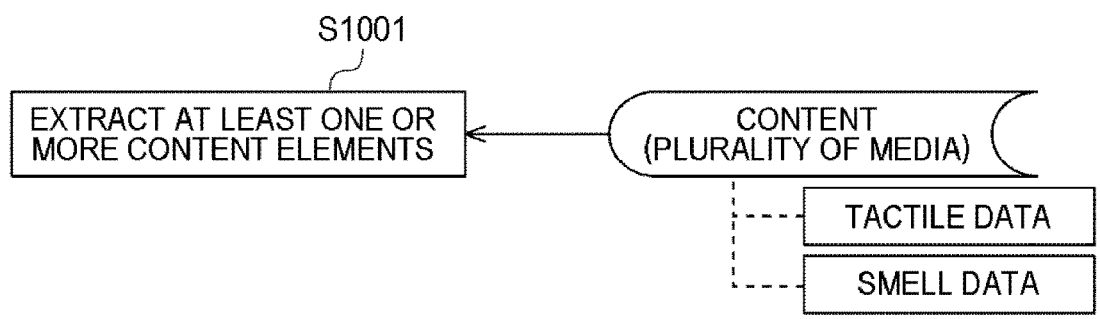
FIG. 50 is a diagram illustrating an overall image of information processing in a tenth embodiment.

The information processing illustrated in FIG. 50 is executed by (the control unit 100 of) the data management server 10 in the information processing system 1.

As illustrated in FIG. 50, in the information processing system 1, at least one or more content elements are extracted from content including a plurality of media (S1001), and the plurality of media can include data of at least one of tactile data or smell data that can be presented by the reproduction device 30.

The tenth embodiment has been described above.

11. Eleventh Embodiment

By the way, since a case is also assumed where a presented content element is not suitable for the user, control for switching the user scenario to another one may be performed in accordance with feedback from the user. As a result, the user can reliably receive presentation of a content element adapted to the user.

Overall Image of Processing

An overall image of information processing in an eleventh embodiment will be described with reference to FIG. 51.

Figure 51:
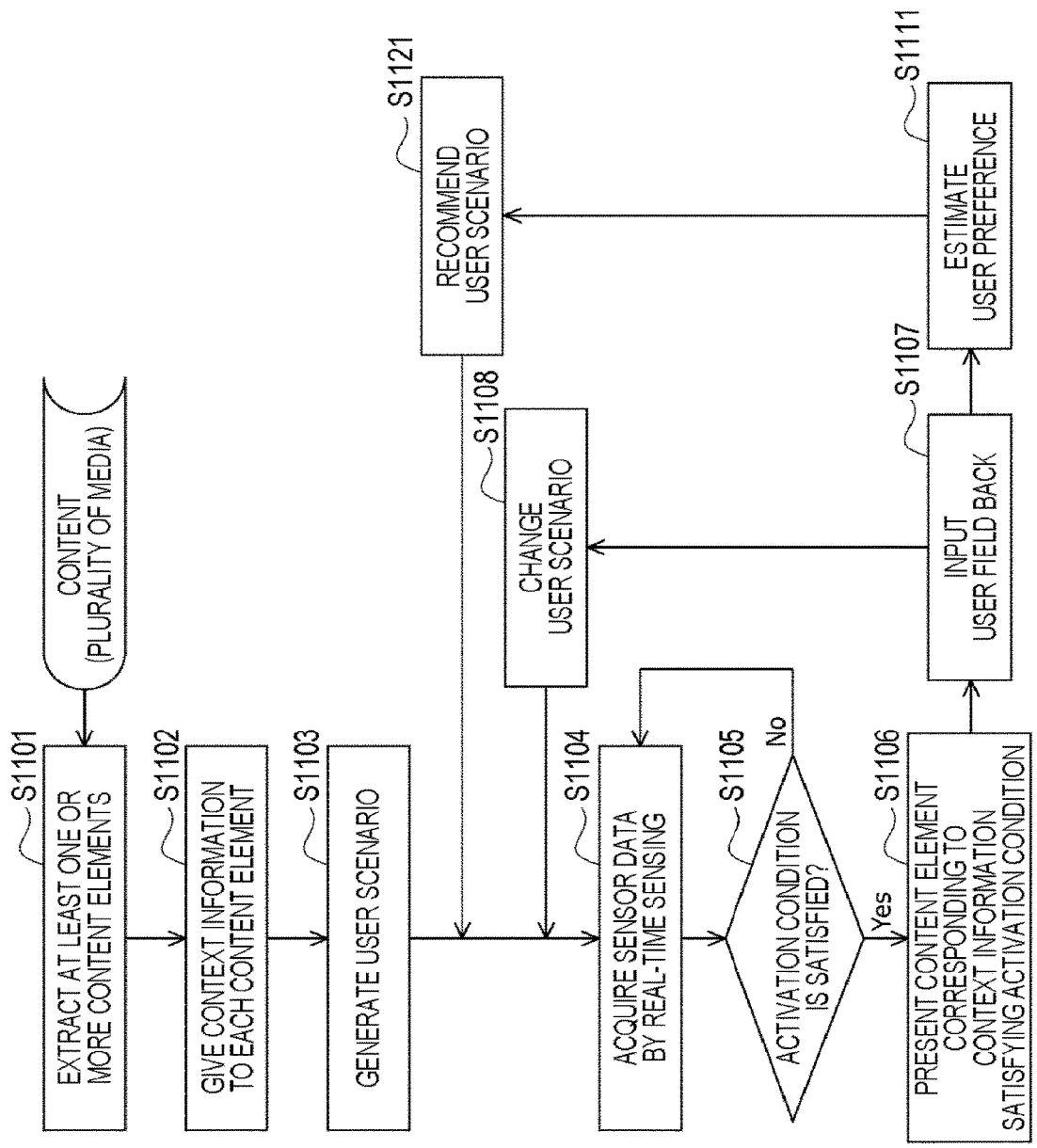
FIG. 51 is a diagram illustrating an overall image of information processing in an eleventh embodiment.

The information processing illustrated in FIG. 51 is implemented by at least cooperation between (the control unit 100 of) the data management server 10 and (the control unit 300 of) the reproduction device 30 in the information processing system 1.

As illustrated in FIG. 51, in the information processing system 1, at least one or more content elements are extracted from content including a plurality of media (S1101), and context information is given to each content element (S1102).

One or more data sets of "content element-context information" are accumulated in the scenario DB 152 as a scenario. Then, an activation condition is set for the scenario accumulated in the scenario DB 152, whereby a user scenario is generated (S1103).

Furthermore, in the information processing system 1, sensor data by real-time sensing is acquired (S1104), and it is determined whether or not information obtained from the sensor data satisfies the activation condition of the user scenario (S1105).

In a case where it is determined in determination processing of step SS1105 that the activation condition is satisfied, a content element corresponding to context information satisfying the activation condition is presented (S1106).

Thereafter, in a case where feedback from the user is input (S1107), the user scenario is changed in accordance with the feedback (S1108). As a result, steps S1104 to S1106 described above are repeated in a state where the user scenario is switched to another one, and a content element more suitable for the user can be presented.

Furthermore, a preference of the user for the content element is estimated by analyzing the feedback input from the user (S1111), and a user scenario is recommended in accordance with the preference of the user (S1121). As a result, in a state of switching to the recommended user scenario, steps S1104 to S1106 described above are repeated, and a content element (for example, a favorite voice character) more suitable for the preference of the user can be presented.

Note that, here, instead of recommending the user scenario, the content element itself may be recommended, and the recommended content element may be presented.

The eleventh embodiment has been described above.

12. Modifications

In the above description, the case has been described where the information processing system 1 includes the data management server 10, the editing device 20, and the reproduction devices 30-1 to 30-N; however, for example, other configurations may be used such as addition of other devices.

Specifically, the data management server 10 as one information processing device may be configured as a plurality of information processing devices by being divided into a dedicated database server, a distribution server for distribution of scenarios, content elements, and the like. Similarly, the editing device 20 or the reproduction device 30 may be configured not only as one information processing device but also as a plurality of information processing devices.

Furthermore, in the information processing system 1, it is arbitrary which device includes a component (control unit) constituting each device of the data management server 10, the editing device 20, and the reproduction device 30. For example, using an edge computing technology, the reproduction device 30 may execute a part of the processing of the information processing by the data management server 10 described above, or an edge server connected to a network (peripheral portion of the network) close to the reproduction device 30 may execute the part of the processing.

That is, a system means an aggregation of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Furthermore, a communication form of each component is also arbitrary. In other words, the components may be connected to each other via the Internet 40 or may be connected to each other via a local net (Local Area Network (LAN) or Wide Area Network (WAN)). Moreover, the components may be connected to each other by wire or wirelessly.

Note that, the conventional technology is mainly intended to implement convenience of use by automating information retrieval work and device operation by the user. In this type of automation, it is common to determine whether or not context classification defined by the system matches context analogized by sensing the user's action or state.

Such a system includes elements as described in the following (a) to (d), and is characterized in that a context defined by the system is specified from results of sensing of user's actions, operations, and physical conditions.

(a) Directly analyze and recognize context from sensing data of user's action
(b) Recognize content accessed by a user, and recognize context from analysis of attribute data and details of the content
(c) Have a database of combinations of context and content
(d) A database that associates sensing data with a context is assumed However, in the conventional technology, in a case where an action purpose of the user is fixed in a service, and work or operation is based on a certain rule, a context of the user can be defined on the system side, so that the user can easily agree to the context defined by the system.

On the other hand, in a case where content is presented while being adaptively distributed to daily life of the user and caused to cooperate, the context of the user is diverse, and each unique environment dynamically changes, and thus it is difficult for the user to receive the context defined on the system side.

Here, a sense of coincidence with the context felt by the user is subjective and evolved, and it is extremely difficult to predict and adapt the sense of coincidence with the context by objective and statistical processing of posterior data regarding a context definition defined on the system side. To enable this, it is necessary to accumulate enormous data, and investment before starting the service becomes an unrealistic scale.

Furthermore, content presented by the conventional technology is presented to the user without changing the provision format used in the conventional service. For example, the data and music that are selected by recognizing the context and provided are presented to the user as they are without changing the form of distribution to the service.

However, at the time of presentation to the daily life of the user, since the above-described provision format is designed on the premise of the conventional viewing behavior, it can be a factor that hinders free and various user actions in the daily life. For example, content such as a movie or music is in a format that requires a spectator to sit in front of a screen and a speaker and view the content, and if the content is designed on the premise of a conventional viewing behavior, there is a possibility that the content obstructs the user action.

Moreover, since conventional devices are also designed on the premise of conventional viewing behavior, individual devices are optimized to provide individual services, and these conventional devices often do not have a mechanism for adapting to the daily behavior of the user in cooperation while accommodating some functions.

For example, a portable device such as a smartphone is adapted to daily behavior of the user with portability by pursuing portability, but a premise of viewing behavior centering on a screen remains conventional. For that reason, for example, walking on a general road or in a public facility is considered dangerous as so-called "smartphone walking" because of its characteristics of depriving vision and hearing.

Note that, Patent Document 1 described above discloses a device that estimates a landmark visually recognized by the user and provides a navigation service indicating a traveling direction of the user by using the information, but does not disclose or suggest that an activation condition for each user can be set for a context as in the present technology.

Furthermore, Patent Document 2 discloses a system that extracts context information and content information from a content item, generates an index, and generates a recommendation in response to a context of a user and a detail of a query of the user. However, in Patent Document 2, the context information is a search, a recently accessed document, an application in operation, and a time of activity, and does not include the physical position of the user (see paragraph [0011]).

Moreover, Patent Document 3 discloses a processing device that automatically performs editing to enlarge faces of only two people defined as context information to a specified size when content includes faces of a plurality of persons as a plurality of objects (including voices), but does not disclose or suggest that context and voice are recorded in association with each other on the basis of the content and reused as in the present technology.

Furthermore, Patent Document 4 discloses that a correspondence relationship between a context (time zone, day of week, and the like) of a viewer suitable for viewing content and a feature value of the content is learned in advance on the basis of a broadcast schedule and broadcast history information of the content, and a correspondence table of "context-feature value of content" is generated, whereby information indicating the context suitable for viewing is generated for new content, and is provided as metadata. However, Patent Document 4 does not disclose cutting out content from existing content.

Moreover, in Patent Document 5, context information extracted from sensing data (motion, voice, heartbeat, feeling, and the like) indicating a state of the user and all videos viewed by the user at that time are recorded, and when content depending on the state of the user is extracted by using context information indicating the current state of the user, and context information indicating that "the user is excited and pushes up the arm during broadcasting of soccer" is generated, content recorded in the past can be extracted and provided to the user in accordance with a heart rate, an arm movement, and keywords such as soccer and excited. However, Patent Document 5 does not disclose extracting content and context from existing content.

As described above, even if the technologies disclosed in Patent Documents 1 to 5 are used, it is difficult to say that a good user experience can be provided when a service is provided using information on context, and it has been required to provide a better user experience.

Thus, in the present technology, when a service is provided by using information on context, one scenario can be used by each of users who live in different places, so that better user experience can be provided.

13. Configuration of Computer

Figure 52:
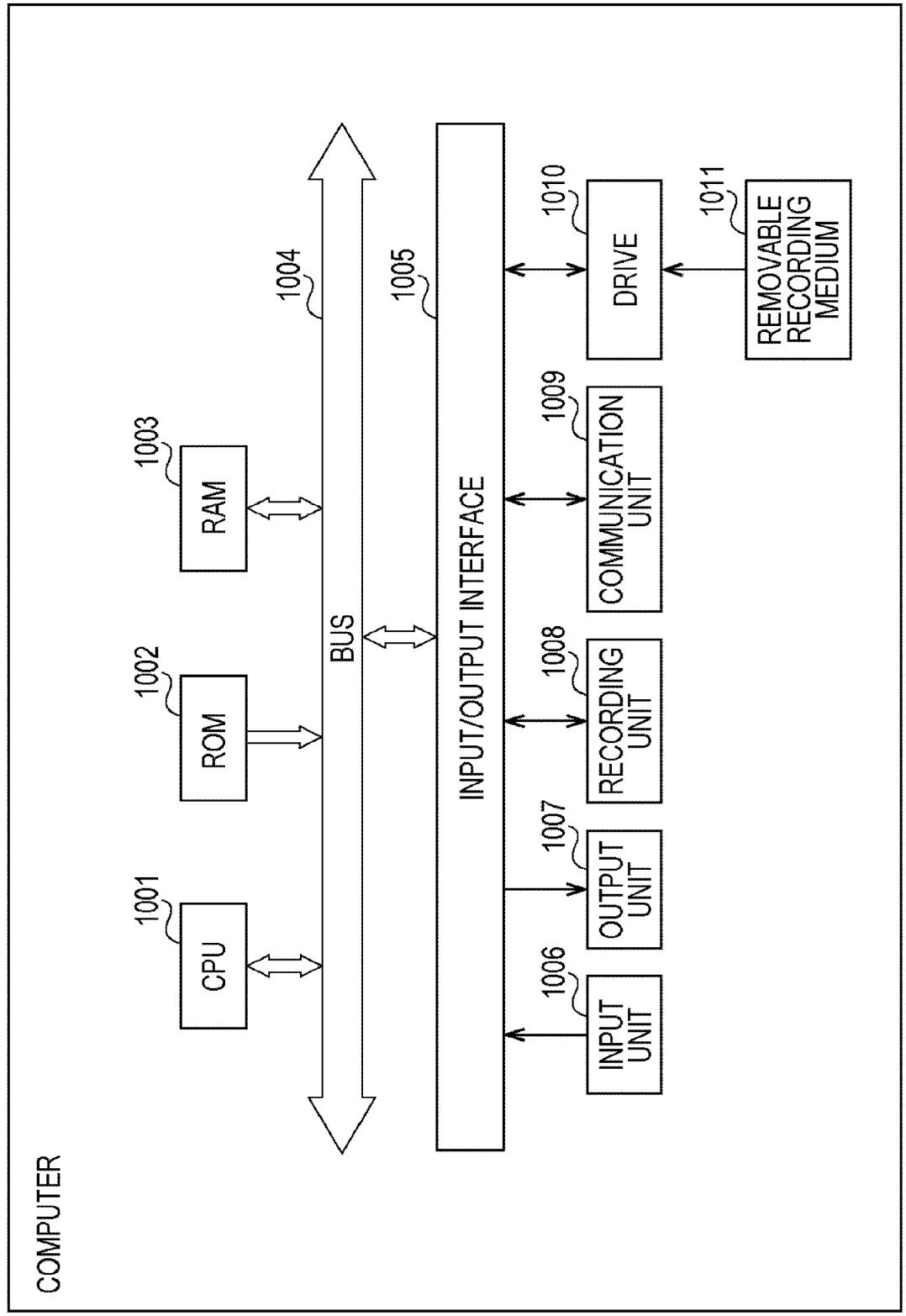
FIG. 52 is a diagram illustrating a configuration example of a computer.

The above-described series of processing steps (information processing in each embodiment such as information processing in the first embodiment illustrated in FIG. 6) can be executed by hardware or software. In a case where the series of processing steps is executed by software, a program constituting the software is installed in a computer of each device. FIG. 52 is a block diagram illustrating a configuration example of hardware of the computer that executes the above-described series of processing steps by the program.

In the computer, a central processing unit (CPU) 1001, a read only memory (ROM) 1002, and a random access memory (RAM) 1003 are connected to each other by a bus 1004. Moreover, an input/output interface 1005 is connected to the bus 1004. The input/output interface 1005 is connected to an input unit 1006, an output unit 1007, a recording unit 1008, a communication unit 1009, and a drive 1010.

The input unit 1006 includes a microphone, a keyboard, a mouse, and the like. The output unit 1007 includes a speaker, a display, and the like. The recording unit 1008 includes a hard disk, a nonvolatile memory, or the like. The communication unit 1009 includes a network interface and the like. The drive 1010 drives a removable recording medium 1011 such as a magnetic disk, an optical disk, a magneto-optical disk, or a semiconductor memory.

In the computer configured as described above, the CPU 1001 loads and executes the program recorded in the ROM 1002 or the recording unit 1008 to the RAM 1003 via the input/output interface 1005 and the bus 1004, whereby the above-described series of processing steps is performed.

The program executed by the computer (CPU 1001) can be provided, for example, by being recorded in the removable recording medium 1011 as a package medium or the like. Furthermore, the program can be provided via a wired or wireless transmission medium such as a local area network, the Internet, or digital satellite broadcasting.

In the computer, the program can be installed to the recording unit 1008 via the input/output interface 1005 by mounting the removable recording medium 1011 to the drive 1010. Furthermore, the program can be installed to the recording unit 1008 by receiving with the communication unit 1009 via the wired or wireless transmission medium. In addition, the program can be installed in advance to the ROM 1002 or the recording unit 1008.

Here, in the present specification, the processing performed by the computer in accordance with the program does not necessarily have to be performed chronologically in the order described as the flowchart. That is, the processing performed by the computer in accordance with the program also includes processes executed in parallel or individually (for example, parallel processing or processing by an object). Furthermore, the program may be processed by one computer (processor) or may be subjected to distributed processing by a plurality of computers.

Note that, the embodiment of the present technology is not limited to the embodiments described above, and various modifications are possible without departing from the scope of the present technology.

Furthermore, each step of the information processing in each embodiment can be executed by one device or can be shared and executed by a plurality of devices. Moreover, in a case where a plurality of processes is included in one step, the plurality of processes included in the one step can be executed by being shared in a plurality of devices, other than being executed by one device.

Note that, the present technology can have a configuration as follows.

(1) An information processing system including
a control unit that performs control such that:
context information is associated with a content element in advance;
for each of users, an activation condition is settable for at least the context information, and a user scenario including a data set of the context information and the activation condition is generatable; and
when sensor data obtained by sensing a user in real time satisfies the activation condition set in the user scenario, the content element associated with the context information depending on the activation condition is presented to the user.

(2) The information processing system according to (1), in which
the control unit
extracts, from content including a plurality of media, a content element including at least some of media,
generates context information corresponding to the content element on the basis of the content, and
generates an association database in which the content element and the context information are accumulated in association with each other.

(3) The information processing system according to (2), in which
the control unit generates a scenario database in which a data set including the content element and the context information is packaged on the basis of a certain theme and accumulated.

(4) The information processing system according to (2), in which
the content element is a part of streaming distribution content, and
information indicating an ID and a reproduction range of the content is accumulated in association with the context information.

(5) The information processing system according to (4), in which
the control unit presents another content element including a specific voice character corresponding to the context information before reproducing the content element.

(6) The information processing system according to any of (2) to (5), in which
the control unit gives content information to a new content element by performing machine learning on a relationship between the content element accumulated in the association database and the context information.

(7) The information processing system according to (3), in which
the control unit
presents a scenario including a data set of the content element and the context information, together with map information, and
presents, as a default value of an activation condition corresponding to the context information, an interface that allows a creator who creates a scenario to set a predetermined area on a map.

(8) The information processing system according to any of (1) to (7), in which
the control unit
generates, from content including a first medium,
a second medium different from the first medium, as a content element,
generates context information corresponding to the content element on the basis of the content, and
generates an association database in which the content element and the context information are accumulated in association with each other.

(9) The information processing system according to (8), in which
the first medium includes text, and
the second medium includes text to speech (TTS) voice.

(10) The information processing system according to (8) or (9), in which
the control unit
performs machine learning on a relationship between the first medium and the second medium in advance, and
generates the second medium from the first medium on the basis of a result of the machine learning.

(11) The information processing system according to any of (1) to (10), in which
the control unit,
with respect to the context information,
is enabled to set an activation condition depending on sensor data obtained by sensing the user at present, and generates a user scenario database including a plurality of data sets of the context information and the activation condition.

(12) The information processing system according to (11), in which
the control unit sets an activation condition depending on captured image data.

(13) The information processing system according to (11), in which
the control unit sets an activation condition in accordance with a characteristic operation of the user, the active condition depending on sensor data at a time of the characteristic operation of the user.

(14) The information processing system according to any of (11) to (13), in which
the control unit
performs machine learning on a relationship between the context information and the activation condition, and
outputs information depending on a result of the machine learning.

(15) The information processing system according to (14), in which
the control unit generates context information for a specific activation condition in accordance with the result of the machine learning.

(16) The information processing system according to (14), in which the control unit sets an activation condition corresponding to the user for specific context information in accordance with the result of the machine learning.

(17) The information processing system according to any of (11) to (16), in which
in the sensing, data that allows a temporal or spatial activation condition or an activation condition depending on an action of the user to be set is acquired as the sensor data.

(18) The information processing system according to any of (1) and (11) to (17), in which
the control unit
presents a scenario including a data set of the content element and the context information associated with each other in advance, together with map information, and
presents an interface that allows the user to set a predetermined area on a map as an activation condition corresponding to the context information.

(19) The information processing system according to any of (1) to (18), in which
when an identical activation condition is set for a plurality of pieces of context information, the control unit presents a plurality of content elements corresponding to the plurality of pieces of context information to the user in accordance with a predetermined rule.

(20) The information processing system according to (19), in which
the control unit specifies one content element from the plurality of content elements in accordance with an orientation of the user estimated by means of the sensor data, and presents the one content element to the user.

(21) The information processing system according to (20), in which
the control unit
specifies and presents a content element corresponding to a first character to the user when the orientation of the user estimated by means of the sensor data is a first orientation, and
specifies and presents a content element corresponding to a second character to the user when the orientation of the user is a second orientation.

(22) The information processing system according to (21), in which
the control unit provides information associated with a place of the first character or the second character in accordance with a position of the first character or the second character.

(23) The information processing system according to any of (1) to (22), in which
the control unit
searches for a device capable of presenting a content element associated with context information depending on the activation condition, around a current position of the user, when the sensor data satisfies the activation condition, and
controls the device to cause the content element to be presented to the user.

(24) The information processing system according to (23), in which
the control unit
controls an electroacoustic transducer worn on an ear of the user to cause a voice of an agent included in the content element to be presented to the user, and
controls a display arranged around the user to cause an appearance of the agent included in the content element to be presented to the user.

(25) The information processing system according to any of (1) to (24), in which
the control unit provides a specific user scenario to a service provider via a communication unit.

(26) The information processing system according to (25), in which
the control unit sets a voice character corresponding to a content element associated with the specific user scenario as a disc jockey (DJ) introducing music in a music streaming distribution service, by providing the user scenario to a music streaming distribution service provider via a communication unit.

(27) The information processing system according to any of (1) to (24), in which
the control unit uploads the user scenario to social media via a communication unit and enables the user scenario to be shared with other users.

(28) The information processing system according to any of (1) to (27), in which
the content element includes at least one of tactile data or smell data allowed to be presented by a device.

(29) The information processing system according to any of (1) to (28), in which
the control unit switches the user scenario to another user scenario in accordance with feedback from the user to whom the content element is presented.

(30) The information processing system according to (29), in which
the control unit estimates a preference of the user for the content element by analyzing the feedback.

(31) The information processing system according to (30), in which
the control unit recommends the content element or the user scenario in accordance with the preference of the user.

(32) An information processing method in which
an information processing device performs control such that:
context information is associated with a content element in advance;
for each of users, an activation condition is settable for at least the context information, and a user scenario including a data set of the context information and the activation condition is generatable; and
when sensor data obtained by sensing a user in real time satisfies the activation condition set in the user scenario, the content element associated with the context information depending on the activation condition is presented to the user.

(33) A recording medium readable by a computer recording a program for causing the computer to function as
a control unit that performs control such that:
context information is associated with a content element in advance;
for each of users, an activation condition is settable for at least the context information, and a user scenario including a data set of the context information and the activation condition is generatable; and
when sensor data obtained by sensing a user in real time satisfies the activation condition set in the user scenario, the content element associated with the context information depending on the activation condition is presented to the user.

REFERENCE SIGNS LIST

1 Information processing system
10 Data management server

20 Editing device
30, 30-1 to 30-N Reproduction device
40 Internet
100 Control unit
101 Input unit
102 Output unit
103 Storage unit
104 Communication unit
111 Data management unit
112 Data processing unit
113 Communication control unit
131 Presented character selection unit
132 Scenario processing unit
133 Response generation unit
151 Content element-context information DB
152 Scenario DB
153 User scenario DB
161 Character arrangement DB
162 Position-dependent information DB
163 Scenario DB
200 Control unit
201 Input unit
202 Output unit
203 Storage unit
204 Communication unit
211 Editing processing unit
212 Presentation control unit
213 Communication control unit
221 Mouse
222 Keyboard
231 Display
232 Speaker
300 Control unit
301 Input unit
302 Output unit
303 Storage unit
304 Communication unit
305 Sensor unit
306 Camera unit
307 Output terminal
308 Power supply unit
311 Reproduction processing unit
312 Presentation control unit
313 Communication control unit
321 Button
322 Touch panel
331 Display
332 Speaker
341 User position detection unit
342 User direction detection unit
343 Speech recognition intention understanding unit
344 Content reproduction unit
1001 CPU

The invention claimed is:

1. An information processing system, comprising:
control circuitry configured to
associate context information with a content element;
for each of a plurality of users, set an activation condition for at least the context information, and generate a user scenario including a data set of the context information and the activation condition; and
when sensor data obtained by sensing a user in real time satisfies the activation condition set in the user scenario for the user, present the content element associated with the context information depending on the activation condition to the user,
wherein the control circuitry is further configured to extract, from content including a plurality of media, the content element including at least some of the media,
generate the context information corresponding to the content element based on the content,
generate an association database in which the content element and the context information are stored in association with each other, and
provide new context information to a new content element by performing machine learning on a relationship between the content element and the context information stored in the association database.

2. The information processing system according to claim 1, wherein the control circuitry is further configured to generate a scenario database in which a data set including the content element and the context information is packaged based on a certain theme and stored.

3. The information processing system according to claim 1, wherein
the content element is a part of streaming distribution content, and
information indicating an ID and a reproduction range of the content is stored in association with the context information.

4. The information processing system according to claim 3, wherein the control circuitry is further configured to present another content element including a specific voice character corresponding to the context information before reproducing the content element.

5. The information processing system according to claim 2, wherein the control circuitry is further configured to:
present a scenario including the data set of the content element and the context information, together with map information, and
present, as a default value of an activation condition corresponding to the context information, an interface that allows a creator who creates the scenario to set a predetermined area on a map.

6. The information processing system according to claim 1, wherein the control circuitry is further configured to:
generate, from content including a first medium, a second medium different from the first medium, as the content element,
generate the context information corresponding to the content element based on the content, and
generate the association database in which the content element and the context information are stored in association with each other.

7. The information processing system according to claim 6, wherein
the first medium includes text, and
the second medium includes text to speech (TTS) voice.

8. The information processing system according to claim 6, wherein the control circuitry is further configured to:
perform machine learning on a relationship between the first medium and the second medium in advance, and
generate the second medium from the first medium based on a result of the machine learning.

9. The information processing system according to claim 1, wherein the control circuitry is further configured to, with respect to the context information, set an activation condition depending on the sensor data obtained by sensing the user at present, and generate a user scenario database including a plurality of data sets of the context information and the activation condition.

10. The information processing system according to claim 9, wherein the control circuitry is further configured to set the activation condition depending on captured image data.

11. The information processing system according to claim 9, wherein the control circuitry is further configured to set the activation condition in accordance with a characteristic operation of the user, the activation condition depending on the sensor data at a time of the characteristic operation of the user.

12. The information processing system according to claim 9, wherein the control circuitry is further configured to:
perform machine learning on a relationship between the context information and the activation condition, and
output information depending on a result of the machine learning.

13. The information processing system according to claim 12, wherein the control circuitry is further configured to generate the context information for a specific activation condition in accordance with the result of the machine learning.

14. The information processing system according to claim 12, wherein the control circuitry is further configured to set the activation condition corresponding to the user for specific context information in accordance with the result of the machine learning.

15. The information processing system according to claim 9, wherein in the sensing, data that allows a temporal or spatial activation condition or the activation condition depending on an action of the user to be set is acquired as the sensor data.

16. The information processing system according to claim 1, wherein the control circuitry is further configured to:
present a scenario including a data set of the content element and the context information associated with each other in advance, together with map information, and
present an interface that allows the user to set a predetermined area on a map as the activation condition corresponding to the context information.

17. The information processing system according to claim 1, wherein
when an identical activation condition is set for a plurality of pieces of context information, the control circuitry is further configured to present a plurality of content elements corresponding to the plurality of pieces of context information to the user in accordance with a predetermined rule.

18. The information processing system according to claim 17, wherein the control circuitry is further configured to specify one content element from the plurality of content elements in accordance with an orientation of the user estimated by means of the sensor data, and present the one content element to the user.

19. The information processing system according to claim 18, wherein the control circuitry is further configured to
specify and present a first content element corresponding to a first character to the user when the orientation of the user estimated by means of the sensor data is a first orientation, and
specify and present a second content element corresponding to a second character to the user when the orientation of the user is a second orientation.

20. The information processing system according to claim 19, wherein the control circuitry is further configured to provide information associated with a place of the first character or the second character in accordance with a position of the first character or the second character.

21. The information processing system according to claim 1, wherein the control circuitry is further configured to:
search for a device capable of presenting the content element associated with the context information depending on the activation condition, around a current position of the user, when the sensor data satisfies the activation condition, and
control the device to cause the content element to be presented to the user.

22. The information processing system according to claim 21, wherein the control circuitry is further configured to:
control an electroacoustic transducer worn on an ear of the user to cause a voice of an agent included in the content element to be presented to the user, and
control a display arranged around the user to cause an appearance of the agent included in the content element to be presented to the user.

23. The information processing system according to claim 1, wherein the control circuitry is further configured to provide a specific user scenario to a service provider via a communication unit.

24. The information processing system according to claim 23, wherein the control circuitry is further configured to set a voice character corresponding to a content element associated with the specific user scenario as a disc jockey (DJ) introducing music in a music streaming distribution service, by providing the user scenario to a music streaming distribution service provider via a communication unit.

25. The information processing system according to claim 1, wherein the control circuitry is further configured to upload the user scenario to social media via a communication unit and enable the user scenario to be shared with other users.

26. The information processing system according to claim 1, wherein the content element includes at least one of tactile data or smell data allowed to be presented by a device.

27. The information processing system according to claim 1, wherein the control circuitry is further configured to switch the user scenario to another user scenario in accordance with feedback from the user to whom the content element is presented.

28. The information processing system according to claim 27, wherein the control circuitry is further configured to estimate a preference of the user for the content element by analyzing the feedback.

29. The information processing system according to claim 28, wherein the control circuitry is further configured to recommend the content element or the user scenario in accordance with the preference of the user.

30. An information processing method in which an information processing device performs a control method comprising:
associating context information with a content element;
for each of a plurality of users, setting an activation condition for at least the context information, and generating a user scenario including a data set of the context information and the activation condition; and
when sensor data obtained by sensing a user in real time satisfies the activation condition set in the user scenario for the user, presenting the content element associated with the context information depending on the activation condition to the user,
wherein the method further comprises
extracting, from content including a plurality of media, the content element including at least some of the media,
generating the context information corresponding to the content element based on the content, generating an association database in which the content element and the context information are stored in association with each other, and providing new context information to a new content element by performing machine learning on a relationship between the content element and the context information stored in the association database.

31. A non-transitory recording medium readable by a computer recording a program for causing the computer to perform a method comprising:

associating context information with a content element;

for each of a plurality of users, setting an activation condition for at least the context information, and generating a user scenario including a data set of the context information and the activation condition; and when sensor data obtained by sensing a user in real time satisfies the activation condition set in the user scenario for the user, presenting the content element associated with the context information depending on the activation condition to the user, wherein the method further comprises extracting, from content including a plurality of media, the content element including at least some of the media, generating the context information corresponding to the content element based on the content, generating an association database in which the content element and the context information are stored in association with each other, and providing new context information to a new content element by performing machine learning on a relationship between the content element and the context information stored in the association database.

* * * * *